(12) United States Patent
Yang et al.

(10) Patent No.: US 12,164,747 B2
(45) Date of Patent: Dec. 10, 2024

(54) REDUCED SIZE CONFIGURATION INTERFACE

(71) Applicant: Apple Inc., Cupertino, CA (US)

(72) Inventors: Lawrence Y. Yang, Bellevue, WA (US); Christopher Wilson, Sonoma, CA (US); Wan Si Wan, Sunnyvale, CA (US); Gary Ian Butcher, Los Gatos, CA (US); Imran Chaudhri, San Francisco, CA (US); Alan C. Dye, San Francisco, CA (US); Jonathan P. Ive, San Jose, CA (US); Stephen O. Lemay, Palo Alto, CA (US); Lee S. Broughton, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/122,625

(22) Filed: Mar. 16, 2023

(65) Prior Publication Data

US 2023/0214089 A1    Jul. 6, 2023

Related U.S. Application Data

(63) Continuation of application No. 17/188,228, filed on Mar. 1, 2021, now Pat. No. 11,609,681, which is a
(Continued)

(51) Int. Cl.
*G06F 3/0482* (2013.01)
*G06F 1/16* (2006.01)
(Continued)

(52) U.S. Cl.
CPC ............ *G06F 3/0482* (2013.01); *G06F 1/163* (2013.01); *G06F 3/002* (2013.01);
(Continued)

(58) Field of Classification Search
CPC ........ G06F 3/0482; G06F 1/163; G06F 3/002; G06F 3/04842; G06F 3/04847;
(Continued)

(56) References Cited

U.S. PATENT DOCUMENTS

| 4,803,487 A | 2/1989 | Willard et al. |
| 5,617,031 A | 4/1997 | Tuttle |

(Continued)

FOREIGN PATENT DOCUMENTS

| AU | 2015101019 A4 | 9/2015 |
| AU | 2016100796 A4 | 6/2016 |

(Continued)

OTHER PUBLICATIONS

3C Blogger Kisplay Share, Samsung GALAXY Tab S Hands-on SideSync 3.0 Is Amazing, http://www.samsung.com/tw/article/galaxy-tab-s-blogger-kisplay., Jul. 4, 2014, 4 pages.

(Continued)

*Primary Examiner* — Lewis G West
(74) *Attorney, Agent, or Firm* — DLA Piper LLP (US)

(57) ABSTRACT

In response to detecting that an external device is within communication range of an electronic device and in accordance with a determination that the external device is in a pairing mode, the electronic device displays an affordance corresponding to a pairing application of the electronic device. In response to detecting that an external device is within communication range of an electronic device and in accordance with a determination that the external device is not in the pairing mode, the electronic device forgoes display of the affordance. In response to user input corresponding to selection of the affordance, the electronic device displays a user interface associated with initiating a process to pair the electronic device and the external device.

33 Claims, 30 Drawing Sheets

Related U.S. Application Data continuation of application No. 16/749,929, filed on Jan. 22, 2020, now Pat. No. 10,936,164, which is a continuation of application No. 16/407,584, filed on May 9, 2019, now Pat. No. 10,579,225, which is a continuation of application No. 15/366,607, filed on Dec. 1, 2016, now Pat. No. 10,324,590, which is a continuation of application No. 14/839,913, filed on Aug. 28, 2015, now Pat. No. 9,547,419.

(60) Provisional application No. 62/129,910, filed on Mar. 8, 2015, provisional application No. 62/044,956, filed on Sep. 2, 2014.

(51) Int. Cl.
| | |
|---|---|
| *G06F 3/00* | (2006.01) |
| *G06F 3/04842* | (2022.01) |
| *G06F 3/04847* | (2022.01) |
| *G06F 3/0488* | (2022.01) |
| *G06F 3/147* | (2006.01) |
| *H04M 1/72409* | (2021.01) |
| *H04M 1/72412* | (2021.01) |
| *H04M 1/72427* | (2021.01) |
| *H04W 4/80* | (2018.01) |
| *H04W 76/14* | (2018.01) |
| *H04W 84/12* | (2009.01) |

(52) U.S. Cl.
CPC ...... *G06F 3/04842* (2013.01); *G06F 3/04847* (2013.01); *G06F 3/0488* (2013.01); *G06F 3/147* (2013.01); *H04M 1/72409* (2021.01); *H04M 1/724094* (2022.02); *H04W 4/80* (2018.02); *H04W 76/14* (2018.02); *H04M 1/724095* (2022.02); *H04M 1/72412* (2021.01); *H04M 1/72427* (2021.01); *H04M 2250/02* (2013.01); *H04M 2250/06* (2013.01); *H04M 2250/52* (2013.01); *H04W 84/12* (2013.01)

(58) Field of Classification Search
CPC .. G06F 3/0488; G06F 3/147; H04M 1/72409; H04M 1/724094; H04M 1/724095; H04M 1/72412; H04M 1/72427; H04M 2250/02; H04M 2250/06; H04M 2250/52; H04W 4/80; H04W 76/14; H04W 84/12
See application file for complete search history.

(56) References Cited

U.S. PATENT DOCUMENTS

| | | |
|---|---|---|
| 5,793,366 A | 8/1998 | Mano et al. |
| 5,825,353 A | 10/1998 | Will |
| 5,853,327 A | 12/1998 | Gilboa |
| 6,008,807 A | 12/1999 | Bretschneider et al. |
| 6,016,248 A | 1/2000 | Anzai et al. |
| 6,167,353 A | 12/2000 | Piernot et al. |
| 6,190,174 B1 | 2/2001 | Lam et al. |
| 6,232,972 B1 | 5/2001 | Arcuri et al. |
| 6,323,846 B1 | 11/2001 | Westerman et al. |
| 6,359,837 B1 | 3/2002 | Tsukamoto |
| 6,398,646 B1 | 6/2002 | Wei et al. |
| 6,429,896 B1 | 8/2002 | Aruga et al. |
| 6,522,347 B1 | 2/2003 | Sakai et al. |
| 6,570,557 B1 | 5/2003 | Westerman et al. |
| 6,677,932 B1 | 1/2004 | Westerman |
| 6,809,724 B1 | 10/2004 | Shiraishi et al. |
| 6,809,759 B1 | 10/2004 | Chiang |
| 6,819,867 B2 | 11/2004 | Mayer et al. |
| 6,857,105 B1 | 2/2005 | Fox et al. |
| 6,889,138 B1 | 5/2005 | Krull et al. |
| 7,081,905 B1 | 7/2006 | Raghunath |
| 7,130,664 B1 | 10/2006 | Williams |
| 7,305,350 B1 | 12/2007 | Bruecken |
| 7,463,304 B2 | 12/2008 | Murray |
| 7,537,162 B1 | 5/2009 | Siu |
| 7,571,014 B1 | 8/2009 | Lambourne et al. |
| 7,614,008 B2 | 11/2009 | Ording |
| 7,633,076 B2 | 12/2009 | Huppi et al. |
| 7,644,019 B2 | 1/2010 | Woda et al. |
| 7,653,883 B2 | 1/2010 | Hotelling et al. |
| 7,656,393 B2 | 2/2010 | King et al. |
| 7,657,849 B2 | 2/2010 | Chaudhri et al. |
| 7,663,607 B2 | 2/2010 | Hotelling et al. |
| 7,843,471 B2 | 11/2010 | Doan et al. |
| 7,844,914 B2 | 11/2010 | Andre et al. |
| 7,890,422 B1 | 2/2011 | Hirka et al. |
| 7,905,815 B2 | 3/2011 | Ellis et al. |
| 7,957,762 B2 | 6/2011 | Herz et al. |
| 8,006,002 B2 | 8/2011 | Kalayjian et al. |
| 8,050,997 B1 | 11/2011 | Nosek et al. |
| 8,121,945 B2 | 2/2012 | Rackley et al. |
| 8,189,087 B2 | 5/2012 | Misawa et al. |
| 8,195,507 B2 | 6/2012 | Postrel |
| 8,196,043 B2 | 6/2012 | Crow et al. |
| 8,239,784 B2 | 8/2012 | Hotelling et al. |
| 8,279,180 B2 | 10/2012 | Hotelling et al. |
| 8,290,603 B1 | 10/2012 | Lambourne |
| 8,381,135 B2 | 2/2013 | Hotelling et al. |
| 8,392,259 B2 | 3/2013 | Macgillivray et al. |
| 8,453,940 B2 | 6/2013 | Diamond |
| 8,479,122 B2 | 7/2013 | Hotelling et al. |
| 8,554,694 B1 | 10/2013 | Ward et al. |
| 8,624,836 B1 | 1/2014 | Miller et al. |
| 8,675,084 B2 | 3/2014 | Bolton et al. |
| 8,706,628 B2 | 4/2014 | Phillips |
| 8,742,890 B2 | 6/2014 | Gocho et al. |
| 8,762,895 B2 | 6/2014 | Mehta et al. |
| 8,763,896 B2 | 7/2014 | Kushevsky et al. |
| 8,831,677 B2 | 9/2014 | Villa-Real |
| 8,892,474 B1 | 11/2014 | Inskeep et al. |
| 8,894,462 B2 | 11/2014 | Huang et al. |
| 8,924,894 B1 | 12/2014 | Yaksick et al. |
| 8,931,703 B1 | 1/2015 | Mullen et al. |
| 8,983,539 B1 | 3/2015 | Kim et al. |
| 9,071,945 B1 | 6/2015 | Rubin et al. |
| 9,112,849 B1 | 8/2015 | Werkelin Ahlin et al. |
| 9,146,124 B2 | 9/2015 | Parada et al. |
| 9,171,268 B1 | 10/2015 | Penilla et al. |
| 9,172,866 B2 | 10/2015 | Ito et al. |
| 9,223,296 B2 | 12/2015 | Yang et al. |
| 9,324,067 B2 | 4/2016 | Van Os et al. |
| 9,369,537 B1 | 6/2016 | Mathew et al. |
| D765,118 S | 8/2016 | Bachman et al. |
| 9,405,766 B2 | 8/2016 | Robbin et al. |
| 9,423,868 B2 | 8/2016 | Iwasaki |
| 9,451,144 B2 | 9/2016 | Dye |
| 9,462,340 B1 * | 10/2016 | Mathurin ............ H04N 21/8106 |
| 9,483,763 B2 | 11/2016 | Van Os et al. |
| D773,510 S | 12/2016 | Foss et al. |
| 9,544,563 B1 | 1/2017 | Cheng et al. |
| 9,547,419 B2 | 1/2017 | Yang et al. |
| 9,560,629 B2 * | 1/2017 | Migicovsky ...... H04M 1/72484 |
| 9,574,896 B2 | 2/2017 | Mcgavran et al. |
| 9,594,354 B1 | 3/2017 | Kahn et al. |
| 9,628,950 B1 | 4/2017 | Noeth et al. |
| 9,652,741 B2 | 5/2017 | Goldberg et al. |
| D789,381 S | 6/2017 | Okumura et al. |
| 9,704,386 B2 | 7/2017 | Yoon et al. |
| 9,753,543 B2 | 9/2017 | Jeon et al. |
| 9,820,323 B1 | 11/2017 | Young et al. |
| 9,832,697 B2 | 11/2017 | Kotecha et al. |
| 9,892,715 B2 | 2/2018 | Komulainen et al. |
| 9,927,957 B1 | 3/2018 | Sagar et al. |
| 9,942,463 B2 | 4/2018 | Kuo et al. |
| 9,973,674 B2 | 5/2018 | Dye et al. |
| 10,019,599 B1 | 7/2018 | Moran et al. |
| 10,135,905 B2 | 11/2018 | Chaudhri et al. |
| 10,182,138 B2 | 1/2019 | Motika et al. |
| 10,216,392 B2 | 2/2019 | Zhao |
| 10,299,300 B1 | 5/2019 | Young |
| 10,310,697 B2 * | 6/2019 | Roberts ............ H04N 21/47214 |

(56) References Cited

U.S. PATENT DOCUMENTS

| | | |
|---|---|---|
| 10,324,590 B2 | 6/2019 | Yang et al. |
| 10,356,070 B2 | 7/2019 | Cha et al. |
| 10,466,881 B2 | 11/2019 | Sasaki et al. |
| 10,524,300 B2 | 12/2019 | Ueda et al. |
| 10,627,914 B2 | 4/2020 | Ang et al. |
| 10,643,246 B1 | 5/2020 | Suprasadachandran Pillai |
| 10,671,174 B2 | 6/2020 | Ang et al. |
| 10,684,693 B2 | 6/2020 | Kletsov et al. |
| 10,721,711 B2 | 7/2020 | Kirov et al. |
| 10,802,598 B2 | 10/2020 | Ang et al. |
| 10,966,149 B2 | 3/2021 | Yoon et al. |
| 11,048,334 B2 | 6/2021 | Rothberg et al. |
| 11,050,873 B2 | 6/2021 | Kim et al. |
| 11,099,647 B2 | 8/2021 | Ang et al. |
| 11,543,887 B2 | 1/2023 | Ang et al. |
| 2001/0030597 A1 | 10/2001 | Inoue et al. |
| 2001/0031622 A1 | 10/2001 | Kivela et al. |
| 2002/0015024 A1 | 2/2002 | Westerman et al. |
| 2002/0029169 A1 | 3/2002 | Oki et al. |
| 2002/0068600 A1 | 6/2002 | Chihara et al. |
| 2002/0087262 A1 | 7/2002 | Bullock et al. |
| 2002/0140803 A1 | 10/2002 | Gutta et al. |
| 2002/0142734 A1 | 10/2002 | Wickstead |
| 2002/0171737 A1 | 11/2002 | Tullis et al. |
| 2003/0006280 A1 | 1/2003 | Seita et al. |
| 2003/0025802 A1 | 2/2003 | Mayer, Jr. et al. |
| 2003/0128237 A1 | 7/2003 | Sakai |
| 2003/0151982 A1 | 8/2003 | Brewer et al. |
| 2003/0158927 A1 | 8/2003 | Sagey et al. |
| 2003/0171984 A1 | 9/2003 | Wodka et al. |
| 2003/0200184 A1 | 10/2003 | Dominguez et al. |
| 2004/0044953 A1 | 3/2004 | Watkins et al. |
| 2004/0100389 A1 | 5/2004 | Naito et al. |
| 2004/0254891 A1 | 12/2004 | Blinn et al. |
| 2005/0117601 A1 | 6/2005 | Anderson et al. |
| 2005/0134695 A1 | 6/2005 | Deshpande et al. |
| 2005/0187873 A1 | 8/2005 | Labrou et al. |
| 2005/0190059 A1 | 9/2005 | Wehrenberg |
| 2005/0191159 A1 | 9/2005 | Benko |
| 2005/0198319 A1 | 9/2005 | Chan et al. |
| 2005/0237194 A1 | 10/2005 | Voba et al. |
| 2005/0246642 A1 | 11/2005 | Valderas et al. |
| 2006/0000900 A1 | 1/2006 | Fernandes et al. |
| 2006/0017692 A1 | 1/2006 | Wehrenberg et al. |
| 2006/0025923 A1 | 2/2006 | Dotan et al. |
| 2006/0026536 A1 | 2/2006 | Hotelling et al. |
| 2006/0033724 A1 | 2/2006 | Chaudhri et al. |
| 2006/0079973 A1 | 4/2006 | Bacharach et al. |
| 2006/0135064 A1 | 6/2006 | Cho et al. |
| 2006/0165060 A1 | 7/2006 | Dua et al. |
| 2006/0173749 A1 | 8/2006 | Ward et al. |
| 2006/0197753 A1 | 9/2006 | Hotelling |
| 2006/0217104 A1 | 9/2006 | Cho |
| 2006/0224882 A1 | 10/2006 | Chin |
| 2006/0294025 A1 | 12/2006 | Mengerink |
| 2007/0021153 A1 | 1/2007 | Novak |
| 2007/0025711 A1 | 2/2007 | Marcus et al. |
| 2007/0040810 A1 | 2/2007 | Dowe et al. |
| 2007/0096283 A1 | 5/2007 | Ljung et al. |
| 2007/0096765 A1 | 5/2007 | Kagan |
| 2007/0109417 A1 | 5/2007 | Hyttfors et al. |
| 2007/0143495 A1 | 6/2007 | Porat |
| 2007/0162963 A1 | 7/2007 | Penet et al. |
| 2007/0165103 A1 | 7/2007 | Arima et al. |
| 2007/0180392 A1 | 8/2007 | Russo |
| 2007/0188409 A1 | 8/2007 | Repetto et al. |
| 2007/0191008 A1 | 8/2007 | Bucher et al. |
| 2007/0194110 A1 | 8/2007 | Esplin et al. |
| 2007/0194113 A1 | 8/2007 | Esplin et al. |
| 2007/0226778 A1 | 9/2007 | Pietruszka |
| 2007/0254640 A1 | 11/2007 | Bliss |
| 2007/0254712 A1 | 11/2007 | Chitti |
| 2007/0259654 A1 | 11/2007 | Oijer |
| 2008/0004113 A1 | 1/2008 | Avery et al. |
| 2008/0016443 A1 | 1/2008 | Hiroshima et al. |
| 2008/0027947 A1 | 1/2008 | Pritchett et al. |
| 2008/0040265 A1 | 2/2008 | Rackley III et al. |
| 2008/0040786 A1 | 2/2008 | Chang et al. |
| 2008/0041936 A1 | 2/2008 | Vawter |
| 2008/0077673 A1 | 3/2008 | Thomas et al. |
| 2008/0120029 A1 | 5/2008 | Zelek et al. |
| 2008/0122796 A1 | 5/2008 | Jobs et al. |
| 2008/0165136 A1 | 7/2008 | Christie et al. |
| 2008/0214191 A1 | 9/2008 | Yach et al. |
| 2008/0259829 A1 | 10/2008 | Rosenblatt |
| 2008/0284855 A1 | 11/2008 | Umeyama et al. |
| 2008/0292074 A1 | 11/2008 | Boni et al. |
| 2008/0320391 A1 | 12/2008 | Lemay et al. |
| 2009/0036165 A1 | 2/2009 | Brede |
| 2009/0037326 A1 | 2/2009 | Chitti et al. |
| 2009/0057396 A1 | 3/2009 | Barbour et al. |
| 2009/0060170 A1 | 3/2009 | Coughlan et al. |
| 2009/0068984 A1 | 3/2009 | Burnett |
| 2009/0088207 A1 | 4/2009 | Sweeney et al. |
| 2009/0102933 A1 | 4/2009 | Harris et al. |
| 2009/0143114 A1 | 6/2009 | Vargas et al. |
| 2009/0144391 A1 | 6/2009 | Jung et al. |
| 2009/0195402 A1 | 8/2009 | Izadi et al. |
| 2009/0195497 A1 | 8/2009 | Fitzgerald et al. |
| 2009/0199130 A1 | 8/2009 | Tsern et al. |
| 2009/0203315 A1 | 8/2009 | Kawabata et al. |
| 2009/0207743 A1 | 8/2009 | Huq et al. |
| 2009/0210308 A1 | 8/2009 | Toomer et al. |
| 2009/0222748 A1 | 9/2009 | Lejeune et al. |
| 2009/0225060 A1 | 9/2009 | Rizoiu et al. |
| 2009/0228868 A1 | 9/2009 | Forstall et al. |
| 2009/0231960 A1 | 9/2009 | Hutcheson |
| 2009/0239587 A1 | 9/2009 | Negron et al. |
| 2009/0284476 A1 | 11/2009 | Bull et al. |
| 2009/0311993 A1 | 12/2009 | Horodezky |
| 2009/0315671 A1 | 12/2009 | Gocho et al. |
| 2009/0325630 A1 | 12/2009 | Tiitola et al. |
| 2010/0026640 A1 | 2/2010 | Kim et al. |
| 2010/0054497 A1 | 3/2010 | Bull et al. |
| 2010/0082481 A1 | 4/2010 | Lin et al. |
| 2010/0114731 A1 | 5/2010 | Kingston et al. |
| 2010/0125785 A1 | 5/2010 | Moore et al. |
| 2010/0131190 A1 | 5/2010 | Terauchi et al. |
| 2010/0138764 A1 | 6/2010 | Hatambeiki et al. |
| 2010/0149090 A1 | 6/2010 | Morris et al. |
| 2010/0153265 A1 | 6/2010 | Hershfield et al. |
| 2010/0162160 A1 | 6/2010 | Stallings et al. |
| 2010/0169790 A1 | 7/2010 | Vaughan et al. |
| 2010/0178873 A1 | 7/2010 | Lee et al. |
| 2010/0185446 A1 | 7/2010 | Homma et al. |
| 2010/0223145 A1 | 9/2010 | Dragt |
| 2010/0228836 A1 | 9/2010 | Lehtovirta et al. |
| 2010/0267362 A1 | 10/2010 | Smith et al. |
| 2010/0272250 A1 | 10/2010 | Yap et al. |
| 2010/0284389 A1 | 11/2010 | Ramsay et al. |
| 2010/0287513 A1 | 11/2010 | Singh et al. |
| 2010/0289740 A1 | 11/2010 | Kim et al. |
| 2010/0289910 A1 | 11/2010 | Kamshilin et al. |
| 2010/0321201 A1 | 12/2010 | Huang et al. |
| 2011/0016425 A1 | 1/2011 | Homburg et al. |
| 2011/0029750 A1 | 2/2011 | Jang et al. |
| 2011/0058052 A1 | 3/2011 | Bolton et al. |
| 2011/0059769 A1 | 3/2011 | Brunolli |
| 2011/0078025 A1 | 3/2011 | Shrivastav et al. |
| 2011/0081860 A1 | 4/2011 | Brown et al. |
| 2011/0099079 A1 | 4/2011 | White et al. |
| 2011/0106921 A1 | 5/2011 | Brown et al. |
| 2011/0111735 A1 | 5/2011 | Pietrow |
| 2011/0115932 A1 | 5/2011 | Shin et al. |
| 2011/0130168 A1 | 6/2011 | Vendrow et al. |
| 2011/0138284 A1 | 6/2011 | Wigdor et al. |
| 2011/0145049 A1 | 6/2011 | Hertel et al. |
| 2011/0153628 A1 | 6/2011 | Basu et al. |
| 2011/0159469 A1 | 6/2011 | Hwang et al. |
| 2011/0159927 A1 | 6/2011 | Choi |
| 2011/0159959 A1 | 6/2011 | Mallinson et al. |
| 2011/0181520 A1 | 7/2011 | Boda et al. |
| 2011/0183613 A1 | 7/2011 | Nocera |
| 2011/0225426 A1 | 9/2011 | Agarwal et al. |

(56) References Cited

U.S. PATENT DOCUMENTS

| | | |
|---|---|---|
| 2011/0225492 A1 | 9/2011 | Boettcher et al. |
| 2011/0237221 A1 | 9/2011 | Prakash et al. |
| 2011/0250895 A1 | 10/2011 | Wohlert et al. |
| 2011/0251892 A1 | 10/2011 | Laracey |
| 2011/0252318 A1 | 10/2011 | Helms |
| 2011/0316884 A1 | 12/2011 | Giambalvo et al. |
| 2012/0019400 A1 | 1/2012 | Patel et al. |
| 2012/0036029 A1 | 2/2012 | Esplin et al. |
| 2012/0036556 A1 | 2/2012 | Lebeau et al. |
| 2012/0044062 A1 | 2/2012 | Jersa et al. |
| 2012/0051560 A1 | 3/2012 | Sanders |
| 2012/0069206 A1 | 3/2012 | Hsieh |
| 2012/0071146 A1 | 3/2012 | Shrivastava et al. |
| 2012/0078751 A1 | 3/2012 | Macphail et al. |
| 2012/0084210 A1 | 4/2012 | Farahmand |
| 2012/0089300 A1 | 4/2012 | Wolterman et al. |
| 2012/0089507 A1 | 4/2012 | Zhang et al. |
| 2012/0115608 A1 | 5/2012 | Pfeifer et al. |
| 2012/0116669 A1 | 5/2012 | Lee et al. |
| 2012/0120277 A1 | 5/2012 | Tsai et al. |
| 2012/0123937 A1 | 5/2012 | Spodak et al. |
| 2012/0136780 A1 | 5/2012 | El-Awady et al. |
| 2012/0191603 A1 | 7/2012 | Nuzzi |
| 2012/0192094 A1 | 7/2012 | Goertz et al. |
| 2012/0197419 A1 | 8/2012 | Dhruv et al. |
| 2012/0198531 A1 | 8/2012 | Ort et al. |
| 2012/0221464 A1 | 8/2012 | Pasquero et al. |
| 2012/0236037 A1 | 9/2012 | Lessing et al. |
| 2012/0245985 A1 | 9/2012 | Cho et al. |
| 2012/0266093 A1 | 10/2012 | Park et al. |
| 2012/0284297 A1 | 11/2012 | Aguera-Arcas et al. |
| 2012/0287290 A1 | 11/2012 | Jain et al. |
| 2012/0290449 A1 | 11/2012 | Mullen et al. |
| 2012/0303268 A1 | 11/2012 | Su et al. |
| 2012/0310760 A1 | 12/2012 | Phillips et al. |
| 2012/0316777 A1 | 12/2012 | Kitta et al. |
| 2012/0320141 A1 | 12/2012 | Bowen et al. |
| 2012/0322370 A1 | 12/2012 | Lee |
| 2012/0322371 A1 | 12/2012 | Lee |
| 2013/0016048 A1 | 1/2013 | So et al. |
| 2013/0016818 A1 | 1/2013 | Cohn |
| 2013/0017846 A1 | 1/2013 | Schoppe |
| 2013/0027341 A1 | 1/2013 | Mastandrea |
| 2013/0038771 A1 | 2/2013 | Brunner et al. |
| 2013/0047034 A1 | 2/2013 | Salomon et al. |
| 2013/0050263 A1 | 2/2013 | Khoe et al. |
| 2013/0057472 A1 | 3/2013 | Dizac et al. |
| 2013/0065482 A1 | 3/2013 | Trickett et al. |
| 2013/0076591 A1 | 3/2013 | Sirpal et al. |
| 2013/0080272 A1 | 3/2013 | Ronca et al. |
| 2013/0080275 A1 | 3/2013 | Ronca et al. |
| 2013/0085931 A1 | 4/2013 | Runyan |
| 2013/0093904 A1 | 4/2013 | Wagner et al. |
| 2013/0102298 A1 | 4/2013 | Goodman et al. |
| 2013/0103519 A1 | 4/2013 | Kountotsis et al. |
| 2013/0106603 A1 | 5/2013 | Weast et al. |
| 2013/0110719 A1 | 5/2013 | Carter et al. |
| 2013/0111550 A1 | 5/2013 | Naveh et al. |
| 2013/0115932 A1 | 5/2013 | Williams et al. |
| 2013/0117693 A1 | 5/2013 | Anderson et al. |
| 2013/0124423 A1 | 5/2013 | Fisher |
| 2013/0125016 A1 | 5/2013 | Pallakoff et al. |
| 2013/0134212 A1 | 5/2013 | Chang et al. |
| 2013/0138272 A1 | 5/2013 | Louise-Babando et al. |
| 2013/0141325 A1 | 6/2013 | Bailey et al. |
| 2013/0141331 A1 | 6/2013 | Shiu et al. |
| 2013/0141362 A1 | 6/2013 | Asanuma et al. |
| 2013/0143512 A1 | 6/2013 | Hernandez et al. |
| 2013/0145316 A1 | 6/2013 | Heo |
| 2013/0162411 A1 | 6/2013 | Moses et al. |
| 2013/0166679 A1 | 6/2013 | Kuwahara et al. |
| 2013/0168444 A1 | 7/2013 | Hsieh et al. |
| 2013/0189963 A1 | 7/2013 | Epp et al. |
| 2013/0200146 A1 | 8/2013 | Moghadam et al. |
| 2013/0201098 A1 | 8/2013 | Schilit et al. |
| 2013/0218721 A1 | 8/2013 | Borhan et al. |
| 2013/0219285 A1 | 8/2013 | Iwasaki et al. |
| 2013/0219303 A1 | 8/2013 | Eriksson et al. |
| 2013/0222270 A1 | 8/2013 | Winkler et al. |
| 2013/0223279 A1 | 8/2013 | Tinnakornsrisuphap et al. |
| 2013/0225152 A1 | 8/2013 | Matthews et al. |
| 2013/0244615 A1 | 9/2013 | Miller |
| 2013/0244633 A1 | 9/2013 | Jacobs et al. |
| 2013/0246202 A1 | 9/2013 | Tobin et al. |
| 2013/0254574 A1 | 9/2013 | Zacchio et al. |
| 2013/0286251 A1 | 10/2013 | Wood et al. |
| 2013/0304651 A1 | 11/2013 | Smith et al. |
| 2013/0314204 A1 | 11/2013 | Ho et al. |
| 2013/0320080 A1 | 12/2013 | Olson et al. |
| 2013/0322665 A1 | 12/2013 | Bennett et al. |
| 2013/0325524 A1 | 12/2013 | Boudville |
| 2013/0329074 A1 | 12/2013 | Zhang et al. |
| 2013/0329924 A1 | 12/2013 | Fleizach et al. |
| 2013/0331130 A1 | 12/2013 | Lee |
| 2013/0332358 A1 | 12/2013 | Zhao |
| 2013/0332364 A1 | 12/2013 | Templeton et al. |
| 2013/0339436 A1 | 12/2013 | Gray |
| 2013/0345975 A1 | 12/2013 | Vulcano et al. |
| 2013/0346273 A1 | 12/2013 | Stockton et al. |
| 2013/0346302 A1 | 12/2013 | Purves et al. |
| 2013/0346882 A1 | 12/2013 | Shiplacoff et al. |
| 2014/0003597 A1 | 1/2014 | Lazaridis et al. |
| 2014/0006285 A1 | 1/2014 | Chi et al. |
| 2014/0006949 A1 | 1/2014 | Briand et al. |
| 2014/0007021 A1 | 1/2014 | Akiyama et al. |
| 2014/0015546 A1 | 1/2014 | Frederick et al. |
| 2014/0022399 A1 | 1/2014 | Rashid et al. |
| 2014/0025513 A1 | 1/2014 | Cooke et al. |
| 2014/0028546 A1 | 1/2014 | Jeon et al. |
| 2014/0033100 A1 | 1/2014 | Noda et al. |
| 2014/0037107 A1 | 2/2014 | Marino et al. |
| 2014/0040831 A1 | 2/2014 | Akasaka et al. |
| 2014/0058860 A1 | 2/2014 | Roh et al. |
| 2014/0058935 A1 | 2/2014 | Mijares |
| 2014/0064155 A1 | 3/2014 | Evans et al. |
| 2014/0068526 A1 | 3/2014 | Figelman et al. |
| 2014/0068751 A1 | 3/2014 | Last |
| 2014/0068755 A1 | 3/2014 | King et al. |
| 2014/0073252 A1 | 3/2014 | Lee et al. |
| 2014/0074407 A1 | 3/2014 | Hernandez-Silveira et al. |
| 2014/0074716 A1 | 3/2014 | Ni |
| 2014/0074717 A1 | 3/2014 | Evans et al. |
| 2014/0075003 A1 | 3/2014 | Tanaka et al. |
| 2014/0075311 A1 | 3/2014 | Boettcher et al. |
| 2014/0078371 A1 | 3/2014 | Kinoshita |
| 2014/0081854 A1 | 3/2014 | Sanchez et al. |
| 2014/0084857 A1 | 3/2014 | Liu et al. |
| 2014/0094124 A1 | 4/2014 | Dave et al. |
| 2014/0094143 A1 | 4/2014 | Ayotte |
| 2014/0101056 A1 | 4/2014 | Wendling |
| 2014/0104449 A1 | 4/2014 | Masarik et al. |
| 2014/0118563 A1 | 5/2014 | Mehta et al. |
| 2014/0122331 A1 | 5/2014 | Vaish et al. |
| 2014/0123043 A1 | 5/2014 | Schmidt et al. |
| 2014/0128035 A1 | 5/2014 | Sweeney |
| 2014/0129435 A1 | 5/2014 | Pardo et al. |
| 2014/0129441 A1 | 5/2014 | Blanco et al. |
| 2014/0134947 A1 | 5/2014 | Stouder-Studenmund |
| 2014/0141721 A1 | 5/2014 | Kim et al. |
| 2014/0142851 A1 | 5/2014 | Larmo et al. |
| 2014/0143145 A1 | 5/2014 | Kortina et al. |
| 2014/0143678 A1 | 5/2014 | Mistry et al. |
| 2014/0143737 A1 | 5/2014 | Mistry et al. |
| 2014/0149198 A1 | 5/2014 | Kim et al. |
| 2014/0149859 A1 | 5/2014 | Van Dyken et al. |
| 2014/0155031 A1 | 6/2014 | Lee et al. |
| 2014/0156801 A1 | 6/2014 | Fernandes et al. |
| 2014/0160033 A1 | 6/2014 | Brikman et al. |
| 2014/0160078 A1 | 6/2014 | Seo et al. |
| 2014/0160304 A1 | 6/2014 | Galor et al. |
| 2014/0164241 A1 | 6/2014 | Neuwirth et al. |
| 2014/0164544 A1 | 6/2014 | Gagneraud |
| 2014/0164907 A1 | 6/2014 | Jung et al. |
| 2014/0164930 A1 | 6/2014 | Lieb et al. |

(56) References Cited

U.S. PATENT DOCUMENTS

| | | |
|---|---|---|
| 2014/0167986 A1 | 6/2014 | Parada et al. |
| 2014/0168056 A1 | 6/2014 | Swaminathan et al. |
| 2014/0173455 A1 | 6/2014 | Shimizu et al. |
| 2014/0180582 A1 | 6/2014 | Pontarelli et al. |
| 2014/0181654 A1 | 6/2014 | Kumar et al. |
| 2014/0184524 A1 | 7/2014 | Schiefer et al. |
| 2014/0187163 A1 | 7/2014 | Fujita |
| 2014/0188673 A1 | 7/2014 | Graham et al. |
| 2014/0191715 A1 | 7/2014 | Wechlin et al. |
| 2014/0195943 A1 | 7/2014 | Zheng et al. |
| 2014/0204229 A1 | 7/2014 | Leung et al. |
| 2014/0210708 A1 | 7/2014 | Simmons et al. |
| 2014/0218599 A1 | 8/2014 | Nakamura et al. |
| 2014/0228063 A1 | 8/2014 | Harris et al. |
| 2014/0237389 A1 | 8/2014 | Ryall et al. |
| 2014/0240216 A1 | 8/2014 | Bukurak et al. |
| 2014/0240577 A1 | 8/2014 | Masugi |
| 2014/0244495 A1 | 8/2014 | Davis et al. |
| 2014/0269614 A1 | 9/2014 | Maguire et al. |
| 2014/0273975 A1 | 9/2014 | Barat et al. |
| 2014/0279442 A1 | 9/2014 | Luoma et al. |
| 2014/0279497 A1 | 9/2014 | Qaim-Maqami et al. |
| 2014/0279556 A1 | 9/2014 | Priebatsch et al. |
| 2014/0282068 A1 | 9/2014 | Levkovitz et al. |
| 2014/0302834 A1 | 10/2014 | Jones |
| 2014/0310350 A1 | 10/2014 | Borggaard et al. |
| 2014/0310598 A1 | 10/2014 | Sprague et al. |
| 2014/0320387 A1 | 10/2014 | Eriksson et al. |
| 2014/0328147 A1 | 11/2014 | Yang et al. |
| 2014/0331314 A1 | 11/2014 | Fujioka |
| 2014/0333602 A1 | 11/2014 | Yang et al. |
| 2014/0337207 A1 | 11/2014 | Ye et al. |
| 2014/0337450 A1 | 11/2014 | Choudhary et al. |
| 2014/0337748 A1 | 11/2014 | Lee |
| 2014/0343843 A1 | 11/2014 | Yanku |
| 2014/0344951 A1 | 11/2014 | Brewer |
| 2014/0358707 A1 | 12/2014 | Perkins et al. |
| 2014/0359124 A1 | 12/2014 | Adimatyam et al. |
| 2014/0359454 A1 | 12/2014 | Lee et al. |
| 2014/0359481 A1 | 12/2014 | Graham et al. |
| 2014/0365113 A1 | 12/2014 | Yue et al. |
| 2014/0368719 A1 | 12/2014 | Kaneko et al. |
| 2014/0370807 A1 | 12/2014 | Pierce et al. |
| 2014/0380187 A1 | 12/2014 | Gardenfors et al. |
| 2015/0006376 A1 | 1/2015 | Paulson et al. |
| 2015/0011199 A1* | 1/2015 | Lee .................. G06F 1/163 455/418 |
| 2015/0012425 A1 | 1/2015 | Mathew |
| 2015/0017956 A1 | 1/2015 | Jeong |
| 2015/0019981 A1 | 1/2015 | Petitt et al. |
| 2015/0019982 A1 | 1/2015 | Petitt et al. |
| 2015/0022438 A1 | 1/2015 | Hong |
| 2015/0022674 A1 | 1/2015 | Koss et al. |
| 2015/0026615 A1 | 1/2015 | Choi et al. |
| 2015/0026647 A1 | 1/2015 | Park et al. |
| 2015/0033136 A1 | 1/2015 | Sasaki et al. |
| 2015/0035762 A1 | 2/2015 | Lu |
| 2015/0036853 A1* | 2/2015 | Solum .................. H04R 25/558 381/315 |
| 2015/0039494 A1 | 2/2015 | Sinton et al. |
| 2015/0044965 A1 | 2/2015 | Kurimoto et al. |
| 2015/0049033 A1 | 2/2015 | Kim et al. |
| 2015/0049233 A1 | 2/2015 | Choi |
| 2015/0051846 A1 | 2/2015 | Masuya |
| 2015/0058146 A1 | 2/2015 | Aissi et al. |
| 2015/0061842 A1 | 3/2015 | Yoon et al. |
| 2015/0061972 A1 | 3/2015 | Kang et al. |
| 2015/0065035 A1 | 3/2015 | Son et al. |
| 2015/0066758 A1 | 3/2015 | Denardis et al. |
| 2015/0067580 A1 | 3/2015 | Um et al. |
| 2015/0094031 A1 | 4/2015 | Liu |
| 2015/0094050 A1 | 4/2015 | Bowles et al. |
| 2015/0094093 A1 | 4/2015 | Pierce et al. |
| 2015/0100621 A1* | 4/2015 | Pan .................. H04L 67/141 709/203 |
| 2015/0106221 A1 | 4/2015 | Tapley et al. |
| 2015/0121231 A1 | 4/2015 | Edwardson et al. |
| 2015/0121405 A1 | 4/2015 | Ates et al. |
| 2015/0127539 A1 | 5/2015 | Ye et al. |
| 2015/0131121 A1 | 5/2015 | Kang |
| 2015/0189162 A1 | 7/2015 | Kuo et al. |
| 2015/0193130 A1 | 7/2015 | Cho et al. |
| 2015/0193138 A1* | 7/2015 | Relyea .................. G06F 3/04812 715/823 |
| 2015/0194050 A1 | 7/2015 | Lee |
| 2015/0205511 A1 | 7/2015 | Vinna et al. |
| 2015/0242065 A1 | 8/2015 | Ko et al. |
| 2015/0243246 A1 | 8/2015 | Mun et al. |
| 2015/0257004 A1 | 9/2015 | Shanmugam et al. |
| 2015/0261493 A1 | 9/2015 | Lemmon et al. |
| 2015/0264202 A1 | 9/2015 | Pawlowski |
| 2015/0287403 A1 | 10/2015 | Holzer Zaslansky et al. |
| 2015/0297185 A1 | 10/2015 | Mccormack et al. |
| 2015/0312617 A1* | 10/2015 | Chen .................. G06F 3/03547 348/734 |
| 2015/0339261 A1 | 11/2015 | Jha et al. |
| 2015/0339652 A1 | 11/2015 | Park et al. |
| 2015/0346834 A1 | 12/2015 | Martinez Fernandez et al. |
| 2015/0348001 A1 | 12/2015 | Van Os et al. |
| 2015/0348002 A1 | 12/2015 | Van et al. |
| 2015/0348009 A1 | 12/2015 | Rosen et al. |
| 2015/0348014 A1 | 12/2015 | Van Os et al. |
| 2015/0348029 A1 | 12/2015 | Van Os et al. |
| 2015/0350029 A1 | 12/2015 | Skrobotov |
| 2015/0350448 A1 | 12/2015 | Coffman et al. |
| 2015/0358043 A1 | 12/2015 | Jeong et al. |
| 2015/0373172 A1 | 12/2015 | Boesen |
| 2016/0014266 A1 | 1/2016 | Bhatt |
| 2016/0018846 A1* | 1/2016 | Zenoff .................. G06F 1/1647 345/204 |
| 2016/0021168 A1 | 1/2016 | Chaudhri et al. |
| 2016/0026425 A1 | 1/2016 | Lee et al. |
| 2016/0028869 A1 | 1/2016 | Bhatt |
| 2016/0043905 A1 | 2/2016 | Fiedler |
| 2016/0048369 A1 | 2/2016 | Zenoff |
| 2016/0048370 A1 | 2/2016 | Zenoff |
| 2016/0048705 A1 | 2/2016 | Yang |
| 2016/0050476 A1 | 2/2016 | Patil |
| 2016/0054710 A1 | 2/2016 | Jo et al. |
| 2016/0061613 A1 | 3/2016 | Jung et al. |
| 2016/0061623 A1 | 3/2016 | Pahwa et al. |
| 2016/0062567 A1 | 3/2016 | Yang et al. |
| 2016/0062572 A1 | 3/2016 | Yang et al. |
| 2016/0062606 A1 | 3/2016 | Vega et al. |
| 2016/0062719 A1 | 3/2016 | Romano et al. |
| 2016/0092053 A1 | 3/2016 | Loganathan et al. |
| 2016/0116941 A1 | 4/2016 | Kuwabara et al. |
| 2016/0134737 A1 | 5/2016 | Pulletikurty |
| 2016/0142763 A1 | 5/2016 | Kim et al. |
| 2016/0156597 A1 | 6/2016 | Meng et al. |
| 2016/0156957 A1 | 6/2016 | Yun |
| 2016/0165037 A1 | 6/2016 | Youn et al. |
| 2016/0191511 A1 | 6/2016 | Tijerina et al. |
| 2016/0195864 A1 | 7/2016 | Kim |
| 2016/0202866 A1 | 7/2016 | Zambetti |
| 2016/0209939 A1 | 7/2016 | Zambetti et al. |
| 2016/0238402 A1 | 8/2016 | Mcgavran et al. |
| 2016/0246566 A1 | 8/2016 | Fullerton et al. |
| 2016/0253665 A1 | 9/2016 | Van Os et al. |
| 2016/0259489 A1 | 9/2016 | Yang |
| 2016/0260414 A1 | 9/2016 | Yang |
| 2016/0269176 A1 | 9/2016 | Pang et al. |
| 2016/0313875 A1 | 10/2016 | Williams et al. |
| 2016/0327911 A1 | 11/2016 | Eim et al. |
| 2016/0337206 A1 | 11/2016 | Bugenhagen et al. |
| 2016/0345039 A1 | 11/2016 | Billmeyer |
| 2016/0357507 A1 | 12/2016 | Decker et al. |
| 2016/0358133 A1 | 12/2016 | Van Os et al. |
| 2016/0358134 A1 | 12/2016 | Van Os et al. |
| 2016/0358180 A1 | 12/2016 | Van Os et al. |
| 2017/0004507 A1 | 1/2017 | Henderson et al. |
| 2017/0006210 A1 | 1/2017 | Dye et al. |
| 2017/0011210 A1 | 1/2017 | Cheong et al. |
| 2017/0031648 A1 | 2/2017 | So et al. |

(56) References Cited

U.S. PATENT DOCUMENTS

| | | |
|---|---|---|
| 2017/0032375 A1 | 2/2017 | Van Os et al. |
| 2017/0034253 A1 | 2/2017 | Jiang et al. |
| 2017/0053542 A1 | 2/2017 | Wilson et al. |
| 2017/0083188 A1 | 3/2017 | Yang et al. |
| 2017/0134553 A1 | 5/2017 | Jeon et al. |
| 2017/0134872 A1 | 5/2017 | Silva et al. |
| 2017/0149795 A1 | 5/2017 | Day, II |
| 2017/0156110 A1 | 6/2017 | Ueno et al. |
| 2017/0160098 A1 | 6/2017 | Mcgavran et al. |
| 2017/0180843 A1 | 6/2017 | Perianu et al. |
| 2017/0185373 A1 | 6/2017 | Kim et al. |
| 2017/0195772 A1 | 7/2017 | Han et al. |
| 2017/0205854 A1 | 7/2017 | Zenoff |
| 2017/0230236 A1 | 8/2017 | Kim et al. |
| 2017/0322711 A1 | 11/2017 | Robinson et al. |
| 2017/0322713 A1 | 11/2017 | Hwang et al. |
| 2017/0331901 A1 | 11/2017 | Sarlandie De La Robertie et al. |
| 2017/0357426 A1 | 12/2017 | Wilson et al. |
| 2017/0357477 A1 | 12/2017 | Im et al. |
| 2018/0067712 A1 | 3/2018 | Behzadi et al. |
| 2018/0069957 A1 | 3/2018 | Mushikabe et al. |
| 2018/0137266 A1 | 5/2018 | Kim et al. |
| 2018/0199137 A1 | 7/2018 | Mate et al. |
| 2018/0218636 A1 | 8/2018 | Alaouf et al. |
| 2018/0253151 A1 | 9/2018 | Kletsov et al. |
| 2018/0259915 A1 | 9/2018 | Hosoi et al. |
| 2018/0262677 A1 | 9/2018 | Dye et al. |
| 2018/0267773 A1 | 9/2018 | Kim et al. |
| 2018/0288560 A1 | 10/2018 | Naik et al. |
| 2018/0321842 A1 | 11/2018 | Lee et al. |
| 2018/0329585 A1 | 11/2018 | Carrigan et al. |
| 2018/0329586 A1 | 11/2018 | Sundstrom et al. |
| 2018/0335903 A1 | 11/2018 | Coffman et al. |
| 2018/0341448 A1 | 11/2018 | Behzadi et al. |
| 2018/0352435 A1 | 12/2018 | Donley et al. |
| 2019/0028865 A1 | 1/2019 | Raleigh et al. |
| 2019/0037004 A1 | 1/2019 | Chaudhri et al. |
| 2019/0121300 A1 | 4/2019 | Peterson et al. |
| 2019/0129661 A1 | 5/2019 | Hirota et al. |
| 2019/0146422 A1 | 5/2019 | Meyer et al. |
| 2019/0182749 A1 | 6/2019 | Breaux et al. |
| 2019/0187861 A1 | 6/2019 | Yang |
| 2019/0196600 A1 | 6/2019 | Rothberg et al. |
| 2019/0238675 A1 | 8/2019 | Soni et al. |
| 2019/0265849 A1 | 8/2019 | Yang et al. |
| 2019/0281547 A1 | 9/2019 | Yoon et al. |
| 2019/0297439 A1 | 9/2019 | Maeda |
| 2019/0306607 A1 | 10/2019 | Clayton et al. |
| 2019/0340348 A1 | 11/2019 | Yu et al. |
| 2019/0347181 A1 | 11/2019 | Cranfill et al. |
| 2019/0349469 A1 | 11/2019 | Skogen et al. |
| 2019/0370094 A1 | 12/2019 | Louch et al. |
| 2019/0372862 A1 | 12/2019 | Carrigan et al. |
| 2020/0042088 A1 | 2/2020 | Ang et al. |
| 2020/0042089 A1 | 2/2020 | Ang et al. |
| 2020/0042145 A1 | 2/2020 | Williams et al. |
| 2020/0042311 A1 | 2/2020 | Shin |
| 2020/0067245 A1 | 2/2020 | Maley |
| 2020/0159374 A1 | 5/2020 | Yang et al. |
| 2020/0213437 A1 | 7/2020 | Bhatt |
| 2020/0228646 A1 | 7/2020 | Hotes et al. |
| 2020/0285379 A1 | 9/2020 | George-Svahn |
| 2020/0342144 A1 | 10/2020 | Alameh et al. |
| 2020/0356252 A1 | 11/2020 | Ko et al. |
| 2020/0356687 A1 | 11/2020 | Salzman et al. |
| 2020/0359204 A1 | 11/2020 | Hawkins et al. |
| 2020/0379712 A1 | 12/2020 | Carrigan |
| 2020/0379713 A1 | 12/2020 | Carrigan |
| 2020/0379716 A1 | 12/2020 | Carrigan et al. |
| 2021/0216654 A1 | 7/2021 | Ko et al. |
| 2021/0263702 A1 | 8/2021 | Carrigan |
| 2021/0373718 A1 | 12/2021 | Yang et al. |
| 2021/0407507 A1 | 12/2021 | Zhou et al. |
| 2022/0043626 A1 | 2/2022 | Carrigan |
| 2022/0083183 A1 | 3/2022 | Patton |
| 2022/0101719 A1 | 3/2022 | Bojic et al. |
| 2022/0276780 A1 | 9/2022 | Ko et al. |
| 2023/0052490 A1 | 2/2023 | Chaudhri et al. |
| 2023/0131489 A1 | 4/2023 | Marzorati et al. |
| 2023/0179700 A1 | 6/2023 | Bhatt |
| 2023/0252737 A1 | 8/2023 | Dreyer et al. |
| 2023/0335139 A1* | 10/2023 | Breton .................. G10L 17/22 |
| 2023/0376193 A1 | 11/2023 | Han et al. |
| 2023/0376268 A1 | 11/2023 | Carrigan et al. |
| 2024/0220009 A1 | 7/2024 | Dryer et al. |

FOREIGN PATENT DOCUMENTS

| | | |
|---|---|---|
| CN | 1556955 A | 12/2004 |
| CN | 1705346 A | 12/2005 |
| CN | 101171604 A | 4/2008 |
| CN | 101243383 A | 8/2008 |
| CN | 101427574 A | 5/2009 |
| CN | 101433034 A | 5/2009 |
| CN | 101730907 A | 6/2010 |
| CN | 101877748 A | 11/2010 |
| CN | 102282578 A | 12/2011 |
| CN | 202309894 U | 7/2012 |
| CN | 102830795 A | 12/2012 |
| CN | 102833345 A | 12/2012 |
| CN | 103067625 A | 4/2013 |
| CN | 103139370 A | 6/2013 |
| CN | 103413218 A | 11/2013 |
| CN | 103415084 A | 11/2013 |
| CN | 103458215 A | 12/2013 |
| CN | 103778082 A | 5/2014 |
| CN | 103778533 A | 5/2014 |
| CN | 103839023 A | 6/2014 |
| CN | 103853328 A | 6/2014 |
| CN | 103914238 A | 7/2014 |
| CN | 103970208 A | 8/2014 |
| CN | 104024987 A | 9/2014 |
| CN | 203930358 U | 11/2014 |
| CN | 104205785 A | 12/2014 |
| CN | 104272854 A | 1/2015 |
| CN | 104281430 A | 1/2015 |
| CN | 104346297 A | 2/2015 |
| CN | 104423581 A | 3/2015 |
| CN | 104956182 A | 9/2015 |
| CN | 105208511 A | 12/2015 |
| CN | 105388998 A | 3/2016 |
| CN | 105657465 A | 6/2016 |
| CN | 105959906 A | 9/2016 |
| CN | 106060772 A | 10/2016 |
| CN | 103914238 B | 2/2017 |
| CN | 106797415 A | 5/2017 |
| CN | 106851528 A | 6/2017 |
| CN | 106936929 A | 7/2017 |
| CN | 107637073 A | 1/2018 |
| CN | 107683470 A | 2/2018 |
| CN | 107852572 A | 3/2018 |
| CN | 107949879 A | 4/2018 |
| CN | 108289239 A | 7/2018 |
| CN | 108292203 A | 7/2018 |
| CN | 108958608 A | 12/2018 |
| CN | 208188782 U | 12/2018 |
| CN | 109347581 A | 2/2019 |
| CN | 109461462 A | 3/2019 |
| CN | 109584879 A | 4/2019 |
| CN | 109584879 B | 7/2021 |
| CN | 108958608 B | 7/2022 |
| EP | 0836074 A2 | 4/1998 |
| EP | 1406176 A1 | 4/2004 |
| EP | 1614992 A1 | 1/2006 |
| EP | 1705883 A1 | 9/2006 |
| EP | 1858238 A2 | 11/2007 |
| EP | 1953663 A1 | 8/2008 |
| EP | 2096413 A1 | 9/2009 |
| EP | 2247087 A1 | 11/2010 |
| EP | 2306692 A1 | 4/2011 |
| EP | 2341315 A1 | 7/2011 |
| EP | 2367098 A2 | 9/2011 |
| EP | 2428947 A2 | 3/2012 |
| EP | 2466260 A1 | 6/2012 |

(56) References Cited

FOREIGN PATENT DOCUMENTS

| | | |
|---|---|---|
| EP | 2523439 A1 | 11/2012 |
| EP | 2629483 A1 | 8/2013 |
| EP | 2632131 A1 | 8/2013 |
| EP | 1614992 B1 | 10/2013 |
| EP | 2672377 A2 | 12/2013 |
| EP | 2720442 A1 | 4/2014 |
| EP | 2725537 A1 | 4/2014 |
| EP | 2892240 A1 | 7/2015 |
| EP | 2980715 A1 | 2/2016 |
| EP | 3001282 A1 | 3/2016 |
| EP | 3032537 A2 | 6/2016 |
| EP | 3057342 A1 | 8/2016 |
| EP | 3073703 A1 | 9/2016 |
| EP | 3276905 A1 | 1/2018 |
| EP | 3379853 A1 | 9/2018 |
| GB | 0412212 | 7/2004 |
| GB | 2402105 A | 12/2004 |
| GB | 2505476 A | 3/2014 |
| JP | 6-284182 A | 10/1994 |
| JP | 11-073530 A | 3/1999 |
| JP | 11-183183 A | 7/1999 |
| JP | 2001-309455 A | 11/2001 |
| JP | 2002-99854 A | 4/2002 |
| JP | 2003-16398 A | 1/2003 |
| JP | 2003-346059 A | 12/2003 |
| JP | 2004-104813 A | 4/2004 |
| JP | 2004-252736 A | 9/2004 |
| JP | 2005-521961 A | 7/2005 |
| JP | 2005-523505 A | 8/2005 |
| JP | 2006-93912 A | 4/2006 |
| JP | 2006-114018 A | 4/2006 |
| JP | 2006-163960 A | 6/2006 |
| JP | 2006-197071 A | 7/2006 |
| JP | 2006-277670 A | 10/2006 |
| JP | 2007-34637 A | 2/2007 |
| JP | 2007-334637 A | 12/2007 |
| JP | 2009-502048 A | 1/2009 |
| JP | 2009-49878 A | 3/2009 |
| JP | 2009-99076 A | 5/2009 |
| JP | 2010-503082 A | 1/2010 |
| JP | 2011-519439 A | 7/2011 |
| JP | 2011-217000 A | 10/2011 |
| JP | 2011-237857 A | 11/2011 |
| JP | 2012-508930 A | 4/2012 |
| JP | 2012-215981 A | 11/2012 |
| JP | 2013-20496 A | 1/2013 |
| JP | 2013-34322 A | 2/2013 |
| JP | 2013-530445 A | 7/2013 |
| JP | 2013-146557 A | 8/2013 |
| JP | 2013-533532 A | 8/2013 |
| JP | 5267966 B2 | 8/2013 |
| JP | 2014-44719 A | 3/2014 |
| JP | 2014-44724 A | 3/2014 |
| JP | 2014-53692 A | 3/2014 |
| JP | 2014-123169 A | 7/2014 |
| JP | 2014-143575 A | 8/2014 |
| JP | 2015-61318 A | 3/2015 |
| JP | 2016-13151 A | 1/2016 |
| JP | 2017-34563 A | 2/2017 |
| JP | 2017-143357 A | 8/2017 |
| JP | 2018-113544 A | 7/2018 |
| JP | 2018-147265 A | 9/2018 |
| KR | 10-2004-0049502 A | 6/2004 |
| KR | 10-2008-0064395 A | 7/2008 |
| KR | 10-2011-0056561 A | 5/2011 |
| KR | 10-2012-0040693 A | 4/2012 |
| KR | 10-2013-0027326 A | 3/2013 |
| KR | 10-2013-0116905 A | 10/2013 |
| KR | 10-1330962 B1 | 11/2013 |
| KR | 10-2014-0018019 A | 2/2014 |
| KR | 10-2014-0026263 A | 3/2014 |
| KR | 10-2014-0055429 A | 5/2014 |
| KR | 10-2014-0105309 A | 9/2014 |
| KR | 10-2016-0000330 A | 1/2016 |
| KR | 10-2016-0092363 A | 8/2016 |
| KR | 10-2017-0027435 A | 3/2017 |
| KR | 10-2017-0032471 A | 3/2017 |
| KR | 10-2017-0082022 A | 7/2017 |
| KR | 10-2017-0124954 A | 11/2017 |
| KR | 10-2019-0020850 A | 3/2019 |
| KR | 10-2019-0022883 A | 3/2019 |
| TW | 201012152 A | 3/2010 |
| TW | 201137722 A | 11/2011 |
| TW | 201215086 A | 4/2012 |
| TW | 201316247 A | 4/2013 |
| TW | 201324310 A | 6/2013 |
| TW | 201409345 A | 3/2014 |
| TW | M474482 U | 3/2014 |
| TW | 201509168 A | 3/2015 |
| WO | 2003/083793 A2 | 10/2003 |
| WO | 03/093765 A2 | 11/2003 |
| WO | 2007/000012 A1 | 1/2007 |
| WO | 2007/008321 A2 | 1/2007 |
| WO | 2007/105937 A1 | 9/2007 |
| WO | 2007/116521 A1 | 10/2007 |
| WO | 2007/142703 A1 | 12/2007 |
| WO | 2007/149731 A1 | 12/2007 |
| WO | 2009/137419 A2 | 11/2009 |
| WO | 2009/140095 A2 | 11/2009 |
| WO | 2010/039337 A1 | 4/2010 |
| WO | 2010/056484 A2 | 5/2010 |
| WO | 2011/063516 A1 | 6/2011 |
| WO | 2012/083113 A2 | 6/2012 |
| WO | 2012/172970 A1 | 12/2012 |
| WO | 2013/023224 A2 | 2/2013 |
| WO | 2013/169849 A2 | 11/2013 |
| WO | 2013/169875 A2 | 11/2013 |
| WO | 2013/177548 A1 | 11/2013 |
| WO | 2014/074407 A1 | 5/2014 |
| WO | 2014/078965 A1 | 5/2014 |
| WO | 2014/115605 A1 | 7/2014 |
| WO | 2014/171734 A2 | 10/2014 |
| WO | 2015/061831 A1 | 5/2015 |
| WO | 2015/065402 A1 | 5/2015 |
| WO | 2015/185123 A1 | 12/2015 |
| WO | 2016/022203 A1 | 2/2016 |
| WO | 2016/022205 A1 | 2/2016 |
| WO | 2016/036472 A1 | 3/2016 |
| WO | 2016/036541 A2 | 3/2016 |
| WO | 2016/200603 A1 | 12/2016 |
| WO | 2016/204186 A1 | 12/2016 |
| WO | 2017/062621 A1 | 4/2017 |
| WO | 2017/112003 A1 | 6/2017 |
| WO | 2018/032085 A1 | 2/2018 |
| WO | 2018/048510 A1 | 3/2018 |
| WO | 2018/084802 A1 | 5/2018 |
| WO | 2018/098136 A1 | 5/2018 |
| WO | 2018/198136 A1 | 11/2018 |
| WO | 2019/173136 A1 | 9/2019 |
| WO | 2019/200350 A1 | 10/2019 |
| WO | 2019/217086 A2 | 11/2019 |
| WO | 2020/063762 A1 | 4/2020 |

OTHER PUBLICATIONS

Advisory Action received for U.S. Appl. No. 14/503,296, mailed on Oct. 2, 2015, 3 pages.
Advisory Action received for U.S. Appl. No. 14/863,099, mailed on Sep. 8, 2016, 3 pages.
Advisory Action received for U.S. Appl. No. 14/869,877, mailed on Jan. 5, 2017, 3 pages.
Advisory Action received for U.S. Appl. No. 15/137,944, mailed on Apr. 13, 2017, 3 pages.
Advisory Action received for U.S. Appl. No. 15/137,944, mailed on May 11, 2017, 6 pages.
Initiated Interview Summary received for U.S. Appl. No. 16/583,994, mailed on Apr. 3, 2020, 5 pages.
Initiated Interview Summary received for U.S. Appl. No. 17/188,228, mailed on Jun. 14, 2022, 9 pages.
Applicant-Initiated Interview Summary received for U.S. Appl. No. 16/144,264, mailed on Jul. 22, 2020, 5 pages.
Applicant-Initiated Interview Summary received for U.S. Appl. No. 16/147,523, mailed on Apr. 27, 2020, 3 pages.

(56) References Cited

OTHER PUBLICATIONS

Applicant-Initiated Interview Summary received for U.S. Appl. No. 16/147,523, mailed on Dec. 10, 2021, 4 pages.
Applicant-Initiated Interview Summary received for U.S. Appl. No. 16/147,523, mailed on Jun. 13, 2022, 4 pages.
Applicant-Initiated Interview Summary received for U.S. Appl. No. 16/147,523, mailed on Oct. 26, 2020, 3 pages.
Applicant-Initiated Interview Summary received for U.S. Appl. No. 16/147,523, mailed on Sep. 14, 2021, 3 pages.
Applicant-Initiated Interview Summary received for U.S. Appl. No. 16/281,838, mailed on Jun. 2, 2020, 5 pages.
Applicant-Initiated Interview Summary received for U.S. Appl. No. 16/583,981, mailed on Mar. 9, 2020, 5 pages.
Applicant-Initiated Interview Summary received for U.S. Appl. No. 16/583,981, mailed on Sep. 14, 2020, 6 pages.
Applicant-Initiated Interview Summary received for U.S. Appl. No. 16/583,994, mailed on May 28, 2021, 5 pages.
Applicant-Initiated Interview Summary received for U.S. Appl. No. 16/583,994, mailed on Nov. 24, 2020, 4 pages.
Applicant-Initiated Interview Summary received for U.S. Appl. No. 16/653,857, mailed on Dec. 14, 2020, 3 pages.
Applicant-Initiated Interview Summary received for U.S. Appl. No. 16/653,857, mailed on May 3, 2021, 4 pages.
Applicant-Initiated Interview Summary received for U.S. Appl. No. 16/679,967, mailed on Feb. 10, 2022, 2 pages.
Applicant-Initiated Interview Summary received for U.S. Appl. No. 16/679,967, mailed on Jun. 1, 2022, 2 pages.
Applicant-Initiated Interview Summary received for U.S. Appl. No. 16/679,967, mailed on Oct. 25, 2021, 2 pages.
Applicant-Initiated Interview Summary received for U.S. Appl. No. 16/723,583, mailed on Dec. 28, 2020, 6 pages.
Applicant-Initiated Interview Summary received for U.S. Appl. No. 16/749,929, mailed on Oct. 13, 2020, 4 pages.
Applicant-Initiated Interview Summary received for U.S. Appl. No. 17/041,350, mailed on Aug. 18, 2021, 2 pages.
Applicant-Initiated Interview Summary received for U.S. Appl. No. 17/041,350, mailed on Feb. 2, 2022, 2 pages.
Applicant-Initiated Interview Summary received for U.S. Appl. No. 17/188,228, mailed on Sep. 23, 2022, 2 pages.
Applicant-Initiated Interview Summary received for U.S. Appl. No. 17/314,948, mailed on Oct. 21, 2022, 6 pages.
Applicant-Initiated Interview Summary received for U.S. Appl. No. 17/410,169, mailed on Nov. 7, 2022, 5 pages.
Axiang's Network Notebook, Deep Analysis on Samsung's 2013 New Flagship: tell you what kind of mobile phone Galaxy S4 is! available at: https://axiang.cc/archives/6115, Apr. 22, 2013, 4 pages.
Baar Marius, "Fitbit Ace—Unboxing, Setup and 24-Hour Test", YouTube [online] [video], Retrieved from: <https://youtu.be/ekvkfqOyrls>.See especially 4:44., Oct. 24, 2018, 3 pages.
Brief Communication regarding Oral Proceedings received for European Patent Application No. 17184710.6, mailed on Feb. 19, 2020, 2 pages.
Brief Communication regarding Oral Proceedings received for European Patent Application No. 17184710.6, mailed on Mar. 9, 2020, 2 pages.
Brief Communication Regarding Oral Proceedings received for European Patent Application No. 20192404.0, mailed on May 4, 2022, 3 pages.
Brief Communication Regarding Oral Proceedings received for European Patent Application No. 20192404.0, mailed on May 18, 2022, 1 page.
Cazlar, "[iOS] MapsGPS (formerly PebbGPS) is now available—now with colour turn-by-turn directions!", Online Available at <https://forums.pebble.com/t/ios-mapsgps-formerly-pebbgps-is-now-available-now-with-colour-turn-by-turn-directions/5584>, 2013, 31 pages.
Chenzai, "Apple, please don't screw up notifications on the Apple Watch", Available online at:—https://digi.tech.qq.com/a/20140918/060747.htm. also published on the English webpage https://www.theverge.com/2014/9/9/6127913/apple-please-dont-screw-up-notifications-on-the-apple-watch, September 18, 2014, 8 pages.
Corrected Notice of Allowance received for U.S. Appl. No. 14/641,251, mailed on June 17, 2016, 2 pages.
Corrected Notice of Allowance received for U.S. Appl. No. 14/836,754, mailed on May 23, 2018, 2 pages.
Corrected Notice of Allowance received for U.S. Appl. No. 14/839,897, mailed on Jan. 23, 2019, 6 pages.
Corrected Notice of Allowance received for U.S. Appl. No. 14/839,903, mailed on Feb. 13, 2019, 2 pages.
Corrected Notice of Allowance received for U.S. Appl. No. 14/839,903, mailed on Mar. 1, 2019, 2 pages.
Corrected Notice of Allowance received for U.S. Appl. No. 15/137,944, mailed on Jan. 11, 2018, 2 pages.
Corrected Notice of Allowance received for U.S. Appl. No. 15/137,944, mailed on Jan. 19, 2018, 2 pages.
Corrected Notice of Allowance received for U.S. Appl. No. 15/268,115, mailed on Apr. 13, 2018, 11 pages.
Corrected Notice of Allowance received for U.S. Appl. No. 15/268,115, mailed on Mar. 21, 2018, 9 pages.
Corrected Notice of Allowance received for U.S. Appl. No. 16/281,838, mailed on Oct. 30, 2020, 2 pages.
Corrected Notice of Allowance received for U.S. Appl. No. 16/583,981, mailed on Apr. 6, 2021, 3 pages.
Corrected Notice of Allowance received for U.S. Appl. No. 16/583,981, mailed on May 17, 2021, 3 pages.
Corrected Notice of Allowance received for U.S. Appl. No. 16/583,994, mailed on Jul. 6, 2021, 3 pages.
Corrected Notice of Allowance received for U.S. Appl. No. 17/041,350, mailed on Apr. 4, 2022, 3 pages.
Corrected Notice of Allowance received for U.S. Appl. No. 17/041,350, mailed on Mar. 15, 2022, 3 pages.
Decision on Appeal received for U.S. Appl. No. 14/774,664, mailed on Sep. 12, 2019, 8 pages.
Decision on Appeal received for U.S. Appl. No. 14/863,099, mailed on Aug. 22, 2019, 9 pages.
Decision to Grant received for Danish Patent Application No. PA201570664, mailed on Feb. 20, 2017, 2 pages.
Decision to Grant received for Danish Patent Application No. PA201570665, mailed on Apr. 26, 2017, 2 pages.
Decision to grant received for Danish Patent Application No. PA201570788, mailed on Jul. 10, 2017, 2 pages.
Decision to Grant received for Danish Patent Application No. PA201570791, mailed on Jun. 7, 2017, 2 pages.
Decision to Grant received for Danish Patent Application No. PA202070609, mailed on May 3, 2021, 2 pages.
Decision to Grant received for European Patent Application No. 15712218.5, mailed on Jun. 7, 2018, 2 pages.
Decision to Grant received for European Patent Application No. 15724160.5, mailed on Jun. 14, 2018, 2 pages.
Decision to Grant received for European Patent Application No. 15787091.6, mailed on Dec. 3, 2020, 2 pages.
Decision to Refuse received for European Patent Application No. 17184710.6, mailed on Jun. 16, 2020, 9 pages.
Decision to Refuse received for European Patent Application No. 20192404.0, mailed on Jun. 14, 2022, 15 pages.
Dharmasena Anusha, "iMessage-send as text message Option", YouTube, Available online at: <https://www.youtube.com/watch?v=hXG-MdIW6FA>, Feb. 18, 2013, 1 page.
Easyvideoguides, "Mapquest", available on: https://www.youtube.com/watch?v=7sDIDNM2bCI, Dec. 26, 2007, 4 pages.
Ehowtech, "How to Get Written Directions on a Garmin: Using a Garmin", available online at: https://www.youtube.com/watch?v=s_EKT6qH4LI, Dec. 2, 2012, 1 page.
European Search Report received for European Patent Application No. 20192404.0, mailed on Nov. 20, 2020, 4 pages.
Examiner's Answer to Appeal Brief received for U.S. Appl. No. 14/870,793, mailed on Apr. 16, 2018, 15 pages.
Examiner's Answer to Appeal Brief received for U.S. Appl. No. 14/774,664, mailed on May 31, 2018, 28 pages.
Examiner's Answer to Appeal Brief received for U.S. Appl. No. 14/863,099, mailed on Jul. 28, 2017, 31 pages.

(56) References Cited

OTHER PUBLICATIONS

Extended European Search Report (includes Supplementary European Search Report and Search Opinion) received for European Patent Application No. 17184710.6, mailed on Nov. 28, 2017, 10 pages.
Extended European Search Report received for European Patent Application No. 16201159.7, mailed on Mar. 27, 2017, 12 pages.
Extended European Search Report Received for European Patent Application No. 16201195.1, mailed on Feb. 7, 2017, 13 pages.
Extended European Search Report received for European Patent Application No. 16201205.8, mailed on Jan. 5, 2017, 12 pages.
Extended European Search Report received for European Patent Application No. 16804040.0, mailed on Feb. 26, 2018, 9 pages.
Extended European Search Report received for European Patent Application No. 18178147.7, mailed on Oct. 4, 2018, 8 pages.
Farmboyreef, "Apple watch controlling your tv", Available online at: https://www.youtube.com/watch?v=xaJPG0Wm3Tg, Jun. 23, 2015, 3 pages.
Final Office Action received for U.S. Appl. No. 14/503,072, mailed on Mar. 2, 2017, 9 pages.
Final Office Action received for U.S. Appl. No. 14/503,072, mailed on Sep. 1, 2015, 16 pages.
Final Office Action received for U.S. Appl. No. 14/503,296, mailed on Jul. 2, 2015, 7 pages.
Final Office Action received for U.S. Appl. No. 14/503,296, mailed on Jun. 4, 2018, 8 pages.
Final Office Action received for U.S. Appl. No. 14/503,327, mailed on May 18, 2017, 10 pages.
Final Office Action received for U.S. Appl. No. 14/719,217, mailed on Feb. 23, 2017, 37 pages.
Final Office Action received for U.S. Appl. No. 14/774,664, mailed on Aug. 25, 2017, 23 pages.
Final Office Action received for U.S. Appl. No. 14/836,754, mailed on Jun. 14, 2017, 23 pages.
Final Office Action received for U.S. Appl. No. 14/839,897, mailed on Jan. 10, 2018, 16 pages.
Final Office Action received for U.S. Appl. No. 14/863,099, mailed on Apr. 21, 2016, 20 pages.
Final Office Action received for U.S. Appl. No. 14/869,877, mailed on Apr. 26, 2018, 18 pages.
Final Office Action received for U.S. Appl. No. 14/869,877, mailed on Aug. 3, 2016, 13 pages.
Final Office Action received for U.S. Appl. No. 14/870,726, mailed on Apr. 19, 2017, 17 pages.
Final Office Action received for U.S. Appl. No. 14/870,793, mailed on Jan. 19, 2017, 16 pages.
Final Office Action received for U.S. Appl. No. 15/137,944, mailed on Feb. 27, 2017, 10 pages.
Final Office Action received for U.S. Appl. No. 15/268,115, mailed on Oct. 11, 2017, 48 pages.
Final Office Action received for U.S. Appl. No. 16/147,523, mailed on Aug. 4, 2020, 15 pages.
Final Office Action received for U.S. Appl. No. 16/147,523, mailed on Oct. 14, 2021, 22 pages.
Final Office Action received for U.S. Appl. No. 16/583,981, mailed on Apr. 16, 2020, 19 pages.
Final Office Action received for U.S. Appl. No. 16/583,994, mailed on Jul. 23, 2020, 16 pages.
Final Office Action received for U.S. Appl. No. 16/653,857, mailed on Feb. 10, 2021, 43 pages.
Final Office Action received for U.S. Appl. No. 16/679,967, mailed on Nov. 10, 2021, 14 pages.
Final Office Action received for U.S. Appl. No. 16/723,583, mailed on Feb. 5, 2021, 15 pages.
Final Office Action received for U.S. Appl. No. 17/041,350, mailed on Sep. 17, 2021, 25 pages.
Final Office Action received for U.S. Appl. No. 17/188,228, mailed on Jul. 6, 2022, 13 pages.
Final Office Action received for U.S. Appl. No. 14/836,754, mailed on Mar. 22, 2016, 17 pages.
Final Office Action received for U.S. Appl. No. 14/836,754, mailed on Mar. 31, 2017, 24 pages.
Final Office Action received for U.S. Appl. No. 14/839,903, mailed on Sep. 18, 2018, 11 pages.
Final Office Action received for U.S. Appl. No. 15/135,328 mailed on Nov. 9, 2018, 55 pages.
Franks Tech Help, "DSLR Camera Remote Control on Android Tablet, DSLR Dashboard, Nexus 10, Canon Camera, OTG Host Cable", Available online at: https://www.youtube.com/watch?v=DD4dCVinreU, Dec. 10, 2013, 1 page.
Fuji Film, "Taking Pictures Remotely: Free iPhone/Android App Fuji Film Camera Remote", Available at <http://app.fujifilm-dsc.com/en/camera_remote/guide05.html>, Apr. 22, 2014, 3 pages.
Gil Lory, "How to control Apple TV with your Apple Watch", Available online at: https://www.imore.com/how-control-your-apple-tv-remote-app%ADapple-watch], Jun. 6, 2016, 24 pages.
"GT-I9500 (Galaxy S4) User Manual, SAMSUNG, Rev.1.1", http://org.downloadcenter.samsung.com/downloadfile/ContentsFile.aspx?CDSite=UNI_TW &CttFileID=5406113&CDCttType=UM&ModelType=N&ModelName=GTI9500&VPath=UM/201305/20130520173017063/GTI9500_UM_Open_Taiwan_Jellybean_Chi_Rev.1.1_130520.pdf., May 2013, 14 pages.
Haris, "Google Maps Navigation on Android 2.0", Sizzled Core, online available at <http://www.sizzledcore.com/2009/10/29/google-maps-navigation-on-android-20/>, Oct. 29, 2009, 6 pages.
Hobbyistsoftwareltd, "VLC Remote", Online available at: https://watchaware.com/watch-apps/297244048, 2016, 7 pages.
Intention to Grant received for Danish Patent Application No. PA201570665, mailed on Feb. 28, 2017, 2 pages.
Intention to Grant received for Danish Patent Application No. PA201570773, mailed on Mar. 9, 2018, 2 pages.
Intention to Grant received for Danish Patent Application No. PA201570788, mailed on Mar. 27, 2017, 2 pages.
Intention to Grant received for Danish Patent Application No. PA201570791, mailed on Mar. 7, 2017, 2 pages.
Intention to Grant received for Danish Patent Application No. PA202070609, mailed on Jan. 14, 2021, 2 pages.
Intention to Grant received for European Patent Application No. 15712218.5, mailed on Jan. 24, 2018, 7 pages.
Intention to Grant received for European Patent Application No. 15724160.5, mailed on Mar. 7, 2018, 8 pages.
Intention to Grant received for European Patent Application No. 15787091.6, mailed on Apr. 23, 2020, 7 pages.
Intention to Grant received for European Patent Application No. 15787091.6, mailed on Sep. 30, 2020, 7 pages.
International Preliminary Report on Patentability received for PCT Patent Application No. PCT/US2014/027882, mailed on Sep. 24, 2015, 8 pages.
International Preliminary Report on Patentability received for PCT Patent Application No. PCT/US2015/019298, mailed on Mar. 16, 2017, 12 pages.
International Preliminary Report on Patentability received for PCT Patent Application No. PCT/US2015/025188, mailed on Mar. 2, 2017, 8 pages.
International Preliminary Report on Patentability received for PCT Patent Application No. PCT/US2015/030199, mailed on Dec. 15, 2016, 7 pages.
International Preliminary Report on Patentability received for PCT Patent Application No. PCT/US2015/033326, mailed on Dec. 8, 2016, 11 pages.
International Preliminary Report on Patentability received for PCT Patent Application No. PCT/US2015/033380, mailed on Dec. 8, 2016, 10 pages.
International Preliminary Report on Patentability received for PCT Patent Application No. PCT/US2015/041424, mailed on Feb. 2, 2017, 13 pages.
International Preliminary Report on Patentability received for PCT Patent Application No. PCT/US2015/046892, mailed on Mar. 16, 2017, 14 pages.
International Preliminary Report on Patentability received for PCT Patent Application No. PCT/US2015/047507, mailed on Mar. 16, 2017, 16 pages.

(56) References Cited

OTHER PUBLICATIONS

International Preliminary Report on Patentability received for PCT Patent Application No. PCT/US2015/055165, mailed on Sep. 21, 2017, 15 pages.
International Preliminary Report on Patentability received for PCT Patent Application No. PCT/US2016/016621, mailed on Aug. 24, 2017, 8 pages.
International Preliminary Report on Patentability received for PCT Patent Application No. PCT/US2016/034175, mailed on Dec. 14, 2017, 14 pages.
International Preliminary Report on Patentability received for PCT Patent Application No. PCT/US2019/024792, mailed on Dec. 17, 2020, 9 pages.
International Preliminary Report on Patentability received for PCT Patent Application No. PCT/US2020/026044, mailed on Dec. 9, 2021, 18 pages.
International Preliminary Report on Patentability received for PCT Patent Application No. PCT/US2020/031536, mailed on Nov. 18, 2021, 11 pages.
International Preliminary Report on Patentability received for PCT Patent Application No. PCT/US2020/035446, mailed on Dec. 9, 2021, 14 pages.
International Search Report and Written Opinion received for PCT Application No. PCT/US2015/033326, mailed on Aug. 10, 2015, 13 pages.
International Search Report and Written Opinion received for PCT Application No. PCT/US2015/047507, mailed on Feb. 22, 2016, 22 pages.
International Search Report and Written Opinion received for PCT Application No. PCT/US2015/046892, mailed on Jan. 27, 2016, 20 pages.
International Search Report and Written Opinion received for PCT Patent Application No. PCT/US2013/032498, mailed on Feb. 10, 2014, 18 pages.
International Search Report and Written Opinion received for PCT Patent Application No. PCT/US2014/027882, mailed on Oct. 10, 2014, 11 pages.
International Search Report and Written Opinion received for PCT Patent Application No. PCT/US2015/019298, mailed on Jul. 13, 2015, 17 pages.
International Search Report and Written Opinion received for PCT Patent Application No. PCT/US2015/025188, mailed on Jun. 23, 2015, 11 pages.
International Search Report and Written Opinion received for PCT Patent Application No. PCT/US2015/030199, mailed on Aug. 14, 2015, 11 pages.
International Search Report and Written Opinion received for PCT Patent Application No. PCT/US2015/033380, mailed on Aug. 10, 2015, 13 pages.
International Search Report and Written Opinion received for PCT Patent Application No. PCT/US2015/041424, mailed on Mar. 31, 2016, 18 pages.
International Search Report and Written Opinion received for PCT Patent Application No. PCT/US2015/055165, mailed on Apr. 20, 2016, 22 pages.
International Search Report and Written Opinion received for PCT Patent Application No. PCT/US2016/016621, mailed on May 9, 2016, 12 pages.
International Search Report and Written Opinion received for PCT Patent Application No. PCT/US2016/034175, mailed on Oct. 7, 2016, 17 pages.
International Search Report and Written Opinion received for PCT Patent Application No. PCT/US2019/024792, mailed on Jul. 18, 2019, 13 pages.
International Search Report and Written Opinion received for PCT Patent Application No. PCT/US2020/026044, mailed on Sep. 9, 2020, 26 pages.
International Search Report and Written Opinion received for PCT Patent Application No. PCT/US2020/031536, mailed on Sep. 23, 2020, 16 pages.
International Search Report and Written Opinion received for PCT Patent Application No. PCT/US2020/035446, mailed on Nov. 10, 2020, 20 pages.
Invitation to Pay Additional Fees received for PCT Patent Application No. PCT/US2014/027882, mailed on Aug. 5, 2014, 2 pages.
Invitation to Pay Additional Fees received for PCT Patent Application No. PCT/US2015/041424, mailed on Nov. 12, 2015, 6 pages.
Invitation to Pay Additional Fees received for PCT Patent Application No. PCT/US2015/046892, mailed on Nov. 4, 2015, 5 pages.
Invitation to Pay Additional Fees received for PCT Patent Application No. PCT/US2015/047507, mailed on Jan. 4, 2016, 8 pages.
Invitation to Pay Additional Fees received for PCT Patent Application No. PCT/US2015/055165, mailed on Jan. 18, 2016, 6 pages.
Invitation to Pay Additional Fees received for PCT Patent Application No. PCT/US2016/034175, mailed on Aug. 11, 2016, 3 pages.
Invitation to Pay Additional Fees received for PCT Patent Application No. PCT/US2020/026044, mailed on Jun. 25, 2020, 12 pages.
Invitation to Pay Additional Fees received for PCT Patent Application No. PCT/US2020/031536, mailed on Jul. 31, 2020, 9 pages.
Invitation to Pay Additional Fees received for PCT Patent Application No. PCT/US2020/035446, mailed on Sep. 11, 2020, 12 pages.
Invitation to Pay Search Fees received for European Patent Application No. 15753796.0, mailed on Mar. 24, 2020, 3 pages.
"IOS Security", White Paper, Available online at: <https://web.archive.org/web/20150526223200/http://www.apple.com/business/docs/iOS_ Security_Guide.pdf>, Apr. 2015, 55 pages.
Itjungles, "iPhone 6: How to Pair with Another Bluetooth Device", Available Online at: https://www.youtube.com/watch?v=9setanYtHAk, Aug. 5, 2015, 3 pages.
Jean, "Our Pact Parental Control Review", Available online at: https://www.bewebsmart.com/parental-controls/our-pact-parental-control-review/, Jun. 25, 2016, 25 pages.
Kamijo Noboru, "Next Generation Mobile System—WatchPad1.5", Available at <http://researcher.ibm.com/researcher/view_group_subpage.php?id=5617>, retrieved on Jul. 4, 2015, 2 pages.
Klein Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.
My Mate Vince, "Setting up the Fitbit Alta HR Activity Tracker on Apple IOS", Online available at:—<https://youtu.be/FdwRF4IfvFc>, Jun. 18, 2017, 3 pages.
Naver Blog, "How to Use Smart Wallet and Registered Card", Online Available at <http://feena74.blog.me/140185758401>, Mar. 29, 2013, 20 pages.
Nikolov Anton, "Design principle: Consistency", Available online at: https://uxdesign.cc/design-principle-consistency-6b0cf7e7339f, Apr. 8, 2017, 9 pages.
Non-Final Office Action received for U.S. Appl. No. 14/503,327, mailed on Sep. 12, 2016, 10 pages.
Non-Final Office Action received for U.S. Appl. No. 14/836,754, mailed on Nov. 17, 2015, 15 pages.
Non-Final Office Action received for U.S. Appl. No. 14/503,072, mailed on Jan. 26, 2015, 12 pages.
Non-Final Office Action received for U.S. Appl. No. 14/503,296, mailed on Jan. 30, 2015, 16 pages.
Non-Final Office Action received for U.S. Appl. No. 14/839,913, mailed on Mar. 2, 2016, 11 pages.
Non-Final Office Action received for U.S. Appl. No. 14/864,011, mailed on Jan. 21, 2016, 10 pages.
Non-Final Office Action received for U.S. Appl. No. 14/869,877, mailed on Jan. 29, 2016, 18 pages.
Non-Final Office Action received for U.S. Appl. No. 14/869,877, mailed on Jun. 16, 2017, 17 pages.
Non-Final Office Action received for U.S. Appl. No. 14/869,877, mailed on Oct. 5, 2018, 19 pages.
Non-Final Office Action received for U.S. Appl. No. 14/870,793, mailed on Apr. 19, 2016, 17 pages.
Non-Final Office Action received for U.S. Appl. No. 14/503,364, mailed on Feb. 3, 2016, 16 pages.

(56) References Cited

OTHER PUBLICATIONS

Non-Final Office Action received for U.S. Appl. No. 16/679,967, mailed on Sep. 2, 2021, 12 pages.
Non-Final Office Action received for U.S. Appl. No. 14/805,403, mailed on Nov. 16, 2017, 21 pages.
Non-Final Office Action received for U.S. Appl. No. 14/503,072, mailed on Jun. 17, 2016, 19 pages.
Non-Final Office Action received for U.S. Appl. No. 14/503,296, mailed on Aug. 28, 2017, 14 pages.
Non-Final Office Action received for U.S. Appl. No. 14/503,296, mailed on Oct. 5, 2016., 11 pages.
Non-Final Office Action received for U.S. Appl. No. 14/503,296, mailed on Sep. 18, 2018, 20 pages.
Non-Final Office Action received for U.S. Appl. No. 14/503,381, mailed on May 13, 2015, 13 pages.
Non-Final Office Action received for U.S. Appl. No. 14/719,217, mailed on Jul. 26, 2018, 40 pages.
Non-Final Office Action received for U.S. Appl. No. 14/719,217, mailed on Jul. 28, 2016, 28 pages.
Non-Final Office Action received for U.S. Appl. No. 14/774,664, mailed on Mar. 7, 2017, 23 pages.
Non-Final Office Action received for U.S. Appl. No. 14/836,754, mailed on Aug. 16, 2017, 25 pages.
Non-Final Office Action received for U.S. Appl. No. 14/836,754, mailed on Oct. 21, 2016., 18 pages.
Non-Final Office Action received for U.S. Appl. No. 14/839,897, mailed on May 18, 2017, 11 pages.
Non-Final Office Action received for U.S. Appl. No. 14/839,903, mailed on Feb. 26, 2018, 10 pages.
Non-Final Office Action received for U.S. Appl. No. 14/839,913, mailed on Jul. 28, 2016., 12 pages.
Non-Final Office Action received for U.S. Appl. No. 14/863,099, mailed on Dec. 2, 2015, 12 pages.
Non-Final Office Action received for U.S. Appl. No. 14/864,011, mailed on Jun. 10, 2016, 10 pages.
Non-Final Office Action received for U.S. Appl. No. 14/870,726, mailed on Sep. 16, 2016, 12 pages.
Non-Final Office Action received for U.S. Appl. No. 15/135,328 mailed on Apr. 11, 2018, 64 pages.
Non-Final Office Action received for U.S. Appl. No. 15/137,944, mailed on Jul. 27, 2017, 13 pages.
Non-Final Office Action received for U.S. Appl. No. 15/268,115, mailed on Apr. 13, 2017, 44 pages.
Non-Final Office Action received for U.S. Appl. No. 15/294,439, mailed on Jan. 26, 2018, 18 pages.
Non-Final Office Action received for U.S. Appl. No. 15/433,238, mailed on Nov. 3, 2017, 6 pages.
Non-Final Office Action received for U.S. Appl. No. 16/144,264, mailed on May 1, 2020, 30 pages.
Non-Final Office Action received for U.S. Appl. No. 16/147,523, mailed on Apr. 26, 2022, 22 pages.
Non-Final Office Action received for U.S. Appl. No. 16/147,523, mailed on Dec. 27, 2019, 11 pages.
Non-Final Office Action received for U.S. Appl. No. 16/147,523, mailed on Jul. 21, 2021, 20 pages.
Non-Final Office Action received for U.S. Appl. No. 16/281,838, mailed on Mar. 26, 2020, 18 pages.
Non-Final Office Action received for U.S. Appl. No. 16/407,584, mailed on Jul. 10, 2019, 8 pages.
Non-Final Office Action received for U.S. Appl. No. 16/583,981, mailed on Dec. 6, 2019, 14 pages.
Non-Final Office Action received for U.S. Appl. No. 16/583,994, mailed on Dec. 23, 2020, 17 pages.
Non-Final Office Action received for U.S. Appl. No. 16/583,994, mailed on Dec. 30, 2019, 14 pages.
Non-Final Office Action received for U.S. Appl. No. 16/653,857, mailed on Jul. 9, 2020, 35 pages.
Non-Final Office Action received for U.S. Appl. No. 16/653,857, mailed on Jul. 22, 2021, 45 pages.
Non-Final Office Action received for U.S. Appl. No. 16/679,967, mailed on Apr. 19, 2022, 13 pages.
Non-Final Office Action received for U.S. Appl. No. 16/723,583, mailed on Aug. 13, 2020, 13 pages.
Non-Final Office Action received for U.S. Appl. No. 16/749,929, mailed on May 13, 2020, 11 pages.
Non-Final Office Action received for U.S. Appl. No. 17/041,350, mailed on Jun. 10, 2021, 24 pages.
Non-Final Office Action received for U.S. Appl. No. 17/188,228, mailed on Dec. 21, 2021, 14 pages.
Non-Final Office Action received for U.S. Appl. No. 17/314,948, mailed on Aug. 1, 2022, 33 pages.
Non-Final Office Action received for U.S. Appl. No. 17/410,169, mailed on Sep. 16, 2022, 42 pages.
Non-Final Office Action received for U.S. Appl. No. 17/509,356, mailed on Dec. 22, 2022, 16 pages.
Notice of Acceptance received for Australian Patent Application No. 2015266650, mailed on Jan. 18, 2018, 3 pages.
Notice of Acceptance received for Australian Patent Application No. 2015266693, mailed on Jan. 19, 2018, 3 pages.
Notice of Acceptance received for Australian Patent Application No. 2015385757, mailed on Jul. 16, 2018, 3 pages.
Notice of Acceptance received for Australian Patent Application No. 2016218318, mailed on Jul. 3, 2019, 3 pages.
Notice of Acceptance received for Australian Patent Application No. 2017201064, mailed on Feb. 20, 2018, 3 pages.
Notice of Acceptance received for Australian Patent Application No. 2018247345, mailed on May 15, 2019, 3 pages.
Notice of Acceptance received for Australian Patent Application No. 2020239670, mailed on Jul. 2, 2021, 3 pages.
Notice of Acceptance received for Australian Patent Application No. 2020285524, mailed on Dec. 17, 2021, 3 pages.
Notice of Acceptance received for Australian Patent Application No. 2022201369, mailed on Mar. 17, 2022, 3 pages.
Notice of Allowance received for Chinese Patent Application No. 2015203573819, mailed on Jul. 29, 2015, 4 pages.
Notice of Allowance received for Chinese Patent Application No. 2015203586838, issued on Mar. 10, 2016, 5 pages.
Notice of Allowance received for Chinese Patent Application No. 2015800462376, mailed on Aug. 29, 2018, 4 pages.
Notice of Allowance received for Chinese Patent Application No. 201580077218.X, mailed on Nov. 13, 2020, 2 pages.
Notice of Allowance received for Chinese Patent Application No. 2016100849741, mailed on Aug. 5, 2019, 2 pages.
Notice of Allowance received for Chinese Patent Application No. 2016204807086, mailed on Apr. 20, 2017, 3 pages.
Notice of Allowance received for Chinese Patent Application No. 2016204808464, mailed on Apr. 20, 2017, 3 pages.
Notice of Allowance received for Chinese Patent Application No. 2017106574249, mailed on May 8, 2020, 2 pages.
Notice of Allowance received for Chinese Patent Application No. 2018103219288, mailed on Sep. 11, 2019, 2 pages.
Notice of Allowance received for Chinese Patent Application No. 2019109904324, mailed on Apr. 27, 2021, 2 pages.
Notice of Allowance received for Chinese Patent Application No. 201980036737.X, mailed on Apr. 20, 2021, 10 pages.
Notice of Allowance received for Chinese Patent Application No. 2021100115096, mailed on Mar. 2, 2022, 2 pages.
Notice of Allowance received for Danish Patent Application No. PA201570771, mailed on Sep. 2, 2016, 2 pages.
Notice of Allowance received for Danish Patent Application No. PA201570773 , mailed on Apr. 26, 2018, 2 pages.
Notice of Allowance received for Japanese Patent Application No. 2016-224508, mailed on Jun. 20, 2017, 3 pages.
Notice of Allowance received for Japanese Patent Application No. 2016-558332, mailed on Jan. 11, 2019, 4 pages.
Notice of Allowance received for Japanese Patent Application No. 2017-545733, mailed on Jun. 1, 2018, 4 pages.
Notice of Allowance received for Japanese Patent Application No. 2018-126311, mailed on Feb. 1, 2019, 4 pages.
Notice of Allowance received for Japanese Patent Application No. 2020-551465, mailed on Jun. 28, 2021, 4 pages.

(56) References Cited

OTHER PUBLICATIONS

Notice of Allowance received for Japanese Patent Application No. 2021-122610, mailed on Aug. 5, 2022, 4 pages.
Notice of Allowance received for Japanese Patent Application No. 2021-571464, mailed on May 30, 2022, 4 pages.
Notice of Allowance received for Japanese Patent Application No. 2022-102840, mailed on Aug. 19, 2022, 4 pages.
Notice of Allowance received for Korean Patent Application No. 10-2017-0022365, mailed on Mar. 27, 2018, 4 pages.
Notice of Allowance received for Korean Patent Application No. 10-2017-0022546, mailed on Feb. 27, 2018, 4 pages.
Notice of Allowance received for Korean Patent Application No. 10-2020-7028759, mailed on Oct. 19, 2021, 4 pages.
Notice of Allowance received for Korean Patent Application No. 10-2021-7039234, mailed on Dec. 20, 2021, 4 pages.
Notice of Allowance received for Korean Patent Application No. 10-2022-7001721, mailed on Feb. 28, 2022, 5 pages.
Notice of Allowance received for Korean Patent Application No. 10-2022-7008567, mailed on Jul. 4, 2022, 9 pages.
Notice of Allowance received for Taiwanese Patent Application No. 104107328, mailed on Jun. 12, 2017, 3 pages.
Notice of Allowance received for Taiwanese Patent Application No. 104114953, mailed on Oct. 17, 2017, 3 pages.
Notice of Allowance received for Taiwanese Patent Application No. 104123593, mailed on Oct. 1, 2018, 4 pages.
Notice of Allowance received for Taiwanese Patent Application No. 104128689, mailed on Aug. 28, 2018, 5 pages.
Notice of Allowance received for Taiwanese Patent Application No. 104128700, mailed on Mar. 27, 2017, 3 pages.
Notice of Allowance received for Taiwanese Patent Application No. 104133756, mailed on Nov. 30, 2017, 5 pages.
Notice of Allowance received for Taiwanese Patent Application No. 104133757, mailed on Jan. 18, 2017, 3 pages.
Notice of Allowance received for the U.S. Appl. No. 14/503,381, mailed on Dec. 16, 2015, 8 pages.
Notice of Allowance received for U.S. Appl. No. 14/503,072, mailed on Jun. 4, 2018, 6 pages.
Notice of Allowance received for U.S. Appl. No. 14/503,072, mailed on Mar. 26, 2018, 6 pages.
Notice of Allowance received for U.S. Appl. No. 14/503,327, mailed on Mar. 22, 2018, 5 pages.
Notice of Allowance received for U.S. Appl. No. 14/503,327, mailed on Nov. 30, 2017, 5 pages.
Notice of Allowance received for U.S. Appl. No. 14/503,364, mailed on Jun. 16, 2016, 11 pages.
Notice of Allowance received for U.S. Appl. No. 14/641,251, mailed on May 18, 2016, 13 pages.
Notice of Allowance received for U.S. Appl. No. 14/805,403, mailed on Jul. 11, 2018, 15 pages.
Notice of Allowance received for U.S. Appl. No. 14/836,754, mailed on May 10, 2018, 27 pages.
Notice of Allowance received for U.S. Appl. No. 14/839,897, mailed on Jun. 8, 2018, 11 pages.
Notice of Allowance received for U.S. Appl. No. 14/839,903, mailed on Jan. 3, 2019, 7 pages.
Notice of Allowance received for U.S. Appl. No. 14/839,913, mailed on Aug. 11, 2016, 5 pages.
Notice of Allowance received for U.S. Appl. No. 14/864,011, mailed on Apr. 28, 2016, 5 pages.
Notice of Allowance received for U.S. Appl. No. 14/864,011, mailed on Oct. 5, 2016, 5 pages.
Notice of Allowance received for U.S. Appl. No. 14/870,726, mailed on Sep. 11, 2018, 9 pages.
Notice of Allowance received for U.S. Appl. No. 15/135,328, mailed on Jul. 1, 2019, 25 pages.
Notice of Allowance received for U.S. Appl. No. 15/137,944, mailed on Dec. 21, 2017, 8 pages.
Notice of Allowance received for U.S. Appl. No. 15/268,115, mailed on Mar. 7, 2018, 15 pages.
Notice of Allowance received for U.S. Appl. No. 15/294,439, mailed on Jan. 8, 2019, 8 pages.
Notice of Allowance received for U.S. Appl. No. 15/294,439, mailed on Sep. 10, 2018, 9 pages.
Notice of Allowance received for U.S. Appl. No. 15/366,607, mailed on Apr. 2, 2019, 2 pages.
Notice of Allowance received for U.S. Appl. No. 15/366,607, mailed on Feb. 21, 2019, 9 pages.
Notice of Allowance received for U.S. Appl. No. 15/433,238, mailed on May 17, 2018, 7 pages.
Notice of Allowance received for U.S. Appl. No. 15/975,581, mailed on Oct. 3, 2018, 25 pages.
Notice of Allowance received for U.S. Appl. No. 16/144,264, mailed on Nov. 16, 2020, 10 pages.
Notice of Allowance received for U.S. Appl. No. 16/147,523, mailed on Aug. 4, 2022, 9 pages.
Notice of Allowance received for U.S. Appl. No. 16/147,523, mailed on Nov. 28, 2022, 8 pages.
Notice of Allowance received for U.S. Appl. No. 16/147,523, mailed on Oct. 4, 2022, 8 pages.
Notice of Allowance received for U.S. Appl. No. 16/281,838, mailed on Aug. 26, 2020, 9 pages.
Notice of Allowance received for U.S. Appl. No. 16/281,838, mailed on May 20, 2021, 9 pages.
Notice of Allowance received for U.S. Appl. No. 16/407,584, mailed on Oct. 28, 2019, 5 pages.
Notice of Allowance received for U.S. Appl. No. 16/583,981, mailed on Mar. 26, 2021, 10 pages.
Notice of Allowance received for U.S. Appl. No. 16/583,994, mailed on Jun. 24, 2021, 10 pages.
Notice of Allowance received for U.S. Appl. No. 16/653,857, mailed on Feb. 16, 2022, 34 pages.
Notice of Allowance received for U.S. Appl. No. 16/679,967, mailed on Jun. 15, 2022, 7 pages.
Notice of Allowance received for U.S. Appl. No. 16/679,967, mailed on Nov. 2, 2022, 7 pages.
Notice of Allowance received for U.S. Appl. No. 16/749,929, mailed on Dec. 16, 2020, 2 pages.
Notice of Allowance received for U.S. Appl. No. 16/749,929, mailed on Nov. 4, 2020, 5 pages.
Notice of Allowance received for U.S. Appl. No. 16/867,002, mailed on Aug. 20, 2021, 12 pages.
Notice of Allowance received for U.S. Appl. No. 16/867,002, mailed on Mar. 1, 2022, 7 pages.
Notice of Allowance received for U.S. Appl. No. 17/041,350, mailed on Feb. 24, 2022, 6 pages.
Notice of Allowance received for U.S. Appl. No. 17/188,228, mailed on Feb. 1, 2023, 5 pages.
Notice of Allowance received for U.S. Appl. No. 17/188,228, mailed on Oct. 19, 2022, 6 pages.
Nozawa Naoki et al., "iPad Perfect Manual for iOS 4", JPN, SOTEC Ltd., Yanagisawa Junichi, Dec. 31, 2010, pp. 189-190.
Npasqua, "Maps: ability to swipe step by step in turn-by-turn mode, 2012, Apple Support Communities", https://discussions.apple.com/thread/4424256?start=O&tstart=0, Oct. 12, 2012, 4 pages.
Oates Nathan, "PebbGPS", Available online at:—https://pebble.devpost.com/submissions/21694-pebbgps, Mar. 16, 2014, 2 pages.
Office Action received for European Patent Application No. 15728352.4, mailed on Jan. 25, 2018, 10 pages.
Office Action received for Japanese Patent Application No. 2016-224507, mailed on Dec. 1, 2017, 14 pages.
Office Action received for Australian Patent Application No. 2015100708, issued on Sep. 8, 2015, 4 pages.
Office Action received for Australian Patent Application No. 2015100709, issued on Sep. 9, 2015 (Examination Report 1), 4 pages.
Office Action received for Australian Patent Application No. 2015100709, issued on Sep. 9, 2015 (Examination Report 2), 4 pages.
Office Action received for Australian Patent Application No. 2015266650, mailed on Apr. 10, 2017, 4 pages.
Office Action received for Australian Patent Application No. 2015266693, mailed on Apr. 10, 2017, 4 pages.

(56) References Cited

OTHER PUBLICATIONS

Office Action received for Australian Patent Application No. 2015302298, mailed on Apr. 4, 2018, 3 pages.
Office Action received for Australian Patent Application No. 2015302298, mailed on Jul. 20, 2018, 3 pages.
Office Action received for Australian Patent Application No. 2015302298, mailed on Sep. 14, 2017, 3 pages.
Office Action received for Australian Patent Application No. 2015302298, mailed on Sep. 4, 2018, 5 pages.
Office Action received for Australian Patent Application No. 2015385757, mailed on Sep. 11, 2017, 3 pages.
Office Action received for Australian Patent Application No. 2016100155, mailed on May 4, 2016, 7 pages.
Office Action received for Australian Patent Application No. 2016100367, issued on May 25, 2016, 3 pages.
Office Action received for Australian Patent Application No. 2016100367, mailed on Oct. 26, 2016, 3 pages.
Office Action received for Australian Patent Application No. 2016100383, issued on Jun. 9, 2016, 2 pages.
Office Action received for Australian Patent Application No. 2016100383, issued on Nov. 11, 2016, 3 pages.
Office Action received for Australian Patent Application No. 2016100796, issued on Aug. 26, 2016, 6 pages.
Office Action received for Australian Patent Application No. 2016100796, issued on Feb. 13, 2017, 4 pages.
Office Action received for Australian Patent Application No. 2016218318, mailed on Aug. 24, 2018, 5 pages.
Office Action received for Australian Patent Application No. 2016218318, mailed on Sep. 26, 2018, 3 pages.
Office Action received for Australian Patent Application No. 2016270323, mailed on Nov. 26, 2018, 4 pages.
Office Action received for Australian Patent Application No. 2017100070, mailed on Mar. 16, 2017, 6 pages.
Office Action received for Australian Patent Application No. 2017100231, mailed on Apr. 13, 2017, 3 pages.
Office Action received for Australian Patent Application No. 2017101375, mailed on Dec. 1, 2017, 3 pages.
Office Action received for Australian Patent Application No. 2017101375, mailed on Feb. 19, 2018, 4 pages.
Office Action received for Australian Patent Application No. 2017201064, mailed on Mar. 9, 2017, 2 pages.
Office Action received for Australian Patent Application No. 2017201068, mailed on Jan. 17, 2018, 5 pages.
Office Action received for Australian Patent Application No. 2017201068, mailed on Mar. 10, 2017, 2 pages.
Office Action Received for Australian Patent Application No. 2018202559, mailed on Jan. 16, 2019, 6 pages.
Office Action received for Australian Patent Application No. 2018247345, mailed on May 6, 2019, 2 pages.
Office Action received for Australian Patent Application No. 2020239670, mailed on Mar. 3, 2021, 4 pages.
Office Action received for Australian Patent Application No. 2021250863, mailed on Oct. 6, 2022, 6 pages.
Office Action received for Chinese Patent Application No. 201510284715.9, mailed on Dec. 21, 2018, 22 pages.
Office Action received for Chinese Patent Application No. 201510284896.5, mailed on Jun. 28, 2018, 15 pages.
Office Action received for Chinese Patent Application No. 201520358683.8, mailed on Sep. 2, 2015, 4 pages.
Office Action received for Chinese Patent Application No. 201580028491.3, mailed on Oct. 8, 2018, 9 pages.
Office Action received for Chinese Patent Application No. 201580043701.6, mailed on Dec. 24, 2018, 20 pages.
Office Action received for Chinese Patent Application No. 201580046237.6, mailed on Feb. 6, 2018, 10 pages.
Office Action received for Chinese Patent Application No. 201580077218.X, mailed on Feb. 3, 2020, 23 pages.
Office Action received for Chinese Patent Application No. 201610084974.1, mailed on Dec. 5, 2018, 6 pages.
Office Action received for Chinese Patent Application No. 201610084974.1, mailed on May 3, 2018, 12 pages.
Office Action received for Chinese Patent Application No. 201610371774.4, mailed on Dec. 19, 2018, 13 pages.
Office Action received for Chinese Patent Application No. 201620119869.2, mailed on Jun. 3, 2016, 2 pages.
Office Action received for Chinese Patent Application No. 201620119869.2, mailed on Nov. 22, 2016, 2 pages.
Office Action received for Chinese Patent Application No. 201620480708.6, mailed on Jan. 9, 2017, 3 pages.
Office Action received for Chinese Patent Application No. 201620480708.6, mailed on Sep. 14, 2016, 3 pages.
Office Action received for Chinese Patent Application No. 201620480846.4, mailed on Jan. 9, 2017, 3 pages.
Office Action received for Chinese Patent Application No. 201620480846.4, mailed on Sep. 14, 2016, 3 pages.
Office Action received for Chinese Patent Application No. 201620509515.9, mailed on Nov. 9, 2016, 2 pages.
Office Action received for Chinese Patent Application No. 201710093861.2, mailed on Sep. 14, 2018, 15 pages.
Office Action received for Chinese Patent Application No. 201710094150.7, mailed on Dec. 19, 2018, 12 pages.
Office Action received for Chinese Patent Application No. 201710657424.9, mailed on Sep. 17, 2019, 23 pages.
Office Action received for Chinese Patent Application No. 201810094316.X, mailed on Oct. 29, 2018, 12 pages.
Office Action received for Chinese Patent Application No. 201810321928.8, mailed on Jul. 2, 2019, 10 pages.
Office Action received for Chinese Patent Application No. 201910990432.4, mailed on Dec. 28, 2020, 6 pages.
Office Action received for Chinese Patent Application No. 201910990432.4, mailed on May 18, 2020, 15 pages.
Office Action received for Chinese Patent Application No. 202080039642.6, mailed on Sep. 5, 2022, 12 pages.
Office Action received for Chinese Patent Application No. 202110011509.6, mailed on Oct. 11, 2021, 10 pages.
Office Action received for Chinese Patent Application No. 202111612841.4, mailed on Jul. 22, 2022, 13 pages.
Office Action received for Danish Patent Application No. PA201570664, mailed on Dec. 14, 2016, 2 pages.
Office Action received for Danish Patent Application No. PA201570664, mailed on Jun. 3, 2016, 3 pages.
Office Action received for Danish Patent Application No. PA201570664, mailed on Mar. 15, 2016, 10 pages.
Office Action received for Danish Patent Application No. PA201570665, mailed on Mar. 31, 2016, 9 pages.
Office Action received for Danish Patent Application No. PA201570665, mailed on Sep. 5, 2016, 3 pages.
Office Action received for Danish Patent Application No. PA201570771, mailed on Jun. 13, 2016, 3 pages.
Office Action received for Danish Patent Application No. PA201570771, mailed on Mar. 17, 2016, 8 pages.
Office Action received for Danish Patent Application No. PA201570773, mailed on Aug. 28, 2017, 3 pages.
Office Action received for Danish Patent Application No. PA201570773, mailed on Feb. 15, 2017, 3 pages.
Office Action Received for Danish Patent Application No. PA201570773, mailed on Mar. 18, 2016, 9 pages.
Office Action received for Danish Patent Application No. PA201570773, mailed on Sep. 12, 2016, 3 pages.
Office Action received for Danish Patent Application No. PA201570788, mailed on Apr. 8, 2016, 11 pages.
Office Action received for Danish Patent Application No. PA201570788, mailed on Sep. 13, 2016, 3 pages.
Office action received for Danish Patent Application No. PA201570791, mailed on Apr. 6, 2016, 12 pages.
Office action received for Danish Patent Application No. PA201570791, mailed on Sep. 6, 2016, 4 pages.
Office Action received for Danish Patent Application No. PA201670074, mailed on Apr. 7, 2016, 8 pages.
Office Action received for Danish Patent Application No. PA201670074, mailed on Jun. 28, 2016, 5 pages.

(56) References Cited

OTHER PUBLICATIONS

Office Action received for Danish Patent Application No. PA201670074, mailed on Mar. 16, 2017, 2 pages.
Office Action received for Danish Patent Application No. PA201670362, mailed on Jan. 29, 2018, 3 pages.
Office Action received for Danish Patent Application No. PA201670362, mailed on Jun. 1, 2017, 6 pages.
Office Action received for Danish Patent Application No. PA201670362, mailed on Nov. 21, 2016, 11 pages.
Office Action received for Danish Patent Application No. PA201670749, mailed on Jan. 30, 2017, 11 pages.
Office Action received for Danish Patent Application No. PA201670749, mailed on Oct. 3, 2017, 3 pages.
Office Action received for Danish Patent Application No. PA201670751, mailed on Jan. 13, 2017, 9 pages.
Office Action received for Danish Patent Application No. PA201670751, mailed on Nov. 13, 2017, 2 pages.
Office Action received for Danish Patent Application No. PA201970533, mailed on Apr. 20, 2021, 2 pages.
Office Action received for Danish Patent Application No. PA201970533, mailed on Jul. 17, 2020, 6 pages.
Office Action received for Danish Patent Application No. PA202070609, mailed on Dec. 10, 2020, 8 pages.
Office Action received for Danish Patent Application No. PA202070610, mailed on Jun. 18, 2021, 8 pages.
Office Action received for Danish Patent Application No. PA202070610, mailed on Mar. 14, 2022, 7 pages.
Office Action received for European Patent Application No. 15712218.5, mailed on Aug. 3, 2017, 4 pages.
Office Action received for European Patent Application No. 15727291.5, mailed on Jan. 15, 2018, 8 pages.
Office Action received for European Patent Application No. 15753796.0, mailed on Aug. 4, 2020, 9 pages.
Office Action received for European Patent Application No. 15753796.0, mailed on Jun. 2, 2022, 2 pages.
Office Action received for European Patent Application No. 15787091.6, mailed on Aug. 2, 2019, 8 pages.
Office Action received for European Patent Application No. 15787091.6, mailed on Oct. 8, 2018, 7 pages.
Office Action Received for European Patent Application No. 16201195.1, mailed on Feb. 14, 2018, 12 pages.
Office Action received for European Patent Application No. 16201205.8, mailed on Feb. 16, 2018, 12 pages.
Office Action received for European Patent Application No. 16708003.5, mailed on Feb. 22, 2021, 10 pages.
Office Action received for European Patent Application No. 17184710.6, mailed on Dec. 21, 2018, 7 pages.
Office Action received for European Patent Application No. 19722280.5, mailed on Oct. 4, 2021, 7 pages.
Office Action received for European Patent Application No. 20192404.0, mailed on Dec. 2, 2020, 8 pages.
Office Action received for European Patent Application No. 20192404.0, mailed on Jun. 8, 2021, 7 pages.
Office Action received for European Patent Application No. 20720310.0, mailed on Oct. 4, 2022, 9 pages.
Office Action received for European Patent Application No. 20729346.5, mailed on Jan. 17, 2022, 8 pages.
Office Action received for European Patent Application No. 20729346.5, mailed on Jul. 28, 2022, 9 pages.
Office Action received for German Patent Application No. 202015004267.8, mailed on Nov. 4, 2015, 4 pages.
Office Action received for Indian Patent Application No. 202017041557, mailed on Dec. 8, 2021, 8 pages.
Office Action received for Japanese Patent Application No. 2018-126311, mailed on Nov. 2, 2018, 4 pages.
Office Action received for Japanese Patent Application No. 2016-224507, mailed on Jun. 16, 2017, 16 pages.
Office Action received for Japanese Patent Application No. 2016-558332, mailed on Dec. 8, 2017, 12 pages.
Office Action received for Japanese Patent Application No. 2016-558332, mailed on Jul. 27, 2018, 9 pages.
Office Action received for Japanese Patent Application No. 2016-569665, mailed on Aug. 20, 2018, 9 pages.
Office Action received for Japanese Patent Application No. 2016-569665, mailed on Jan. 19, 2018, 10 pages.
Office Action received for Japanese Patent Application No. 2017-507413, mailed on May 25, 2018, 14 pages.
Office Action received for Japanese Patent Application No. 2017-545733, mailed on Feb. 13, 2018, 7 pages.
Office Action received for Korean Patent Application No. 10-2016-0152210, mailed on May 14, 2018, 13 pages.
Office Action received for Korean Patent Application No. 10-2017-0022365, mailed on Jun. 26, 2017, 10 pages.
Office Action received for Korean Patent Application No. 10-2017-0022546, mailed on Jun. 21, 2017, 12 pages.
Office Action received for Korean Patent Application No. 10-2017-0022582, mailed on Sep. 19, 2018, 6 pages.
Office Action received for Korean Patent Application No. 10-2017-7034558, mailed on Dec. 15, 2018, 15 pages.
Office Action received for Korean Patent Application No. 10-2020-7028759, mailed on Jun. 29, 2021, 12 pages.
Office Action received for Korean Patent Application No. 10-2022-7008567, mailed on Mar. 28, 2022, 5 pages.
Office Action received for Taiwanese Patent Application No. 104114953, issued on Feb. 18, 2017, 9 pages.
Office Action received for Taiwanese Patent Application No. 104114953, mailed on Jun. 8, 2016, 11 pages.
Office Action received for Taiwanese Patent Application No. 104117508, issued on Jul. 14, 2017, 9 pages.
Office Action received for Taiwanese Patent Application No. 104117508, issued on Jul. 20, 2016, 19 pages.
Office Action received for Taiwanese Patent Application No. 104117508, issued on Mar. 20, 2017, 22 pages.
Office Action received for Taiwanese Patent Application No. 104123593, mailed on May 24, 2016, 57 pages.
Office Action received for Taiwanese Patent Application No. 104123593, mailed on Sep. 13, 2016, 8 pages.
Office Action received for Taiwanese Patent Application No. 104128689, issued on Aug. 21, 2017, 8 pages.
Office Action received for Taiwanese Patent Application No. 104128689, mailed on Nov. 14, 2016, 12 pages.
Office Action received for Taiwanese Patent Application No. 104128700, mailed on Aug. 31, 2016, 13 pages.
Office Action received for Taiwanese Patent Application No. 104133756, issued on May 17, 2017, 13 pages.
Office Action received for Taiwanese Patent Application No. 104133757, issued on Jul. 6, 2016, 22 pages.
Office Action received for Taiwanese Patent Application No. 104107328, mailed on Dec. 28, 2016, 4 pages.
Ojeda-Zapata Julio, "Five Apps That Play Podcasts Directly from Your Apple Watch", Available online at: https://tidbits.com/2018/04/09/five-apps-that-play-podcasts-directly-from-your-apple-watch/, Apr. 9, 2018, 12 pages.
Pairing Your Apple Watch with Your AppleTV, Available online at: https://www.youtube.com/watch?v=C4t8YFSJ-UY, Apr. 27, 2015, 3 pages.
Playmemories Camera Apps, "PlayMemories Camera Apps Help Guide", available at <https://www.playmemoriescameraapps.com/portal/manual/IS9104-NPIA09014_00-F00002/en/index.html>, 2012, 3 pages.
Real Solution of two-step-authentication Password Management for Authentication Enhancement, Fukuda Takao, Nikkei PC, JPN, Nikkei Business Publications, Inc., No. 694, Mar. 24, 2014, 11 pages.
Remote Shot for SmartWatch 2, Available online at:—https://play.google.com/store/apps/details?id=net.watea.sw2.rshot&hl=en, Nov. 21, 2017, 3 pages.
Result of Consultation received for European Patent Application No. 17184710.6, mailed on Feb. 21, 2020, 6 pages.
Result of Consultation received for European Patent Application No. 17184710.6, mailed on Feb. 28, 2020, 3 pages.
Search Report and Opinion received for Danish Patent Application No. PA201970533, mailed on Oct. 25, 2019, 9 pages.

(56) References Cited

OTHER PUBLICATIONS

Search Report and Opinion received for Danish Patent Application No. PA202070610, mailed on Jan. 8, 2021, 9 pages.
Singh Ajit, "Mytunz: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.
Summons to Attend Oral Proceedings received for European Patent Application No. 16201195.1, mailed on Sep. 4, 2018, 21 pages.
Summons to Attend Oral Proceedings received for European Patent Application No. 16708003.5, mailed on Dec. 13, 2022, 11 pages.
Summons to Attend Oral Proceedings received for European Patent Application No. 17184710.6, mailed on Sep. 17, 2019, 7 pages.
Summons to Attend Oral Proceedings received for European Patent Application No. 20192404.0, mailed on Feb. 2, 2022, 11 pages.
Supplemental Notice of Allowance received for U.S. Appl. No. 14/805,403, mailed on Oct. 4, 2018, 3 pages.
Supplemental Notice of Allowance received for U.S. Appl. No. 15/433,238, mailed on Jun. 20, 2018, 2 pages.
Supplemental Notice of Allowance received for U.S. Appl. No. 16/147,523, mailed on Aug. 23, 2022, 2 pages.
Supplemental Notice of Allowance received for U.S. Appl. No. 16/867,002, mailed on Mar. 16, 2022, 2 pages.
Supplemental Notice of Allowance received for U.S. Appl. No. 16/867,002, mailed on Sep. 9, 2021, 2 pages.
Tech Smith, "Snagit 11 Snagit 11.4 Help", Available at: http://assets.techsmith.com/Downloads/ua-tutorials-snagit-11/Snagit_11.pdf, Jan. 2014, 2 pages.
Techsmith, "Snagit ® 11 Snagit 11.4 Help", available at <http://assets.techsmith.com/Downloads/ua-tutorials-snagit-11/Snagit_11.pdf>, Jan. 2014, 146 pages.
The Gadget Pill, "Sygic for Android Navigation with HUD", Available online at:—https://www.youtube.com/watch?v=fGqrycRevGU, Mar. 23, 2014, 1 page.
Walker Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Wearablezone, "How to Set Up Your Fitbit Profile", Online available at:—<https://youtu.be/jsWPtcDWiJM>, Jun. 6, 2016, 3 pages.
Whitney Lance, "How to Listen to Music on Your Apple Watch", Available Online at: https://medium.com/pcmag-access/how-to-listen-to-music-on-your-apple-watch-f48a6c20dd52#:~:text=On%20your%20iPhone%2C%20go%20to,.%E2%80%9D%20Tap%20on%20Add%20Music., Mar. 2, 2018, 13 pages.
Xdream, "TickTalk Video User Manual", YouTube [online] [video], Online available at: <https://youtu.be/jYhq3DwmVzo>, Mar. 17, 2017, 3 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
Applicant-Initiated Interview Summary received for U.S. Appl. No. 17/410,169, mailed on Apr. 25, 2023, 6 pages.
Final Office Action received for U.S. Appl. No. 17/746,807, mailed on Apr. 26, 2023, 16 pages.
Notice of Allowance received for Chinese Patent Application No. 202080039642.6, mailed on Apr. 17, 2023, 6 pages (2 pages of English Translation and 4 pages of Official Copy).
Result of Consultation received for European Patent Application No. 16708003.5, mailed on Apr. 18, 2023, 9 pages.
Applicant Initiated Interview Summary received for U.S. Appl. No. 17/746,807, mailed on Jun. 9, 2023, 2 pages.
Corrected Notice of Allowance received for U.S. Appl. No. 17/509,356, mailed on Jun. 13, 2023, 2 pages.
Intention to Grant received for European Patent Application No. 16708003.5, mailed on Jun. 14, 2023, 9 pages.
Applicant Initiated Interview Summary received for U.S. Appl. No. 17/746,807, mailed on Mar. 31, 2023, 2 pages.
Applicant-Initiated Interview Summary received for U.S. Appl. No. 17/509,356, mailed on Feb. 3, 2023, 3 pages.
Final Office Action received for U.S. Appl. No. 17/314,948, mailed on Mar. 7, 2023, 31 pages.
Final Office Action received for U.S. Appl. No. 17/410,169, mailed on Feb. 6, 2023, 47 pages.
Non-Final Office Action received for U.S. Appl. No. 17/746,807, mailed on Feb. 2, 2023, 14 pages.
Notice of Acceptance received for Australian Patent Application No. 2021250863, mailed on Jan. 13, 2023, 3 pages.
Notice of Allowance received for Chinese Patent Application No. 202111612841.4, mailed on Jan. 5, 2023, 3 pages (2 pages of English Translation & 1 page of Official Copy).
Notice of Allowance received for Japanese Patent Application No. 2022-139320, mailed on Jan. 6, 2023, 4 pages (1 page of English Translation and 3 pages of Official Copy).
Office Action received for Australian Patent Application No. 2022204555, mailed on Feb. 17, 2023, 5 pages.
Summons to Attend Oral Proceedings received for European Patent Application No. 20729346.5, mailed on Jan. 23, 2023, 11 pages.
Result of Consultation received for European Patent Application No. 20729346.5, mailed on Jun. 21, 2023, 3 pages.
Applicant-Initiated Interview Summary received for U.S. Appl. No. 17/975,141, mailed on Aug. 30, 2023, 4 pages.
International Search Report and Written Opinion received for PCT Patent Application No. PCT/US2023/012260, mailed on Aug. 2, 2023, 22 pages.
Invitation to Pay Additional Fees and Partial International Search Report received for PCT Patent Application No. PCT/US2023/012260, mailed on Jun. 7, 2023, 11 pages.
Intention to Grant received for European Patent Application No. 20729346.5, mailed on Jul. 10, 2023, 9 pages.
Minutes of the Oral Proceedings received for European Patent Application No. 20729346.5, mailed on Jul. 4, 2023, 6 pages.
Non-Final Office Action received for U.S. Appl. No. 17/746,807, mailed on Jul. 20, 2023, 14 pages.
Non-Final Office Action received for U.S. Appl. No. 17/975,141, mailed on Jul. 6, 2023, 22 pages.
Notice of Acceptance received for Australian Patent Application No. 2022204555, mailed on May 11, 2023, 3 pages.
Summons to Oral Proceedings received for European Patent Application No. 17184710.6, mailed on May 10, 2023, 3 pages.
International Search Report and Written Opinion received for PCT Patent Application No. PCT/US2022/044236, mailed on Mar. 27, 2023, 17 pages.
Notice of Allowance received for U.S. Appl. No. 17/509,356, mailed on Apr. 7, 2023, 11 pages.
Office Action received for European Patent Application No. 20720310.0, mailed on Apr. 11, 2023, 8 pages.
Han Sangwoo, "AR Glasses interaction prototype", Available Online at: https://sangwoohan.cargo.site/AR-Glasses-interaction-prototype, Oct. 2020, 4 pages.
Brief Communication regarding Oral Proceedings received for European Patent Application No. 16708003.5, mailed on May 8, 2023, 1 page.
Office Action received for European Patent Application No. 20720310.0, mailed on Jul. 25, 2023, 11 pages.
Applicant-Initiated Interview Summary received for U.S. Appl. No. 18/088,309, mailed on Oct. 27, 2023, 2 pages.
Decision to Grant received for European Patent Application No. 16708003.5, mailed on Oct. 19, 2023, 2 pages.
Intention to Grant received for European Patent Application No. 19722280.5, mailed on Sep. 26, 2023, 9 pages.
Non-Final Office Action received for U.S. Appl. No. 18/088,309, mailed on Sep. 21, 2023, 11 pages.
Office Action received for European Patent Application No. 20746429.8, mailed on Sep. 20, 2023, 10 pages.
Corrected Notice of Allowance received for U.S. Appl. No. 17/509,356, mailed on May 24, 2023, 2 pages.

(56) References Cited

OTHER PUBLICATIONS

Applicant-Initiated Interview Summary received for U.S. Appl. No. 17/410,169, mailed on Jan. 26, 2024, 5 pages.
Decision to Grant received for European Patent Application No. 19722280.5, mailed on Feb. 1, 2024, 2 pages.
Non-Final Office Action received for U.S. Appl. No. 18/197,681, mailed on Jan. 30, 2024, 32 pages.
Office Action received for Chinese Patent Application No. 202211558100.7, mailed on Jan. 8, 2024, 12 pages (6 pages of English Translation and 6 pages of Official Copy).
Applicant-Initiated Interview Summary received for U.S. Appl. No. 17/746,807, mailed on Nov. 3, 2023, 2 pages.
Decision to Grant received for European Patent Application No. 20729346.5, mailed on Nov. 16, 2023, 2 pages.
International Search Report and Written Opinion received for PCT Patent Application No. PCT/US2023/022410, mailed on Aug. 31, 2023, 21 pages.
Office Action received for Australian Patent Application No. 2023201920, mailed on Nov. 10, 2023, 2 pages.
Office Action received for Japanese Patent Application No. 2022-149476, mailed on Nov. 2, 2023, 9 pages (4 pages of English Translation and 5 pages of Official Copy).
Final Office Action received for U.S. Appl. No. 18/088,309, mailed on Jan. 9, 2024, 13 pages.
Intention to Grant received for European Patent Application No. 15753796.0, mailed on Jan. 12, 2024, 9 pages.
Summons to Attend Oral Proceedings received for European Patent Application No. 20720310.0, mailed on Jan. 3, 2024, 12 pages.
Applicant-Initiated Interview Summary received for U.S. Appl. No. 18/088,309, mailed on Feb. 28, 2024, 2 pages.
Final Office Action received for U.S. Appl. No. 17/410,169, mailed on Feb. 23, 2024, 49 pages.
Final Office Action received for U.S. Appl. No. 17/746,807, mailed on Feb. 20, 2024, 24 pages.
Notice of Acceptance received for Australian Patent Application No. 2023201920, mailed on Feb. 9, 2024, 3 pages.
Supplemental Notice of Allowance received for U.S. Appl. No. 17/975,141, mailed on Feb. 26, 2024, 2 pages.
Applicant-Initiated Interview Summary received for U.S. Appl. No. 18/197,681, mailed on Mar. 18, 2024, 4 pages.
Communication for Board of Appeal received for European Patent Application No. 17184710.6, mailed on Feb. 29, 2024, 13 pages.
Non-Final Office Action received for U.S. Appl. No. 17/410,169, mailed on Dec. 5, 2023, 48 pages.
Notice of Allowance received for U.S. Appl. No. 17/975,141, mailed on Dec. 7, 2023, 10 pages.
Advisory Action received for U.S. Appl. No. 18/197,681, mailed on Aug. 21, 2024, 5 pages.
Applicant-Initiated Interview Summary received for U.S. Appl. No. 17/410,169, mailed on May 8, 2024, 6 pages.
Applicant-Initiated Interview Summary received for U.S. Appl. No. 17/746,807, mailed on May 21, 2024, 2 pages.
Applicant-Initiated Interview Summary received for U.S. Appl. No. 18/088,309, mailed on Aug. 27, 2024, 2 pages.
Applicant-Initiated Interview Summary received for U.S. Appl. No. 18/088,309, mailed on Jun. 7, 2024, 2 pages.
Applicant-Initiated Interview Summary received for U.S. Appl. No. 18/228,597, mailed on Aug. 8, 2024, 4 pages.
Final Office Action received for U.S. Appl. No. 18/088,309, mailed on Aug. 1, 2024, 16 pages.
Final Office Action received for U.S. Appl. No. 18/197,681, mailed on Jun. 27, 2024, 30 pages.
Intention to Grant received for European Patent Application No. 15753796.0, mailed on Jun. 5, 2024, 8 pages.
Intention to Grant received for European Patent Application No. 20720310.0, mailed on Jun. 13, 2024, 13 pages.
International Preliminary Report on Patentability received for PCT Patent Application No. PCT/US2022/044236, mailed on Apr. 4, 2024, 12 pages.
International Preliminary Report on Patentability received for PCT Patent Application No. PCT/US2023/012260, mailed on Aug. 22, 2024, 15 pages.
Minutes of the Oral Proceedings received for European Patent Application No. 17184710.6, mailed on May 22, 2024, 4 pages.
Minutes of the Oral Proceedings received for European Patent Application No. 20720310.0, mailed on Jun. 7, 2024, 7 pages.
Non-Final Office Action received for U.S. Appl. No. 18/088,309, mailed on Apr. 9, 2024, 14 pages.
Non-Final Office Action received for U.S. Appl. No. 18/228,597, mailed on Jul. 8, 2024, 17 pages.
Notice of Allowance received for Chinese Patent Application No. 202211558100.7, mailed on Mar. 29, 2024, 3 pages (2 pages of English Translation and 1 page of Official Copy).
Notice of Allowance received for Japanese Patent Application No. 2022-149476, mailed on Aug. 2, 2024, 4 pages (1 page of English Translation and 3 pages of Official Copy).
Notice of Allowance received for U.S. Appl. No. 17/746,807, mailed on Jul. 3, 2024, 23 pages.
Notice of Allowance received for U.S. Appl. No. 17/975,141, mailed on Apr. 29, 2024, 9 pages.
Office Action received for Australian Patent Application No. 2023204647, mailed on Jul. 5, 2024, 3 pages.
Office Action received for Chinese Patent Application No. 202080039832.8, mailed on Mar. 23, 2024, 22 pages (12 pages of English Translation and 10 pages of Official Copy).
Office Action received for Indian Patent Application No. 202218027229, mailed on Jun. 13, 2024, 8 pages.
Office Action received for Japanese Patent Application No. 2022-149476, mailed on Apr. 22, 2024, 8 pages (4 pages of English Translation and 4 pages of Official Copy).
Office Action received for Korean Patent Application No. 10-2022-7032414, mailed on Mar. 26, 2024, 11 pages (5 pages of English Translation and 6 pages of Official Copy).
Result of Consultation received for European Patent Application No. 20720310.0, mailed on Apr. 17, 2024, 9 pages.
Result of Consultation received for European Patent Application No. 20720310.0, mailed on Jun. 4, 2024, 3 pages.
Supplemental Notice of Allowance received for U.S. Appl. No. 17/975,141, mailed on Aug. 12, 2024, 2 pages.

* cited by examiner

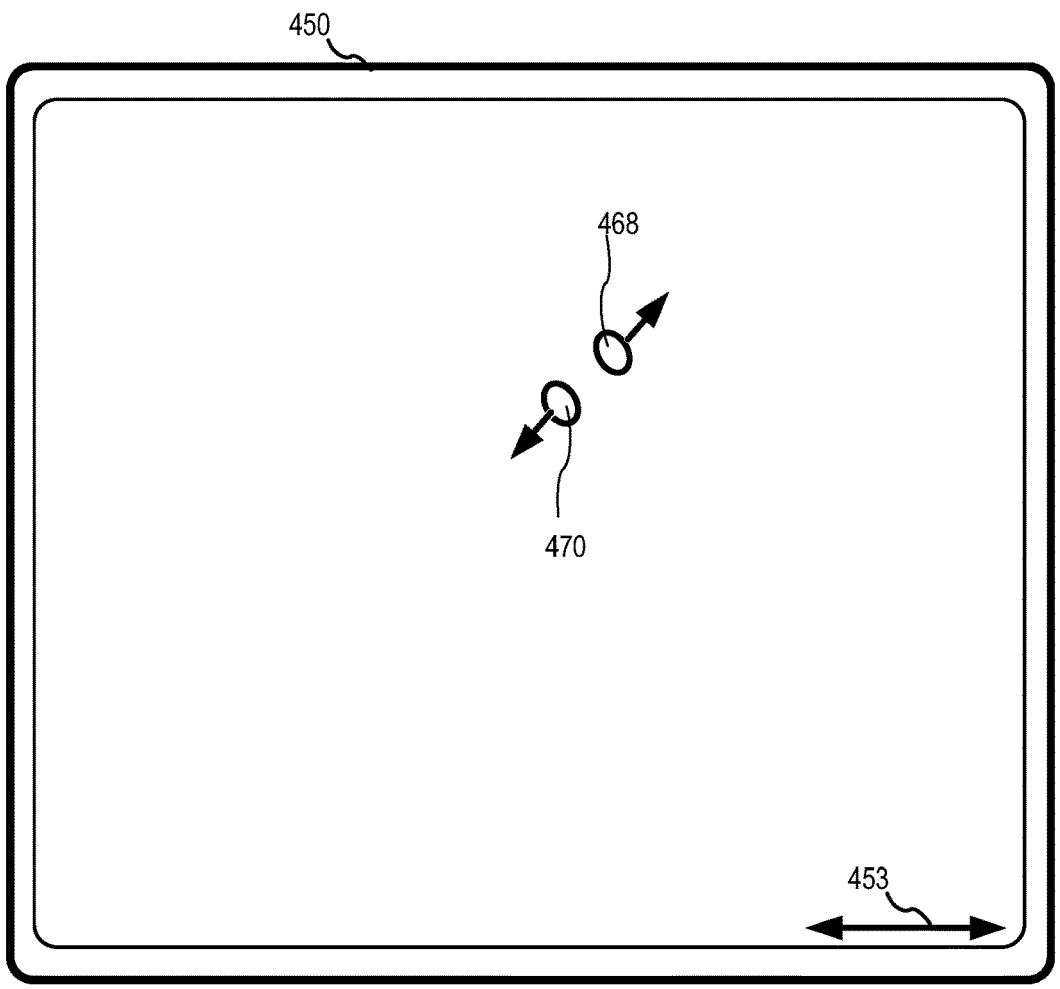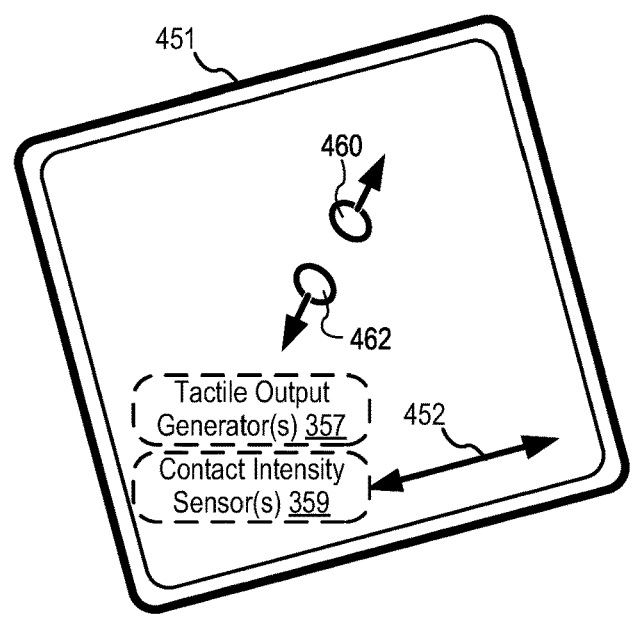
*FIG. 4B*

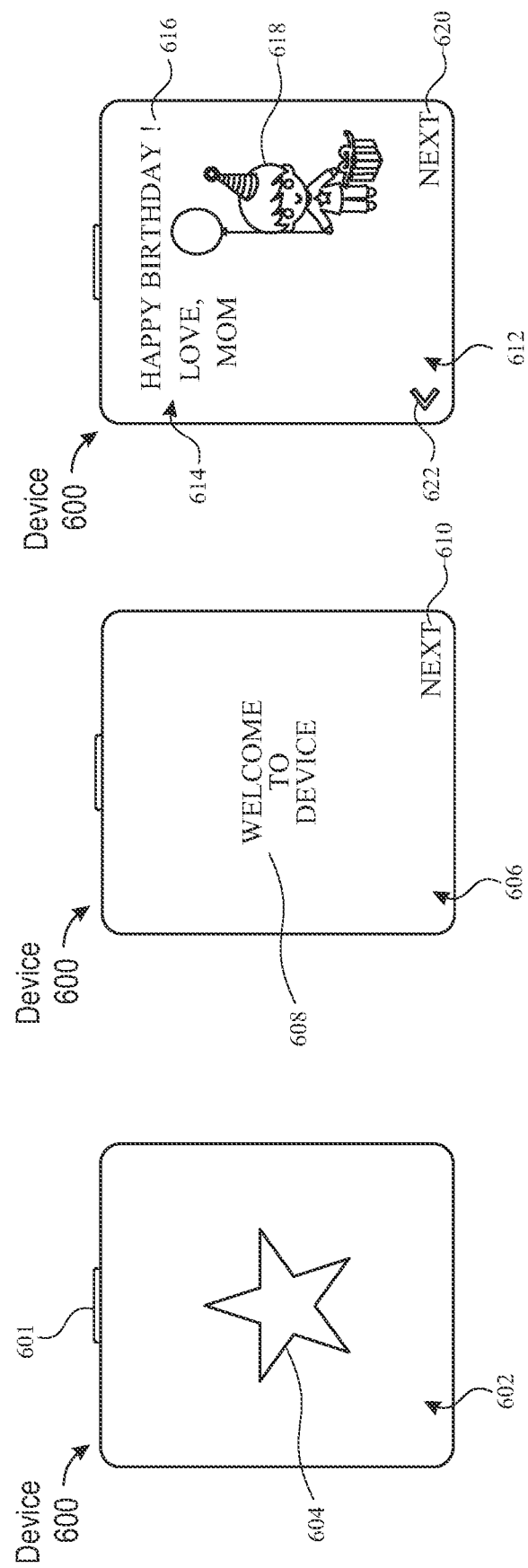

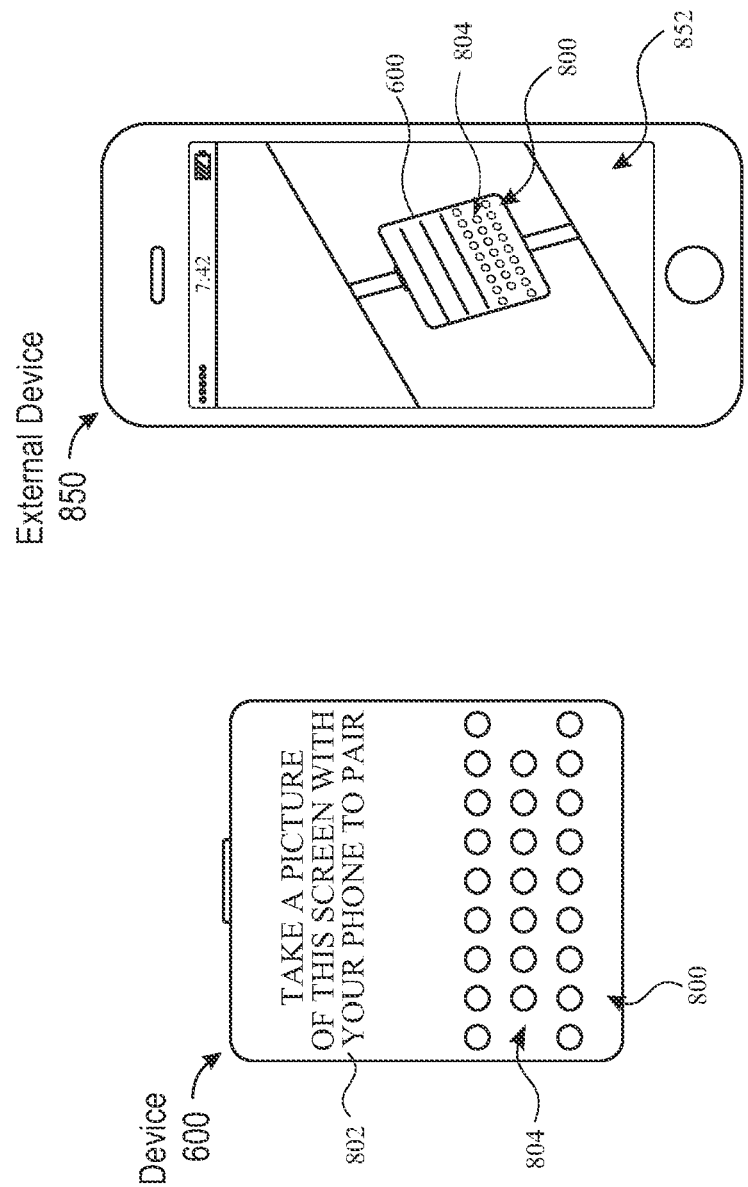

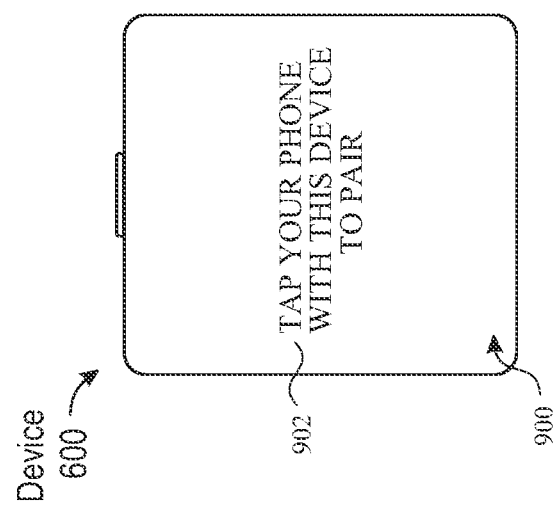

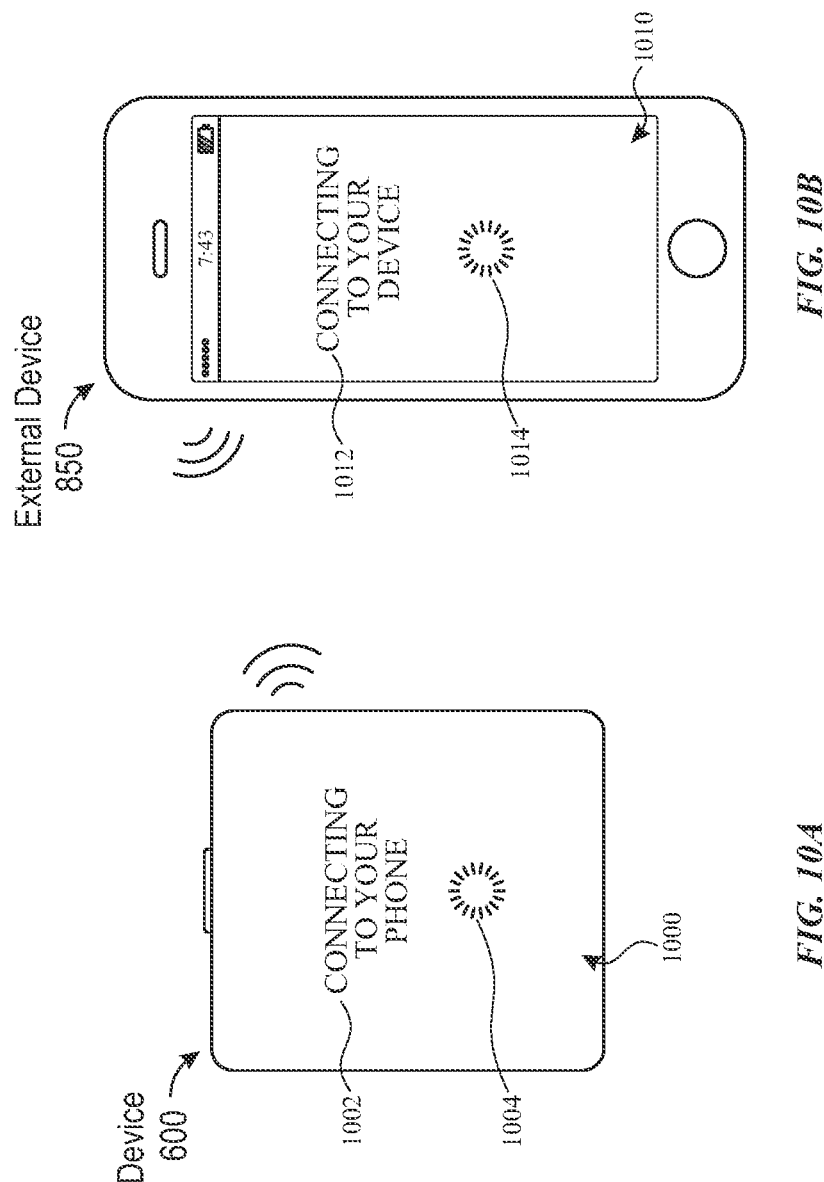

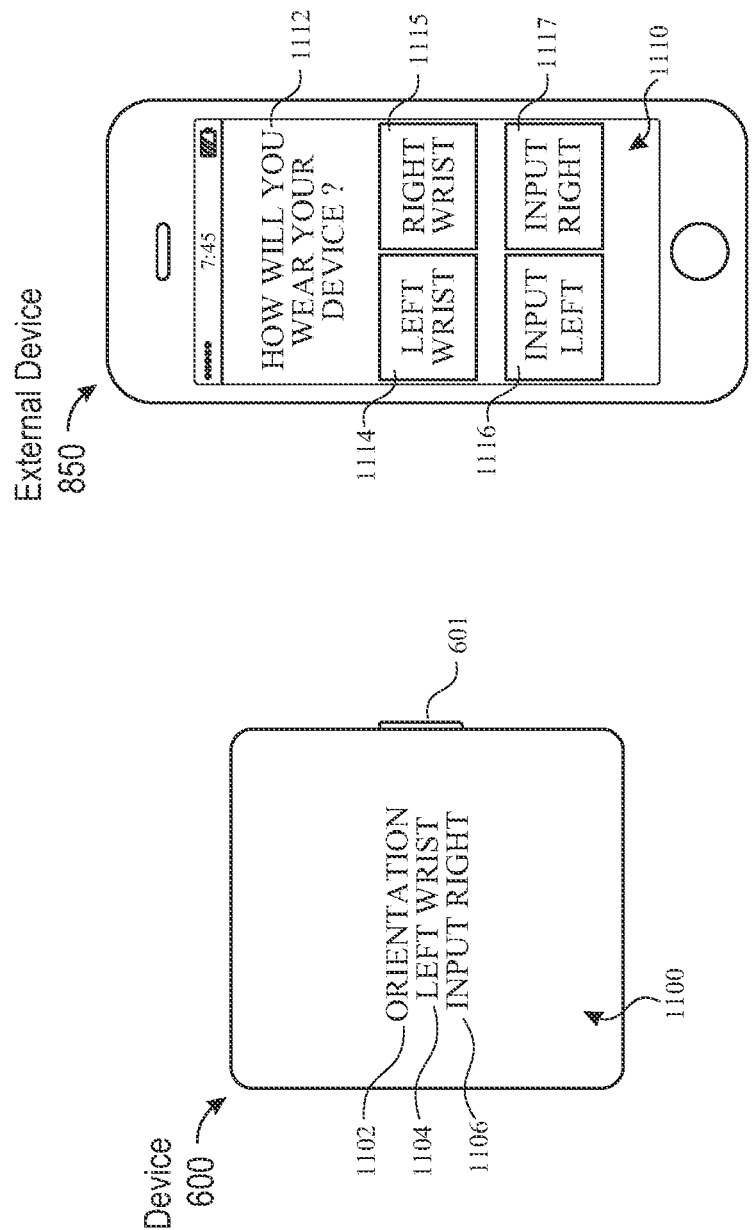

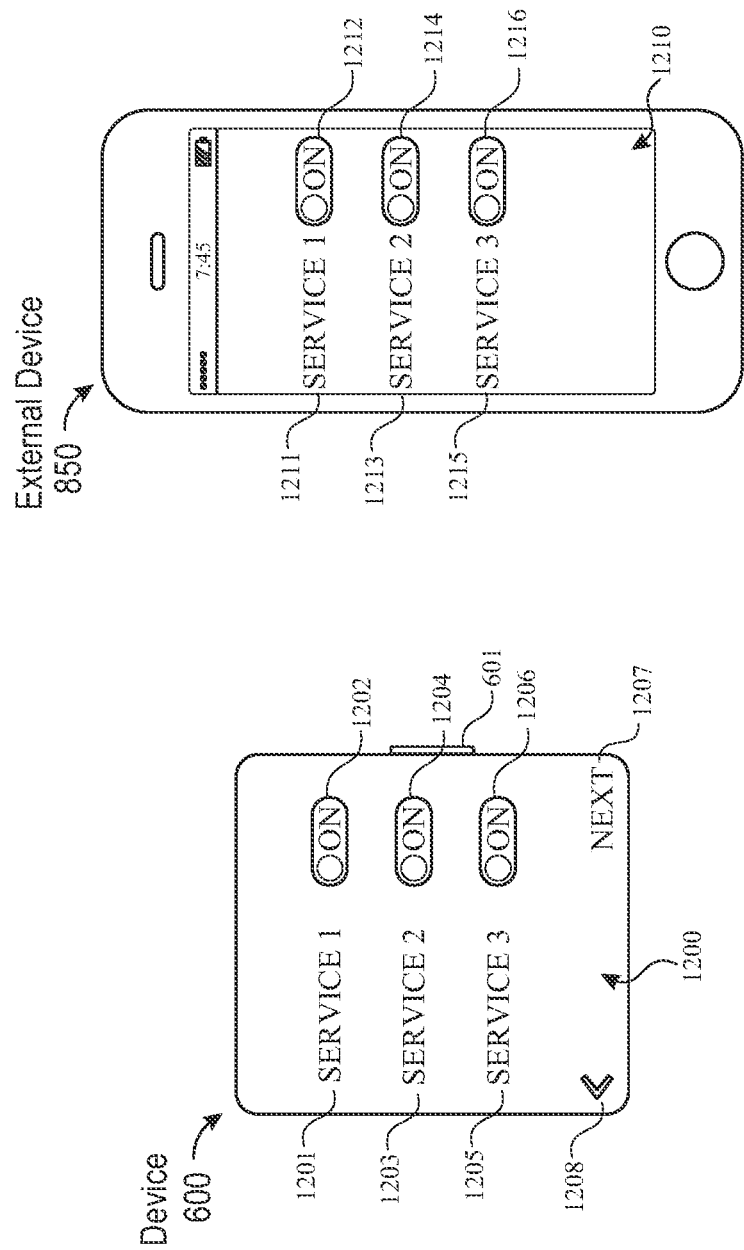

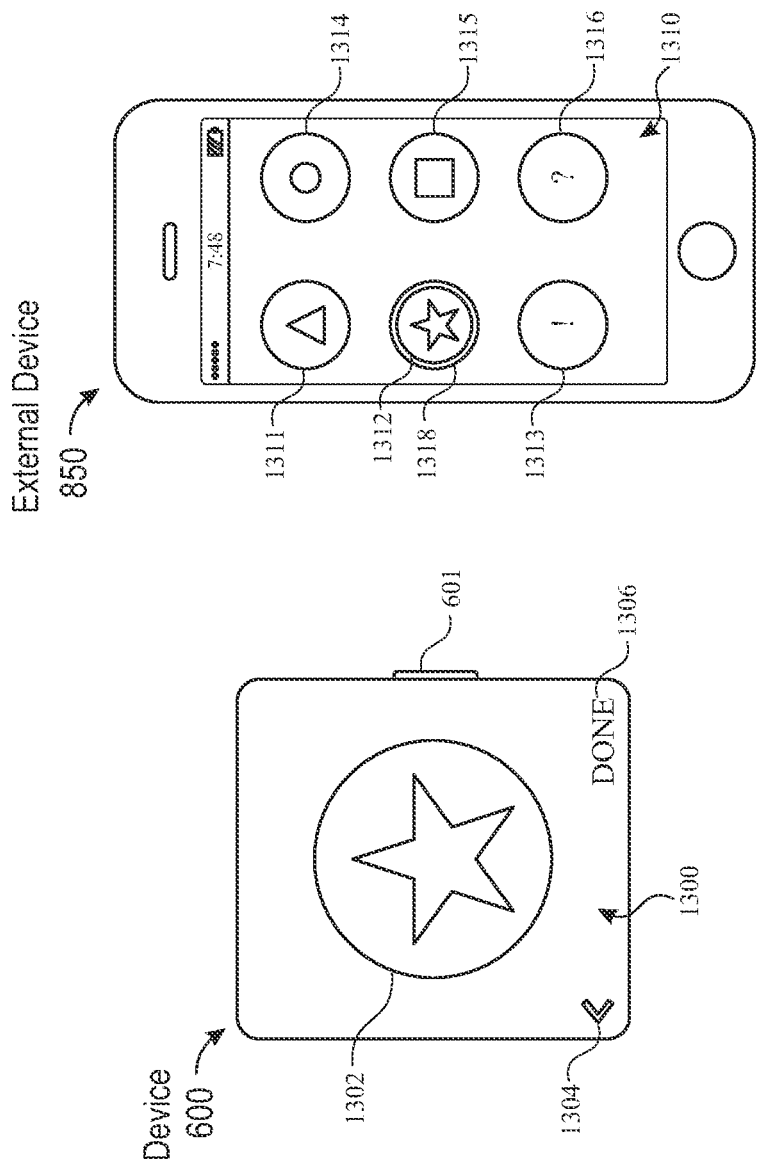

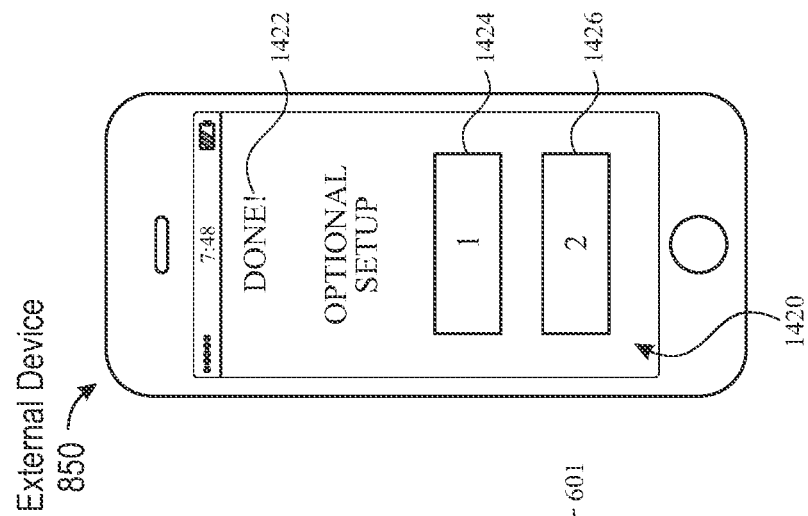
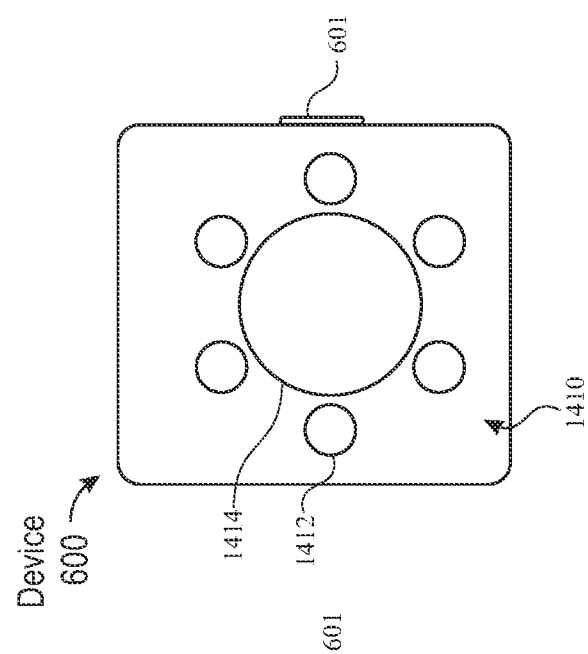
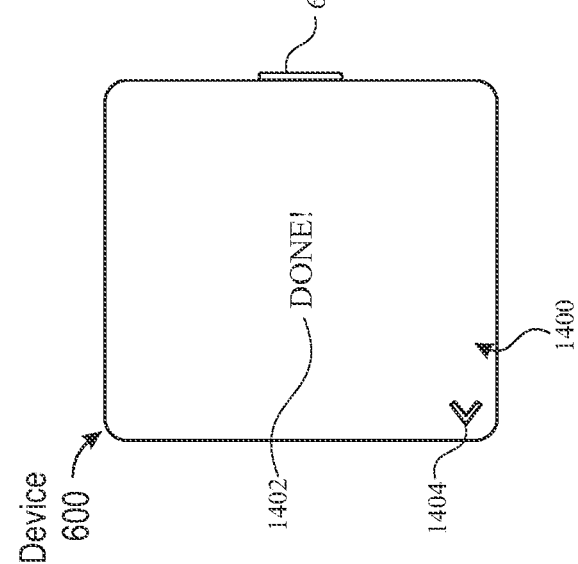
FIG. 14A
FIG. 14B
FIG. 14C

1700

---
1702

Invoke a wireless communications pairing mode for pairing the electronic device with an external device.

---
1704

Receive data from the external device.

---
1706

Detect movement indicative of a physical contact at the electronic device.

---
1708

In response to receiving the data and detecting the movement, registering the external device as a paired device.

Display a configuration interface for configuring an orientation in which a wearable electronic device with an asymmetric geometry is to be worn.

1804

Detect a user selection of the orientation.

1806

Send data representing the selected orientation to the wearable electronic device, wherein the selected orientation corresponds to a display orientation of the wearable electronic device.

Optionally, (1) the configuration interface comprises a first setting representing a first orientation and a second setting representing a second orientation, (2) a selection of the first orientation corresponds to a first display orientation of the wearable electronic device, and (3) a selection of the second orientation corresponds to a second display orientation of the wearable electronic device, wherein the second display orientation is rotated 180 degrees related to the first display orientation.

1902
Store a personalized electronic message, the electronic message stored before an initial device configuration of the electronic device.

1904
Detect a user instruction to power-on the electronic device.

1906
Determine whether the device configuration sequence has previously been initiated or completed.

No → (returns to 1904)
Yes ↓

1908
In response to a determination that the device configuration sequence has not previously been initiated or completed, display the electronic message upon power-on of the electronic device.

1910
Initiate the device configuration sequence.

1912
Display a user interface screen for device configuration.

Display, on the touch-sensitive display, at least one device initialization screen.

2004

Display an instruction screen instructing a user to pair the external device with the electronic device.

2006

Send first data via wireless communication.

2008

Display, on the touch-sensitive display, a pattern comprising identifying information of the electronic device.

2010

Receive second data indicating that the external device and the electronic device have been paired using the first data.

2012

Provide an aural or haptic indication that the electronic device and the external device have been paired.

*FIG. 20*

REDUCED SIZE CONFIGURATION INTERFACE

CROSS-REFERENCE TO RELATED APPLICATIONS

This application is a continuation of U.S. patent application Ser. No. 17/188,228, entitled "REDUCED SIZE CONFIGURATION INTERFACE," filed Mar. 1, 2021, which is a continuation of U.S. patent application Ser. No. 16/749,929, entitled "REDUCED SIZE CONFIGURATION INTERFACE," filed Jan. 22, 2020, which is a continuation of U.S. patent application Ser. No. 16/407,584, entitled "REDUCED SIZE CONFIGURATION INTERFACE," filed May 9, 2019, which is a continuation of U.S. patent application Ser. No. 15/366,607, entitled "REDUCED SIZE CONFIGURATION INTERFACE," filed Dec. 1, 2016, which is a continuation of U.S. patent application Ser. No. 14/839,913, entitled "REDUCED SIZE CONFIGURATION INTERFACE," filed Aug. 28, 2015, which claims the benefit of U.S. Provisional Patent Application Ser. No. 62/044,956, entitled "REDUCED SIZE CONFIGURATION INTERFACE," filed Sep. 2, 2014, and U.S. Provisional Patent Application Ser. No. 62/129,910, entitled "REDUCED SIZE CONFIGURATION INTERFACE," filed Mar. 8, 2015, the contents of each of which are hereby incorporated by reference in their entirety.

This application also relates to the following provisional applications: U.S. Patent Application Ser. No. 62/005,793, entitled "Companion Application for Activity Cooperation," filed May 30, 2014; and U.S. Patent Application Ser. No. 62/005,751, entitled "Predefined Wireless Pairing," filed May 30, 2014; the contents of which are hereby incorporated by reference in their entirety.

This application also relates to the following applications: International Patent Application Serial No. PCT/US2013/040087, entitled "Device, Method, and Graphical User Interface for Moving a User Interface Object Based on an Intensity of a Press Input," filed May 8, 2013; International Patent Application Serial No. PCT/US2013/040072, entitled "Device, Method, and Graphical User Interface for Providing Feedback for Changing Activation States of a User Interface Object," filed May 8, 2013; International Patent Application Serial No. PCT/US2013/040070, entitled "Device, Method, and Graphical User Interface for Providing Tactile Feedback for Operations Performed in a User Interface," filed May 8, 2013; International Patent Application Serial No. PCT/US2013/040067, entitled "Device, Method, and Graphical User Interface for Facilitating User Interaction with Controls in a User Interface," filed May 8, 2013; International Patent Application Serial No. PCT/US2013/040061, entitled "Device, Method, and Graphical User Interface for Displaying User Interface Objects Corresponding to an Application," filed May 8, 2013; International Patent Application Serial No. PCT/US2013/040058, entitled "Device, Method, and Graphical User Interface for Displaying Additional Information in Response to a User Contact," filed May 8, 2013; International Patent Application Serial No. PCT/US2013/040056, entitled "Device, Method, and Graphical User Interface for Scrolling Nested Regions," filed May 8, 2013; International Patent Application Serial No. PCT/US2013/040054, entitled "Device, Method, and Graphical User Interface for Manipulating Framed Graphical Objects," filed May 8, 2013; International Patent Application Serial No. PCT/US2013/069489, entitled "Device, Method, and Graphical User Interface for Switching Between User Interfaces," filed Nov. 11, 2013; International Patent Application Serial No. PCT/US2013/069486, entitled "Device, Method, and Graphical User Interface for Determining Whether to Scroll or Select Content," filed Nov. 11, 2013; International Patent Application Serial No. PCT/US2013/069484, entitled "Device, Method, and Graphical User Interface for Moving a Cursor According to a Change in an Appearance of a Control Icon with Simulated Three-Dimensional Characteristics," filed Nov. 11, 2013; International Patent Application Serial No. PCT/US2013/069483, entitled "Device, Method, and Graphical User Interface for Transitioning Between Touch Input to Display Output Relationships," filed Nov. 11, 2013; International Patent Application Serial No. PCT/US2013/069479, entitled "Device, Method, and Graphical User Interface for Forgoing Generation of Tactile Output for a Multi-Contact Gesture," filed Nov. 11, 2013; International Patent Application Serial No. PCT/US2013/069472, entitled "Device, Method, and Graphical User Interface for Navigating User Interface Hierarchies," filed Nov. 11, 2013; International Patent Application Serial No. PCT/US2013/040108, entitled "Device, Method, and Graphical User Interface for Moving and Dropping a User Interface Object," filed May 8, 2013; International Patent Application Serial No. PCT/US2013/040101, entitled "Device, Method, and Graphical User Interface for Selecting User Interface Objects," filed May 8, 2013; International Patent Application Serial No. PCT/US2013/040098, entitled "Device, Method, and Graphical User Interface for Displaying Content Associated with a Corresponding Affordance," filed May 8, 2013; International Patent Application Serial No. PCT/US2013/040093, entitled "Device, Method, and Graphical User Interface for Transitioning Between Display States in Response to a Gesture," filed May 8, 2013; International Patent Application Serial No. PCT/US2013/040053, entitled "Device, Method, and Graphical User Interface for Selecting Object within a Group of Objects," filed May 8, 2013; U.S. Patent Application Ser. No. 61/778,211, entitled "Device, Method, and Graphical User Interface for Facilitating User Interaction with Controls in a User Interface," filed Mar. 12, 2013; U.S. Patent Application Ser. No. 61/778,191, entitled "Device, Method, and Graphical User Interface for Displaying User Interface Objects Corresponding to an Application," filed Mar. 12, 2013; U.S. Patent Application Ser. No. 61/778,171, entitled "Device, Method, and Graphical User Interface for Displaying Additional Information in Response to a User Contact," filed Mar. 12, 2013; U.S. Patent Application Ser. No. 61/778,179, entitled "Device, Method and Graphical User Interface for Scrolling Nested Regions," filed Mar. 12, 2013; U.S. Patent Application Ser. No. 61/778,156, entitled "Device, Method, and Graphical User Interface for Manipulating Framed Graphical Objects," filed Mar. 12, 2013; U.S. Patent Application Ser. No. 61/778,125, entitled "Device, Method, And Graphical User Interface for Navigating User Interface Hierarchies," filed Mar. 12, 2013; U.S. Patent Application Ser. No. 61/778,092, entitled "Device, Method, and Graphical User Interface for Selecting Object Within a Group of Objects," filed Mar. 12, 2013; U.S. Patent Application Ser. No. 61/778,418, entitled "Device, Method, and Graphical User Interface for Switching Between User Interfaces," filed Mar. 13, 2013; U.S. Patent Application Ser. No. 61/778,416, entitled "Device, Method, and Graphical User Interface for Determining Whether to Scroll or Select Content," filed Mar. 13, 2013; U.S. Patent Application Ser. No. 61/747,278, entitled "Device, Method, and Graphical User Interface for Manipulating User Interface Objects with Visual and/or Haptic Feedback," filed Dec. 29, 2012; U.S. Patent Application Ser. No. 61/778,414, entitled "Device, Method, and Graphical User Interface for Moving and Dropping a User Interface Object," filed Mar. 13, 2013; U.S. Patent Application Ser. No. 61/778,413, entitled "Device, Method, and Graphical User Interface for Selecting User Interface Objects," filed Mar. 13, 2013; U.S. Patent Application Ser. No. 61/778,412, entitled "Device, Method, and Graphical User Interface for Displaying Content Associated with a Corresponding Affordance," filed Mar. 13, 2013; U.S. Patent Application Ser. No. 61/778,373, entitled "Device, Method, and Graphical User Interface for Managing Activation of a Control Based on Contact Intensity," filed Mar. 12, 2013; U.S. Patent Application Ser. No. 61/778,265, entitled "Device, Method, and Graphical User Interface for Transitioning Between Display States in Response to a Gesture," filed Mar. 12, 2013; U.S. Patent Application Ser. No. 61/778,367, entitled "Device, Method, and Graphical User Interface for Moving a User Interface Object Based on an Intensity of a Press Input," filed Mar. 12, 2013; U.S. Patent Application Ser. No. 61/778,363, entitled "Device, Method, and Graphical User Interface for Transitioning Between Touch Input to Display Output Relationships," filed Mar. 12, 2013; U.S. Patent Application Ser. No. 61/778,287, entitled "Device, Method, and Graphical User Interface for Providing Feedback for Changing Activation States of a User Interface Object," filed Mar. 12, 2013; U.S. Patent Application Ser. No. 61/778,284, entitled "Device, Method, and Graphical User Interface for Providing Tactile Feedback for Operations Performed in a User Interface," filed Mar. 12, 2013; U.S. Patent Application Ser. No. 61/778,239, entitled "Device, Method, and Graphical User Interface for Forgoing Generation of Tactile Output for a Multi-Contact Gesture," filed Mar. 12, 2013; and U.S. Patent Application Ser. No. 61/688,227, entitled "Device, Method, and Graphical User Interface for Manipulating User Interface Objects with Visual and/or Haptic Feedback," filed May 9, 2012.

This application also relates to the following application: U.S. Utility application Ser. No. 12/987,982, entitled "Intelligent Automated Assistant," filed Jan. 10, 2011.

The content of these applications is hereby incorporated by reference in its entirety.

BACKGROUND

1. Field

The present disclosure relates generally to computer user interfaces, and more specifically to user interfaces and techniques for setting up an electronic device.

2. Description of Related Art

Modern electronic devices often have many customizable features that can be set by a user according to the user's preferences. These features may include the ability to perform various tasks or services which a user may turn on or off based on personal preferences regarding privacy, data usage, battery life, or the like. Thus, there is an opportunity to provide techniques and interfaces for allowing a user to set up and configure an electronic device. Modern electronic devices are also capable of communicating with other electronic devices via, for example, wireless communication. The ability to communicate with other devices may allow devices to share information and interact with each other. Thus, there is also an opportunity to provide techniques for establishing communication between devices and to use the communication to improve a setup process.

BRIEF SUMMARY

In some embodiments, a method comprises: at an electronic device with a camera, invoking a wireless communications pairing mode for pairing the electronic device with an external device; obtaining an image via the camera, the image containing a pattern displayed on a display screen of the external device, the pattern comprising identifying information of the external device; receiving data from the external device; determining whether the received data corresponds with the identifying information; and in response to a determination that the received data corresponds with the identifying information, registering the external device as a paired device.

In some embodiments, an electronic device includes a camera unit configured to obtain images and a processing unit coupled to the camera unit. The processing unit is configured to invoke a wireless communications pairing mode for pairing the electronic device with an external device; enable obtaining of an image via the camera unit, the image containing a pattern displayed on a display screen of the external device, the pattern comprising identifying information of the external device; and receive data from the external device. The processing unit is further configured to determine whether the received data corresponds with the identifying information; and, in response to a determination that the received data corresponds with the identifying information, register the external device as a paired device.

In some embodiments, a method comprises: at an electronic device with a camera, invoking a wireless communications pairing mode for pairing the electronic device with an external device, wherein the pairing mode is initially in a first state in which the electronic device will not pair with the external device; obtaining an image via the camera, the image containing a first pattern displayed on a display screen of the external device; determining whether the first pattern corresponds with a predetermined pattern; in response to a determination that the first pattern corresponds with the predetermined pattern, setting the pairing mode to a second state in which the electronic device will pair with the external device; receiving data from the external device; and in response to receiving the data from the external device, registering the external device as a paired device.

In some embodiments, an electronic device includes a camera unit configured to obtain images and a processing unit coupled to the camera unit. The processing unit is configured to invoke a wireless communications pairing mode for pairing the electronic device with an external device, wherein the pairing mode is initially in a first state in which the electronic device will not pair with the external device, and enable obtaining of an image via the camera unit, the image containing a first pattern displayed on a display screen of the external device. The processing unit is further configured to determine whether the first pattern corresponds with a predetermined pattern, and, in response to a determination that the first pattern corresponds with the predetermined pattern, set the pairing mode to a second state in which the electronic device will pair with the external device. The processing unit is further configured to receive data from the external device and, in response to receiving the data from the external device, register the external device as a paired device.

In some embodiments, a method comprises: at an electronic device, invoking a wireless communications pairing mode for pairing the electronic device with an external device; receiving data from the external device; detecting movement indicative of a physical contact at the electronic device; and in response to receiving the data and detecting the movement, registering the external device as a paired device.

In some embodiments, an electronic device includes a processing unit configured to invoke a wireless communications pairing mode for pairing the electronic device with an external device, receive data from the external device, detect movement indicative of a physical contact at the electronic device, and, in response to receiving the data and detecting the movement, register the external device as a paired device.

In some embodiments, a method comprises: at an electronic device with a touch-sensitive display, displaying a configuration interface for configuring an orientation in which a wearable electronic device with an asymmetric geometry is to be worn; detecting a user selection of the orientation; and sending data representing the selected orientation to the wearable electronic device, wherein: the selected orientation corresponds to a display orientation of the wearable electronic device.

In some embodiments, an electronic device includes a touch-sensitive surface unit configured to receive contacts, a display unit configured to display a graphic user interface, and a processing unit coupled to the display unit and the touch-sensitive surface unit. The processing unit is configured to enable display of a configuration interface for configuring an orientation in which a wearable electronic device with an asymmetric geometry is to be worn, detect a user selection of the orientation, and enable sending of data representing the selected orientation to the wearable electronic device, wherein the selected orientation corresponds to a display orientation of the wearable electronic device.

In some embodiments, a method comprises: at an electronic device with a display, wherein the electronic device is configured to initiate a device configuration sequence upon power-on of the electronic device, storing a personalized electronic message, wherein the electronic message is stored before an initial device configuration of the electronic device; detecting a user instruction to power-on the electronic device; determining whether the device configuration sequence has previously been initiated or completed; in response to a determination that the device configuration sequence has not previously been initiated or completed, displaying the electronic message upon power-on of the electronic device; and after displaying the electronic message: initiating the device configuration sequence; and displaying a user interface screen for device configuration.

In some embodiments, an electronic device configured to initiate a device configuration sequence upon power-on of the electronic device includes a display unit configured to display a graphic user interface and a processing unit coupled to the display unit. The processing unit is configured to store a personalized electronic message, wherein the electronic message is stored before an initial device configuration of the electronic device, detect a user instruction to power-on the electronic device, and determine whether the device configuration sequence has previously been initiated or completed. The processing unit is further configured to, in response to a determination that the device configuration sequence has not previously been initiated or completed, enable display of the electronic message upon power-on of the electronic device, and, after enabling display of the electronic message, initiate the device configuration sequence, and enable display of a user interface screen for device configuration.

In some embodiments, a method of initializing an electronic device using an external device, the electronic device including a touch-sensitive display, comprises: at the electronic device, displaying, on the touch-sensitive display, at least one device initialization screen; after displaying the at least one device initialization screen, displaying an instruction screen instructing a user to pair the external device with the electronic device; sending first data via wireless communication; displaying, on the touch-sensitive display, a pattern comprising identifying information of the electronic device; receiving second data indicating that the external device and the electronic device have been paired using the first data; and after receiving the second data, providing an aural or haptic indication that the electronic device and the external device have been paired.

In some embodiments, an electronic device configured to be initialized using an external device includes a touch-sensitive surface unit configured to receive contacts, a display unit configured to display a graphic user interface, and a processing unit coupled to the touch-sensitive surface unit and the display unit. The processing unit is configured to enable display of at least one device initialization screen, and, after enabling display of the at least one device initialization screen, enable display of an instruction screen instructing a user to pair the external device with the electronic device. The processing unit is further configured to enable sending of first data via wireless communication, enable display of a pattern comprising identifying information of the electronic device, receive second data indicating that the external device and the electronic device have been paired using the first data, and, after receiving the second data, enable an aural or haptic indication that the electronic device and the external device have been paired.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 4A and 4B illustrate an exemplary user interface for a menu of applications on a portable multifunction device in accordance with some embodiments.

FIGS. 6A-6C illustrate exemplary user interface screens.
FIGS. 8A-8B illustrate exemplary user interface screens.
FIG. 9 illustrates an exemplary user interface screen.
FIGS. 10A-10B illustrate exemplary user interface screens.

FIGS. 11A-11B illustrate exemplary user interface screens.

FIGS. 12A-12B illustrate exemplary user interface screens.

FIGS. 13A-13B illustrate exemplary user interface screens.

FIGS. 14A-14C illustrate exemplary user interface screens.

FIG. 17 is a flow diagram illustrating a process for pairing an electronic device with an external device.

FIG. 18 is a flow diagram illustrating a process for configuring an orientation in which a wearable electronic device with an asymmetric geometry is to be worn is displayed.

FIG. 19 is a flow diagram illustrating a process for displaying a personalized message on the display of an electronic device.

FIG. 20 is a flow diagram illustrating a process for setting up an electronic device.

DETAILED DESCRIPTION

Figure 1A:
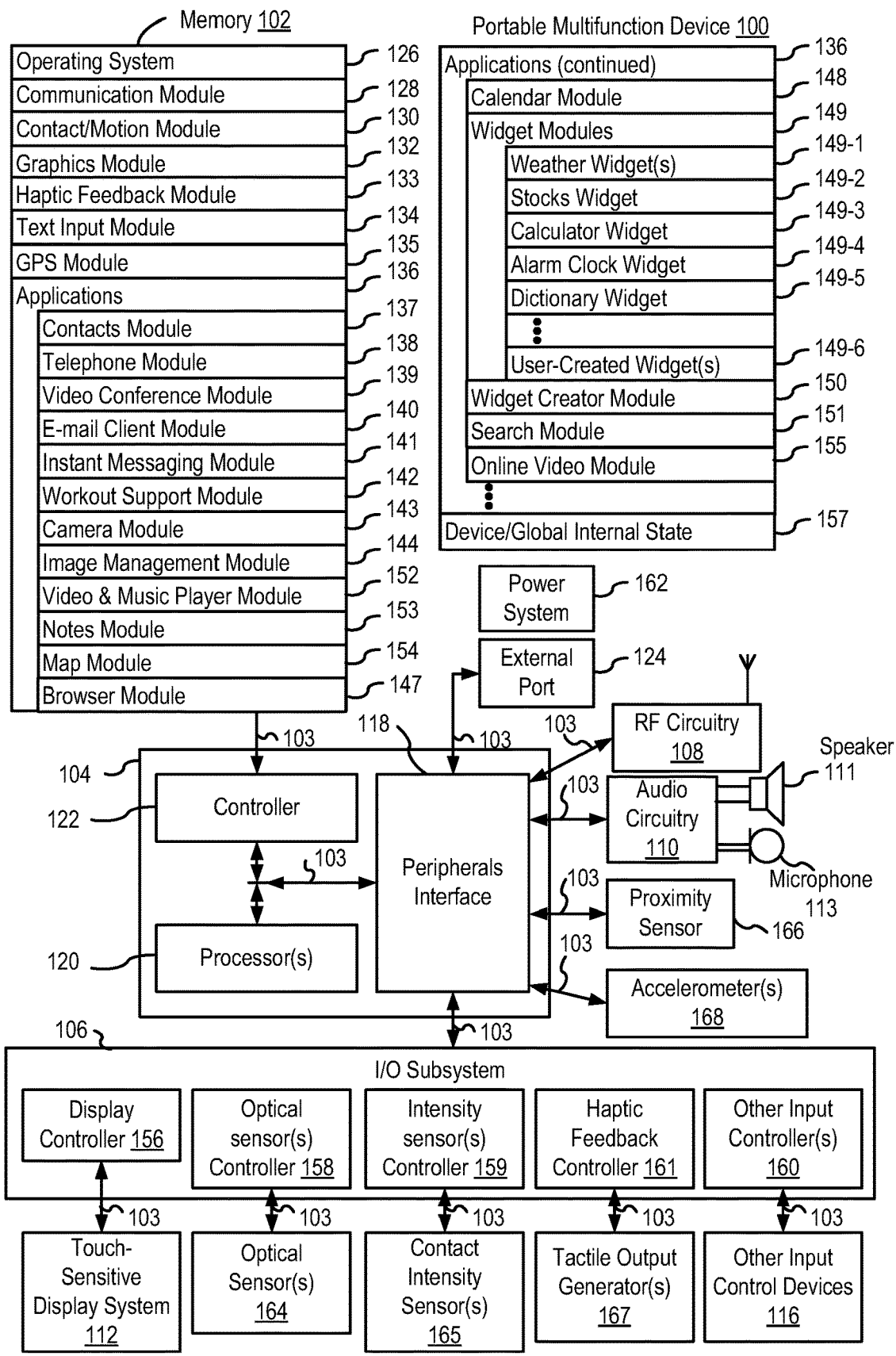
FIG. 1A is a block diagram illustrating a portable multifunction device with a touch-sensitive display in accordance with some embodiments.

In the following description of the disclosure and embodiments, reference is made to the accompanying drawings in which it is shown by way of illustration specific embodiments that can be practiced. It is to be understood that other embodiments and examples can be practiced and changes can be made without departing from the scope of the disclosure.

There is a need to set up a personal electronic device upon booting up the device for the first time or upon resetting the device. Setting up the device may include, among other things, initializing systems and programs that run on the device and configuring the device. An initial device configuration sequence may include installing software, setting device parameters, receiving and storing information (e.g., contact information of user contacts), etc. An initial device configuration sequence may also allow a user to set and/or change configuration parameters of the device according to his or her personal preferences. Boot up is a desirable time to prompt a user to set parameters that are critical to operating the device or that the user may not have intuitively known were configurable. For example, the device may display a sequence of user interface screens to guide the user through an initial device configuration sequence in which the user may set certain configuration parameters. The initial configuration sequence should be simple, clear, quick, efficient, and intuitive.

Setup may also include pairing the electronic device with an external or companion device. As used here, pairing two electronic devices includes establishing a means of communication between the two devices. The means of communication may include those described in U.S. Patent Application Ser. No. 62/005,751, "Predefined Wireless Pairing," filed May 30, 2014, which is incorporated in this disclosure by reference. Once the devices are paired, they may exchange data including data that may be used during initial device configuration. Pairing may also allow a device to be configured using a user interface provided by the other paired device. For example, recent advances in computer technology have enabled manufacturers to produce powerful computing devices in relatively small form factors. However, small devices may be unable to provide a user interface large enough to be suitable for user configuration. Instead, the device being configured may be paired with an external device with a larger user interface that provides the ability to set parameters on the device being configured. Such techniques can reduce the time and effort required to begin using the device and can make the device more useful to the user.

Below, FIGS. 1A-1B, 2, 3, 4A-4B, and 5A-5B illustrate exemplary devices upon which the techniques described herein for setting up an electronic device may be applied. FIGS. 6A-6C, 7A-7B, 8A-8B, 9, 10A-10B, 11A-11B, 12A-12B, 13A-13B, and 14A-14C depict exemplary user interfaces for setting up an electronic device. The user interfaces in the figures are used to illustrate the processes described below, including the processes in FIGS. 15-20.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 may be analogous to the multi-touch sensitive touchpads described in the following U.S. Pat. No. 6,323, 846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
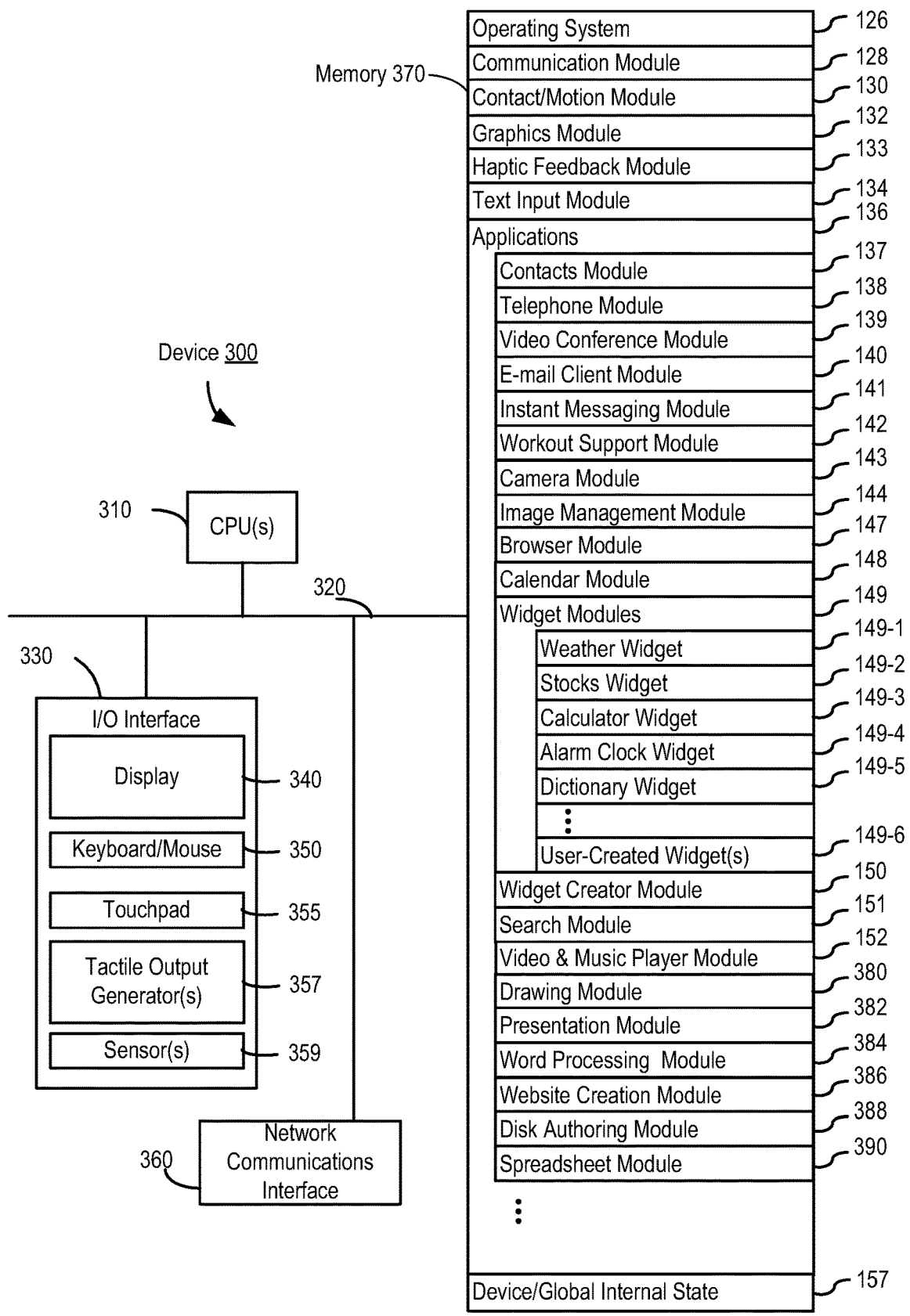
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
  Contacts module 137 (sometimes called an address book or contact list);
  Telephone module 138;
  Video conferencing module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
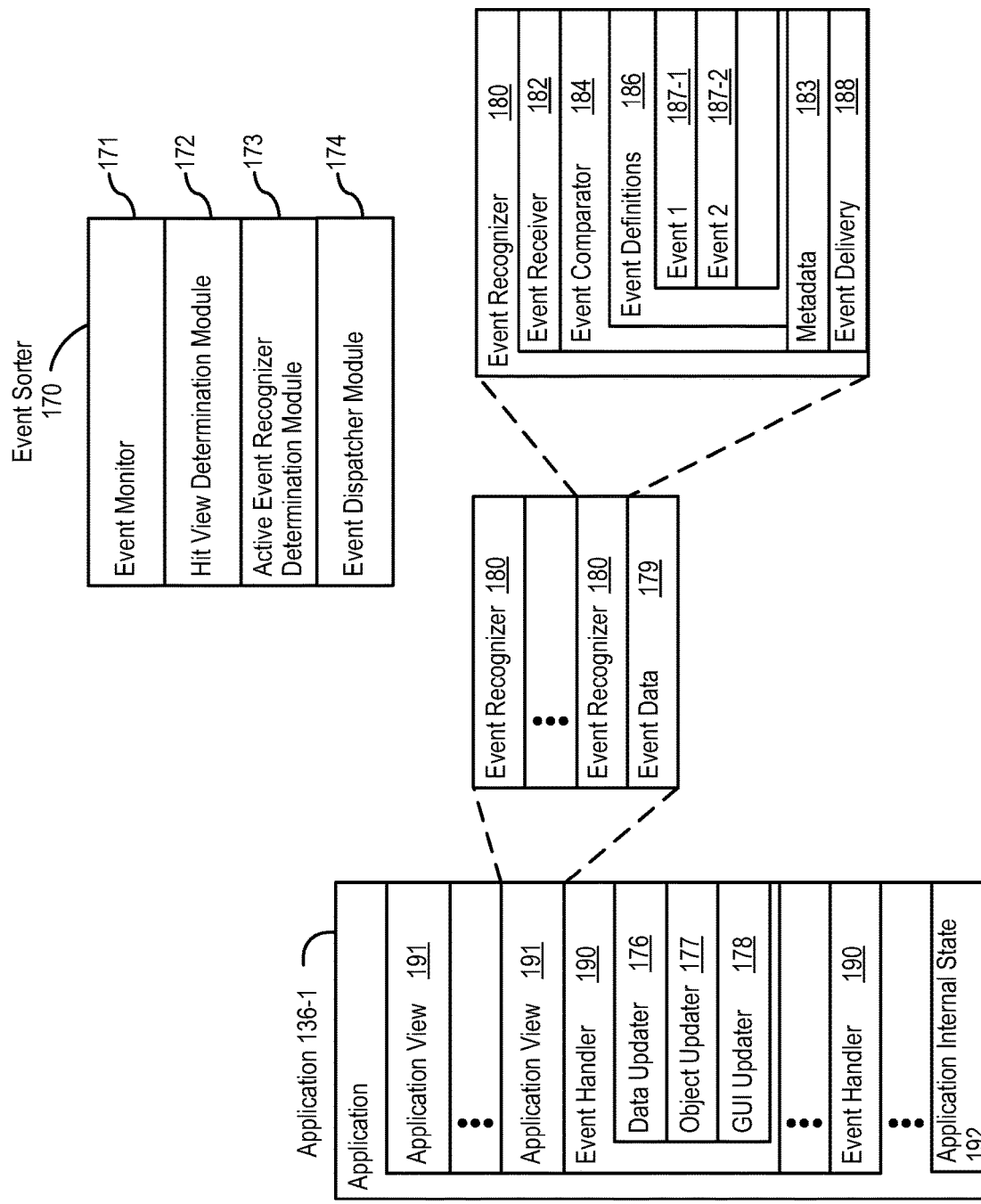
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
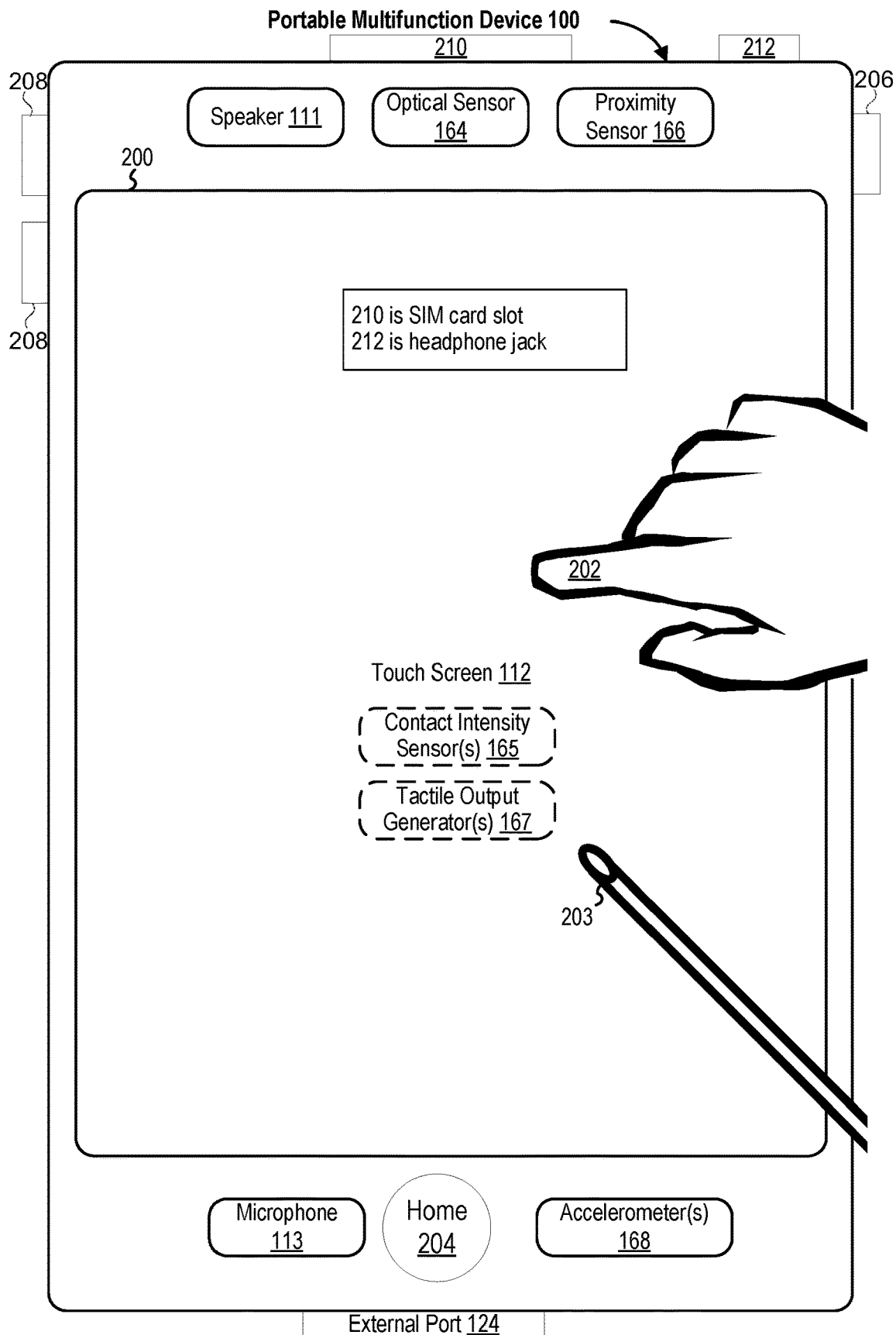
FIG. 2 illustrates a portable multifunction device having a touch-sensitive display in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
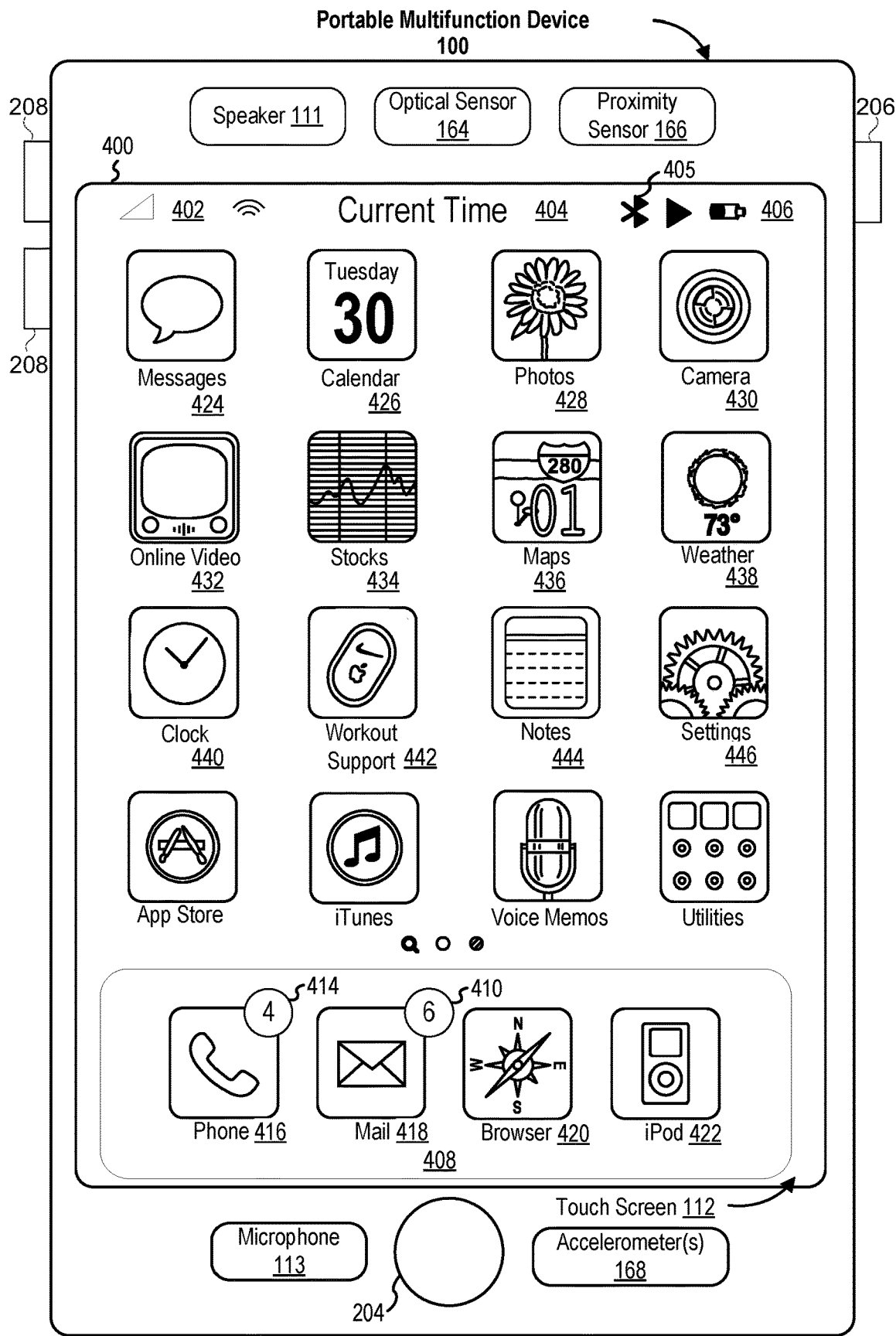

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser;" and
    Icon 422 for video and music player module 152, also referred to as iPod (trademark of Apple Inc.) module 152, labeled "iPod;" and
Icons for other applications, such as:
    Icon 424 for IM module 141, labeled "Messages;"
    Icon 426 for calendar module 148, labeled "Calendar;"
    Icon 428 for image management module 144, labeled "Photos;"
    Icon 430 for camera module 143, labeled "Camera;"
    Icon 432 for online video module 155, labeled "Online Video;"
    Icon 434 for stocks widget 149-2, labeled "Stocks;"
    Icon 436 for map module 154, labeled "Maps;"
    Icon 438 for weather widget 149-1, labeled "Weather;"
    Icon 440 for alarm clock widget 149-4, labeled "Clock;"
    Icon 442 for workout support module 142, labeled "Workout Support;"
    Icon 444 for notes module 153, labeled "Notes;" and
    Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
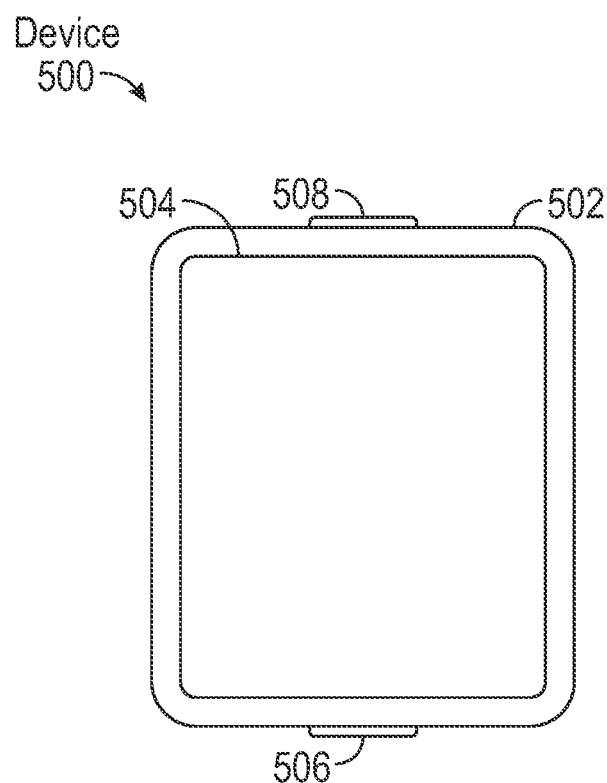
FIG. 5A is a block diagram illustrating a portable multifunction device with a touch-sensitive display and a rotatable input mechanism in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013 and International Patent Application Serial No. PCT/US2013/069483, titled "Device, Method, and Graphical User Interface for Transitioning Between Touch Input to Display Output Relationships," filed Nov. 11, 2013.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
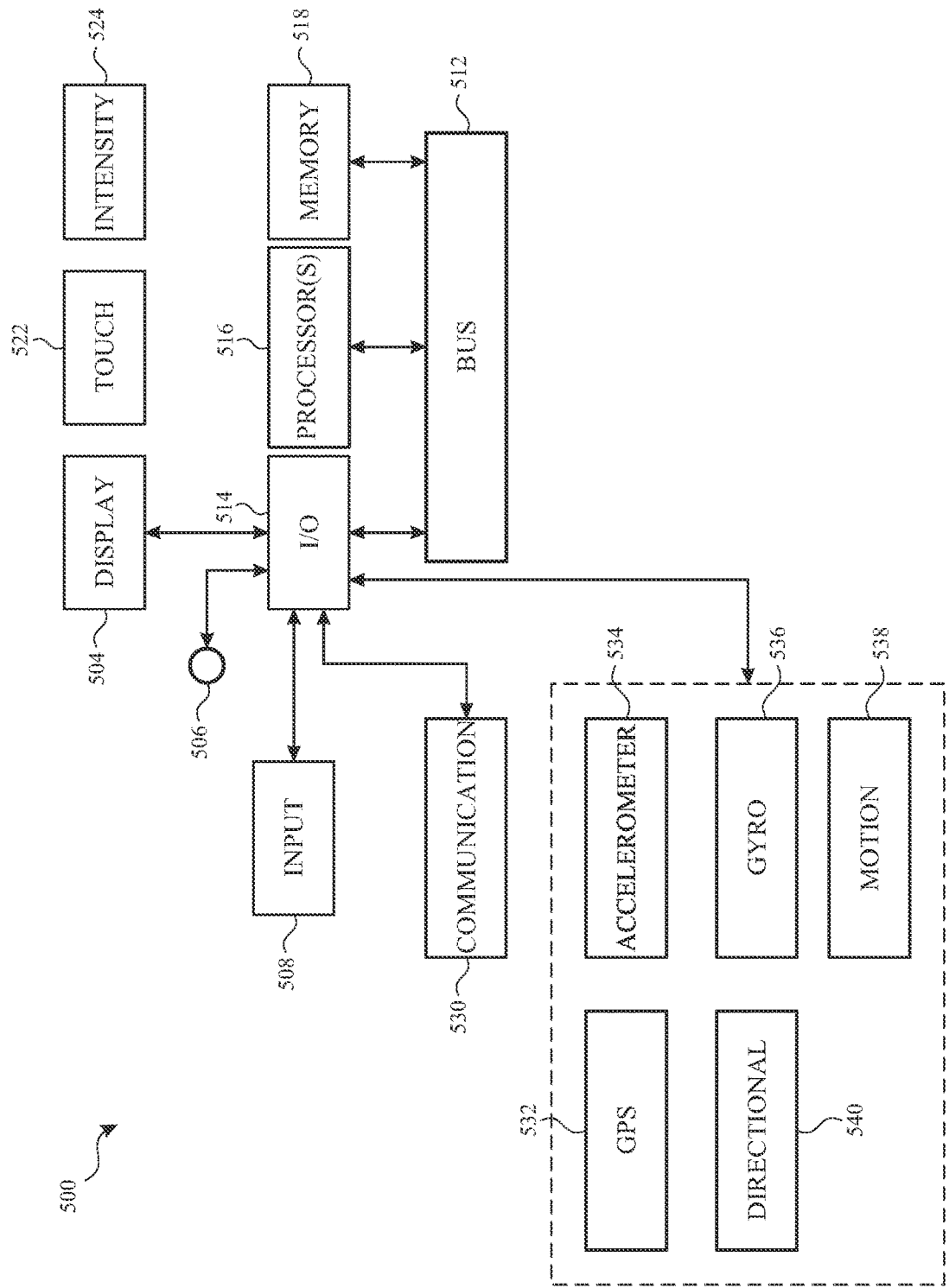
FIG. 5B illustrates a portable multifunction device having a touch-sensitive display and a rotatable input mechanism in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 1500-2000 (FIGS. 15-20). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces and associated processes that may be implemented on a multifunction device with a display and a touch-sensitive surface, such as devices 100, 300, and/or 500 (FIGS. 1A, 3A, and/or 5A), to improve a user's experience in setting up the device. For brevity, the functionalities described herein may be referred to as "setup" functionalities.

User interfaces for configuring an electronic device are illustrated by exemplary screens that one or more devices 100, 300, and/or 500 can display as part of a device setup process.

1. Initialization

FIGS. 6A-6C demonstrate exemplary initialization screens for an electronic device. FIG. 6A shows an exemplary electronic device 600. In some embodiments, device 600 may be one or more of devices 100 (FIG. 1), 300 (FIG. 3), and/or 500 (FIG. 5). For purposes of illustration, device 600 is a personal electronic device with a touch-sensitive display, such as personal electronic device 500. In the embodiment illustrated in FIG. 6A, personal electronic device 600 includes a rotatable input mechanism 601 on one of its sides, which may give an asymmetric physical geometry to device 600.

In FIG. 6A, an exemplary boot-up screen 602 is displayed on device 600. Boot-up screen 602 may be displayed in response to an instruction to power-on or restart device 600. The command may be a software command or a user input via hardware, such as a button press or a touch on a user interface object displayed on the touch-sensitive display. Boot-up screen 602 may be displayed during at least some portion of a boot-up process. The boot-up process may include operations such as performing a power-on self-test, locating and initializing peripheral devices, loading and starting an operating system or other software, or the like. Boot-up screen 602 may show any desired text, image, icon, animation, video, or the like. In FIG. 6A, boot-up screen 602 shows an icon 604 in the shape of a star.

FIG. 6B shows an exemplary welcome screen 606 that device 600 can display on its display. Device 600 may transition from displaying boot-up screen 602 to displaying welcome screen 606 after at least a portion of the boot-up process has completed. Welcome screen 606 may include a welcome message containing any desired text, image, icon, animation, video, or the like. In FIG. 6B, welcome screen 606 shows welcome message 608, which includes text that identifies device 600.

Welcome screen 606 may also include an affordance 610 showing the text "NEXT". As used here, the term "affordance" refers to a user-interactive graphical user interface object that may be displayed on the display screen of device 600 as well as devices 100, 300, and/or 500 (FIGS. 1, 3, and 5). For example, an image (e.g., icon), a button, and text (e.g., hyperlink) may each constitute an affordance. In some embodiments, a user may select an affordance via a mouse gesture (e.g., hover, click, double-click, drag). In some embodiments, a user may select an affordance via a touch-based gesture (e.g., tap, swipe, flick, long touch).

In the example of FIG. 6B, a user may select the displayed affordance 610 to instruct device 600 to continue to the next step or screen in the initialization process. For example, in response to a tap gesture on affordance 610, electronic device 600 may continue the initialization process. Alternatively, a user may cause the electronic device 600 to transition to the next screen or continue the initialization process by a swipe gesture from right to left on the touch-sensitive display or using the rotatable input mechanism 601.

In one embodiment, electronic device 600 continues the initialization process by transitioning the display to an optional personalized message screen. A personalized message screen may include a personalized message containing any desired text, image, icon, animation, video, or the like and may have been received and loaded onto the device prior to shipping. FIG. 6C shows an exemplary personalized message screen 612 that includes a personalized message 614 with text 616 that says "HAPPY BIRTHDAY! LOVE, MOM" and an icon 618 showing a child with a party hat, present, and balloon.

Personalized message screen 612 also includes affordances 620 and 622. Affordance 620 has an icon including the text "NEXT". A user may select affordance 620 to instruct device 600 to continue to the next step or screen in the initialization process. That is, in response to a tap gesture on affordance 620, electronic device 600 continues the initialization process. Affordance 622 includes an icon of an arrow head pointing to the left. A user may select affordance 622 to cause device 600 to display the previous screen. That is, in response to a tap gesture on affordance 622, electronic device 600 returns to a previous step or displays a screen displayed prior to screen 612.

In one embodiment, the personalized message 614 is created or chosen by a user and is received and loaded onto device 600 before device 600 is initially configured. The personalized message 614 may be personalized for an intended user of the electronic device 600. For example, the message 614 shown in FIG. 6C may be chosen by a mother who intends to give the device 600 to her child as a birthday present. The personalized message 614 may be obtained at the point-of-sale of device 600. For example, the personalized message 614 may be input into a point-of-sale device (e.g., a computer, server, etc.) that sends the personalized message 614 to device 600. Device 600 may receive the personalized message 614 and store it in local memory prior to being configured for the first time (i.e., before an initial device configuration).

Upon detecting an instruction to power-on device 600 (e.g., via a user input or software command), device 600 may determine whether a device configuration sequence has previously been initiated or completed. In response to determining that the device configuration sequence has not previously been initiated or that the device configuration sequence was initiated but not completed, the electronic device may display a personalized message screen 612 with the personalized message 614 before initiating the device configuration sequence or during the device configuration sequence. Alternatively, in response to determining that the device configuration sequence has previously been initiated and completed, the electronic device may bypass display of the personalized message screen and display the next scheduled screen.

In some embodiments, the personalized electronic message 614 is not displayed again after an initial device configuration has been completed. However, the electronic device 600 may also be capable of being reset so that it returns to a state in which it is as though device 600 has never been configured (e.g., the device configuration sequence has not previously been initiated or completed). In this case, the personalized electronic message 614 may be displayed again upon power-on after having been reset.

Figures 7A, 7B:
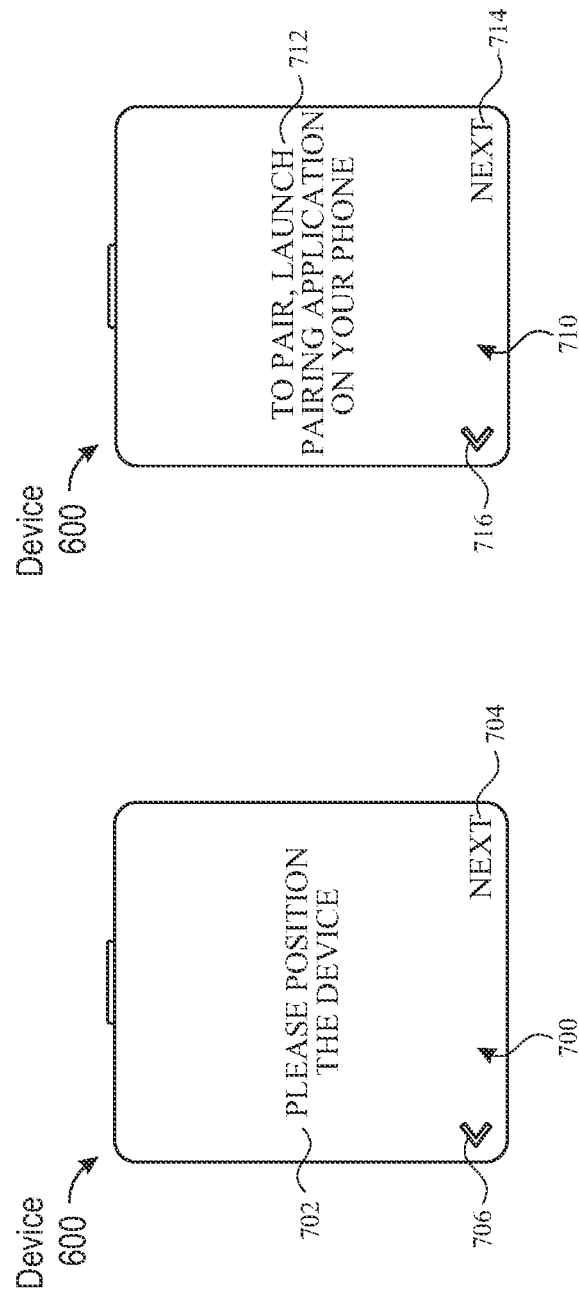
FIGS. 7A-7B illustrate exemplary user interface screens.

Turning now to FIG. 7A, an exemplary instruction screen 700 that device 600 can display on its display is described. The instruction screen 700 may include an image, icon, animation, video, text, or the like that prompts the user to take an action. For example, instruction screen 700 includes text 702 instructing the user to position the device. In one embodiment, a user may be instructed to attach the electronic device 600 to a body part such as one of the user's wrist.

Instruction screen 700 also includes affordances 704 and 706. Affordance 704 has an icon including the text "NEXT". Selecting affordance 704 may instruct device 600 to continue to the next step or screen. That is, in response to a tap gesture on affordance 704, electronic device 600 continues the setup process. A user may select affordance 704 to indicate that the user has complied or intends to comply with the instruction 702. In an alternate embodiment, the device detects, using one or more biometric sensors, that the user has positioned the device and advances to screen 710 without the need for user contacting affordance 704. Affordance 706 includes an icon of an arrow head pointing to the left. A user may select affordance 706 to cause device 600 to display the previous screen. That is, in response to a tap gesture on affordance 706, electronic device 600 returns to a previous step or displays a screen displayed prior to screen 700.

FIG. 7B shows another exemplary instruction screen 710 that device 600 can display on its display. Instruction screen 710 may be displayed to prompt a user to take an action that will initiate pairing of the electronic device 600 with an external electronic device, such as the user's phone. In some embodiments, the external device may be one or more of devices 100 (FIG. 1), 300 (FIG. 3), and/or 500 (FIG. 5). For the purpose of illustration in the examples and descriptions that follow, the external device is described with reference to phone 850 shown in FIG. 8B (e.g., an iPhone®) discussed in greater detail below.

The external device may operate in a pairing mode that allows it to pair with another device, such as device 600. As used herein, pairing mode refers to an operating mode in which two devices attempt to register one another for future wireless communications. For example, the process of initially connecting two Bluetooth-enabled devices involves entering into pairing mode on the devices.

In some embodiments, wireless communication, for purposes of pairing, occurs over a peer-to-peer wireless communication protocol such as Bluetooth and/or Bluetooth Low Energy (BTLE). In some embodiments, wireless communication for purposes of pairing functionality utilizes more than one wireless communication protocol. For example, WiFi may be used in addition to BTLE. In these embodiments, an initial communication between two devices may occur over a lower powered protocol, such as BTLE, even if the protocol yields a slower data transfer speed. Subsequent communications may occur over a secondary network that is relatively faster, such as WiFi.

The pairing mode of the external device may be invoked by running a software program. The software program may be part of an operating system or an application program. In one embodiment, the external device displays an affordance (e.g., a selectable icon) representing an application for pairing the external device with another device (e.g., device 600). Selecting the application affordance may launch the application and invoke the pairing mode.

In some embodiments, the application affordance is displayed on the external device only when device 600 is within communication range of the external device. For example, device 600 may wirelessly transmit data that represents a request to pair or that indicates it is capable of pairing with another device. If the external device is not within communication range, the affordance is not displayed. However, if the external device receives the data, and therefore is within communication range of device 600, then the application affordance is displayed.

In another embodiment, when the external device is not within range, the application affordance is displayed but in a manner which indicates that the application cannot be launched. For example, the application affordance may appear greyed-out or semi-transparent to indicate that the application cannot be launched. When the external device comes within communication range of device 600, the visual appearance of the application affordance may be changed to indicate that the application can be invoked.

In some embodiments, the external device may include a setting that allows a user to turn on or off a range-dependent display feature of the application affordance. That is, the user may determine whether or not the display and/or appearance of the application affordance should depend on whether the external device is within range of a device with which it can pair.

Returning to FIG. 7B, instruction screen 710 includes text 712 instructing the user to launch an application on the user's phone to pair the device 600. In one embodiment, the application is launched by executing a tap gesture on an affordance associated with the application displayed on the user's phone. The application may invoke a wireless communications pairing mode for pairing the device 600 with the user's phone.

Instruction screen 710 also includes affordances 714 and 716. Affordance 714 has an icon including the text "NEXT". Selecting affordance 714 may instruct device 600 to continue to the next step or screen. That is, in response to a tap gesture on affordance 714, electronic device 600 continues the setup process. Accordingly, a user may select affordance 714 to indicate that the user has complied or intends to comply with the instruction 712. That is, selecting affordance 714 may indicate that the user has or intends to launch an application program for pairing the phone with the electronic device. Affordance 716 includes an icon of an arrow head pointing to the left. A user may select affordance 716 to cause device 600 to display the previous screen. That is, in response to a tap gesture on affordance 716, electronic device 600 returns to a previous step or displays a screen displayed prior to screen 710.

2. Pairing

FIG. 8A shows another exemplary instruction screen 800 that device 600 can display on its display. Instruction screen 800 may be displayed after screen 710 to facilitate pairing the device 600 with an external device 850. Instruction screen 800 includes text 802 instructing the user to take a picture of instruction screen 800 with a camera on the user's phone to pair the electronic device 600 with the user's phone.

Instruction screen 800 also includes an image containing a pattern 804. The displayed image may include wavelengths that are visible to the human eye. Alternatively, the image may only include wavelengths that are invisible to the human eye, but which can be produced by the display on device 600 and detected by the camera of phone 850. In one embodiment, the instruction screen 800 may display an invisible image containing the pattern 804 along with a visible image. The visible image may be aesthetically appealing to the user, while the invisible image may be less appealing but contains more information and/or is easier to recognize and/or process by a processor facilitating the pairing.

The pattern 804 may be used to identify or authenticate the device 600. In one embodiment, the pattern comprises identifying information of the device 600. Identifying information may include any design, symbol, pattern, sequence, indication, or the like that identifies the device 600, such as a quick response code or a bar code. The identifying information may be unique to device 600 or may generally indicate the type of device (e.g., iPhone®, wearable electronic device, etc.).

FIG. 8B shows exemplary external device 850 that may be paired with device 600. In FIG. 8B, external device 850 is a phone with a camera that may be used to take a picture of device 600 while instruction screen 800 is displayed. Using the camera of external device 850, a user may obtain an image containing a visual representation of the device 600 including the pattern 804 displayed on the screen of electronic device 600. FIG. 8B shows external device 850 displaying an example of an obtained image 852 of electronic device 600. Image 852 shows electronic device 600 displaying instruction screen 800 with the pattern 804.

External device 850 may process the obtained image 852 to extract the identifying information contained in the pattern 804. External device 850 may then use the extracted identifying information to authenticate the device 600 for pairing. In one embodiment, the electronic device 600 transmits data via wireless communication. The data may include information identifying the electronic device 600. The data may also include information representative of the pattern displayed on screen 800. Electronic device 600 may send the data in response to an indication that the user has launched or intends to launch an application program for pairing the user's phone with device 600 (e.g., selecting affordance 714 on screen 700 as described above).

The external device 850 may receive the data transmitted by electronic device 600 and determine whether the identifying information in the received data corresponds with the identifying information in the image of the pattern obtained by the camera. If the external device 850 determines that the received data corresponds with the identifying information in pattern 804, then the external device 850 may register device 600 as a paired device. Alternatively, if the external device 850 determines that the received data does not correspond with the identifying information in pattern 804, then the external device 850 may not register device 600 as a paired device and/or may continue to receive data.

Registering device 600 as a paired device may be done in various ways. In one embodiment, in response to determining that the received data corresponds with the identifying information, the external device 850 may transmit, e.g., via wireless communication, data representing a request to pair with the device 600. In another embodiment, device 600 may transmit data representing a request to pair with an external device. External device 850 may receive the data and accept the request to pair after authenticating device 600 as described above.

As mentioned above, the data transmitted by device 600 may include data indicative of the pattern 804. If so, the external device 850 may compare the data indicative of the pattern against the pattern 804 in determining whether the received data corresponds with the identifying information.

In another embodiment, the pairing mode of external device 850 may initially be in a first state in which the external device 850 will not pair with the electronic device 600 without further input or action. To switch to a state in which the external device 850 will pair, external device 850 may process picture 852 and determine whether pattern 804 corresponds with at least one pattern in a set of predetermined patterns. The set of predetermined patterns may include one or more patterns that can be recognized by the external device 850 and cause the external device 850 to operate in a state in which it will pair with another device. The set of predetermined patterns may be included with a program that facilitates pairing, downloaded from the Internet, or obtained by some other means. In response to a determination that the pattern 804 corresponds with one or more predetermined patterns, the pairing mode is set to a second state in which the external device 850 will pair with another electronic device. Alternatively, in response to a determination that the pattern 804 does not correspond with one or more predetermined patterns, the pairing mode may be kept in the first state.

In one embodiment, while in the second state, the external device 850 may wirelessly transmit a request to pair and attempt to pair with any device that accepts the request to pair. In another embodiment, while in the second state, the external device 850 may receive a request to pair from device 600, accept the received request, and attempt to pair with the requesting device (i.e., device 600). That is, while the pairing mode is set to the second state, the external device 850 may receive the data transmitted by the device 600 and, in response to receiving the data from device 600, register the device 600 as a paired device.

Returning to FIG. 8A, instruction screen 800 does not include "BACK" (e.g., a left-pointing arrow) or "NEXT" affordances. In one embodiment, device 600 may transition from screen 800 to a next screen upon receiving an indication that it is paired with external device 850. Alternatively, instruction screen 800 may include affordances analogous to affordances 714 and 716 described above that provide the ability to return to a previous screen or process or advance to a subsequent screen or process.

Although pairing as described above relies on a displayed pattern (e.g., pattern 804), there are various alternative methods for pairing two devices. In one embodiment, device 600 may be paired with the external device 850 by tapping the external device 850 with the device 600, or vice versa. The external device 850 may include sensors such as those described above (e.g., accelerometers, gyroscopes, etc.) to detect movement indicating that the external device 850 has been tapped. In one embodiment, tapping the external device 850 causes it to be set in a state in which it will pair with another device.

FIG. 9 shows an exemplary instruction screen 900 that device 600 can display on its display. Instruction screen 900 includes text 902 instructing the user to tap the user's phone with the electronic device 600 to pair the two devices. While in a pairing mode, the external device 850 may detect movement indicative of a physical contact. The external device 850 may also receive data transmitted by device 600 that includes identifying information of device 600. In response to receiving the data transmitted by the device 600 and detecting the movement, the external device 850 may register device 600 as a paired device.

Although not shown, instruction screen 900 may include affordances analogous to affordances 714 and 716 described above that provide the ability to return to a previous screen or process or advance to a subsequent screen or process.

Once the device 600 has paired with the external device 850, the device 600 and/or the external device 850 may provide an indication that the devices have paired. The indication may include an aural indication, such as a chime, ping, beep, tune, or the like. The indication may also, or alternatively, include a haptic indication, such as tactile feedback in the form of buzzing, vibrating, or pulsing. In one embodiment, each device provides an indication simultaneously with the other. In another embodiment, the devices provide indications one after the other in a back-and-forth manner which indicates that the two devices are in sync.

The device 600 and/or the external device 850 may also provide a visible indication that pairing has occurred. FIG. 10A shows a screen 1000 that may be displayed at device 600 to indicate that the device 600 is connecting to the external device 850. Screen 1000 includes text 1002 and icon 1004 which indicate that device 600 is connecting to the external device 850. Icon 1004 may be a static image or it may be animated to indicate that connection is in progress.

FIG. 10B shows a screen 1010 that may be displayed at external device 850 to indicate that the external device 850 is connecting to the device 600. Screen 1010 includes text 1012 and icon 1014, which indicate that the phone 850 is connecting to electronic device 600. Icon 1014 may be a static image or it may be animated to indicate that connection is in progress.

As mentioned above, pairing may create a communication link between the electronic device 600 the external device 850. Once the two devices are connected, data may be transferred wirelessly between the two devices over the communication link. In one embodiment, after registering the device 600 as a paired device, the external device 850 may send user information to the device 600. The external device 850 may access user information from local storage or from a remote source (e.g., a web server) via, for example, a WiFi connection. User information may include WiFi settings, contact information of a user's contacts, information identifying one or more applications installed on the external device 850, notification settings, identification information about the user or the external device 850, default device settings (e.g., language, font size, etc.), or the like.

User information may also include service settings. Exemplary services may provide the capability to connect wirelessly to the Internet or to determine the location of the phone. Other services may provide diagnostic capabilities or an Intelligent Automated Assistant as described in U.S. Utility application Ser. No. 12/987,982, entitled "Intelligent Automated Assistant," filed Jan. 10, 2011.

In one embodiment, the transfer of user information must be complete before proceeding to the next step in the setup process. Alternatively, transfer of user information may continue in parallel with subsequent steps of the setup process.

3. Configuration

Setting up an electronic device may also include a configuration sequence in which various device parameters are set and/or confirmed. A configuration sequence may include, among other things, setting and/or confirming a face image to be displayed on the electronic device and/or the status of service agreements.

If the device is wearable, configuration may also include setting and/or confirming the orientation in which the device is to be worn. In one embodiment, the device 600 is a wearable electronic device, such as a watch intended to be worn on a user's wrist.

FIG. 11A shows an exemplary configuration status screen 1100 that may be displayed on the display of electronic device 600. Configuration status screen 1100 includes text 1102 indicating that the screen shows the status of an orientation parameter. The orientation parameter may represent the orientation in which device 600 is intended to be worn by the user. The orientation may include a wrist orientation and a rotatable input mechanism orientation. The status of both the wrist orientation and the rotatable input mechanism orientation may be either "RIGHT" or "LEFT". Text 1104 shows that the wrist orientation status is "LEFT", which indicates that device 600 is to be worn on the user's left wrist. Text 1106 shows that the rotatable input mechanism orientation status is "RIGHT", which indicates that the device is to be worn such that the rotatable input mechanism 601 is on the right from a front perspective facing the display. As shown in FIG. 11A, device 600 is oriented in the RIGHT rotatable input mechanism orientation.

In one embodiment, the orientation of the device 600 may determine the direction in which information is displayed on the screen. That is, the orientation may correspond to a display orientation of the device. For example, if the device 600 is intended to be worn on a user's left wrist with the rotatable input mechanism 601 on the right, the display should be oriented such that the right side of a displayed screen is on the same side as the rotatable input mechanism 601. However, if the device 600 is oriented such that the rotatable input mechanism 601 is on the left, the screen should be displayed so that the right side of the screen is displayed on the side opposite the rotatable input mechanism 601. Accordingly, a first orientation (e.g., rotatable input mechanism orientation LEFT) may correspond to a first display orientation of a wearable electronic device, and a second orientation (e.g., rotatable input mechanism orientation RIGHT) may correspond to a second display orientation. In the example provided above, the second display orientation is rotated 180 degrees relative to the first display orientation.

The orientation of the device 600 may also determine the response to rotation of the rotatable input mechanism 601. In one embodiment, setting the rotatable input mechanism orientation to "RIGHT" causes device 600 to perform a scroll-up operation on displayed information in response to a clockwise rotation of the rotatable input mechanism 601 and a scroll-down operation in response to a counter-clockwise rotation. When the rotatable input mechanism orientation is set to "LEFT", electronic device 600 performs a scroll-up operation in response to a counter-clockwise rotation of the rotatable input mechanism 601 and a scroll-down operation in response to a clockwise rotation. Alternatively, an orientation of "RIGHT" may cause the device to scroll-up in response to a counter-clockwise rotation, and an orientation of "LEFT" may cause the device to scroll-up in response to a clockwise rotation.

Turning now to FIG. 11B, an exemplary configuration interface screen 1110 that may be displayed on the display of external device 850 is described. In some embodiments, device 600 may have a relatively small display screen, which may make it difficult to set configuration parameters on device 600. Instead, a user may wish to find, select, and/or confirm desired configuration settings on a screen of an external device having a relatively larger display, such as screen 1110 on external device 850.

Configuration interface screen 1110 includes text 1112 prompting the user to select an orientation in which the user intends to wear the electronic device 600. Configuration interface screen also includes affordances 1114, 1115, 1116, and 1117, which allow a user to select a desired wrist orientation and rotatable input mechanism orientation.

In one embodiment, device 600 may send data to external device 850 to inform it of the current orientation status. This may allow the affordances associated with the current orientation status to be highlighted. For example, affordances 1114 and 1117 may be highlighted to indicate that the wrist orientation of electronic device 600 is set to "LEFT" and the rotatable input mechanism orientation is set to "RIGHT", as shown in FIG. 11A.

A user may change the orientation status of device 600 using external device 850 by selecting one of the affordances associated with a different orientation. For example, a user may select affordance 1115 to change the wrist orientation from "LEFT" to "RIGHT". In response to selection of an affordance associated with a different orientation, external device 850 may send data representing the selected orientation status to electronic device 600. In response to receiving the selected orientation status, device 600 may set the orientation to the selected value. Furthermore, external device 850 may update screen 1110 to highlight the affordance associated with the newly selected orientation.

In another embodiment, the device 600 may be configured to determine how the device is being worn based on the motion and position of the device. The device 600 may include sensors to detect that it is being worn and to track the motion and position (e.g., spatial orientation) of the device. Device 600 may then determine the wrist and rotatable input mechanism orientations based on the detected motion and position. For example, motion from left to right while the device 600 is being raised may indicate that the device is being worn on the user's left wrist.

In another embodiment, external device 850 may determine the orientation of device 600 based on an image of device 600. For example, image 852 described above with respect to pairing device 600 with external device 850 may include a representation of device 600 positioned on the user. External device 850 may process image 852 to determine the orientation of device 600 based on the position of the rotatable input mechanism 601, angle of the display and/or text, features of the user's arm included in the image, and/or other features or indications of orientation that may be extracted from image 852. In response to determining the orientation of device 600, external device 850 may send data to device 600 representing the determined orientation. Device 600 may then set the orientation status in response to receiving the data.

Turning now to FIG. 12A, an exemplary configuration interface screen 1200 that may be displayed on the display of device 600 to set or confirm the status of services available to the device 600 is described. Configuration interface screen 1200 includes text 1201, 1203, and 1205 identifying three services available to the electronic device 600 (SERVICE 1, SERVICE 2, and SERVICE 3, respectively). Services may include the functionalities or capabilities described above. The status of a service (e.g., ON or OFF) may represent an agreement by a user to allow the service to operate on the device 600 or for a third party to provide the service. Configuration interface screen 1200 also includes affordances 1202, 1204, and 1206, each corresponding to one of the three services (SERVICE 1, SERVICE 2, and SERVICE 3, respectively). The affordances indicate the current status of the corresponding service and can be selected to change the status of the service. In FIG. 12A, the affordances may be tapped or swiped to change the status of the services between ON and OFF. The appearance of the affordances may be updated to indicate a change in status. Configuration interface screen 1200 also includes affordances analogous to affordances 714 and 716 described above that provide the ability to return to a previous screen or process or advance to a subsequent screen or process.

FIG. 12B shows an exemplary configuration interface screen 1210 that may be displayed on the display of external device 850. Configuration interface screen 1210 includes text 1211, 1213, and 1215 identifying three services available to the electronic device 600 (SERVICE 1, SERVICE 2, and SERVICE 3, respectively). Configuration interface screen 1210 also includes affordances 1212, 1214, and 1216 each corresponding to one of the three services (SERVICE 1, SERVICE 2, and SERVICE 3, respectively). The affordances indicate the current status of the corresponding service and can be selected to change the status of the service on device 600. The affordances may be tapped or swiped to change the status of the services between ON and OFF. The appearance of the affordances may be updated to indicate a change in status. In response to selection of an affordance that changes the status of a service, external device 850 may send data representing the selected service status to device 600. In response to receiving the selected status, electronic device 600 may set the service status to the selected value. Furthermore, external device 850 may update screen 1210 to indicate the newly selected status. External device 850 may also update screen 1210 to indicate changes in status caused by a selection at device 600.

FIG. 13A shows another exemplary configuration interface screen 1300 that may be displayed on the display of device 600. Configuration interface screen 1300 includes an icon 1302 of an image that is to be used as a face for the display of the device 600. In one embodiment, device 600 is a watch and icon 1302 represents a clock face. The selected face may be displayed while in a default state or a clock mode. In one embodiment, a user may select a different face with a swipe gesture on the touch-sensitive display. For example, in response to a swipe from right to left, the electronic device may change the selected face to a different face and display the different face.

FIG. 13B shows an exemplary configuration interface screen 1310 that may be displayed on the display of phone 850. Configuration interface screen 1310 includes affordances 1311-1316 each corresponding to a different potential face for device 600. Screen 1310 may indicate the currently selected face by highlighting the corresponding affordance. In FIG. 13B, affordance 1312 is highlighted by circle 1318 to indicate that the star icon is the currently selected face, as shown in FIG. 13A.

The affordances can be selected to change the status of the face on device 600. In response to selection of an affordance corresponding to a particular face, external device 850 may highlight the selected affordance and send data representing the selected face to device 600. In response to receiving the data representing the selected face, device 600 may set the face to the selected face.

Returning to FIG. 13A, configuration interface screen 1300 also includes affordances 1304 and 1306. Affordance 1304 is analogous to affordance 716 described above and provides the ability to return to a previous screen or process. Affordance 1306 includes the text "DONE". In one embodiment, screen 1300 may be the last screen displayed by device 600 in a device configuration sequence or a setup process. The text "DONE" may indicate to the user that selecting a face is the last step of setup or configuration. A user may select affordance 1306 to indicate that the currently displayed face is the one the user wants and that the user is done with setup. In response to a user selection of affordance 1306, electronic device 600 may set the status of the initial configuration sequence as complete and transition the display to a notification screen, such as screen 1400 discussed below with reference to FIG. 14A. Alternatively, the display on device 600 may transition from screen 1300 to a home screen, such as screen 1410 discussed below with reference to FIG. 14B. Furthermore, in response to a user selection of affordance 1306, device 600 may send data to paired external device 850 indicating that the initial configuration sequence is complete. In response to receiving the data, external device 850 may transition its display to a home screen or, alternatively, a notification screen such as screen 1420 discussed below with reference to FIG. 14C.

FIG. 14A shows an exemplary notification screen 1400 that may be displayed on the display of device 600. Notification screen 1400 may include an indication that an initial device configuration sequence is complete. In FIG. 14A, screen 1400 includes text 1402, which indicates to the user that initial configuration is done. Notification screen 1400 also includes affordances 1404, which provides the ability to return to a previous screen or step. In one embodiment, device 600 automatically transitions to the home screen 1410 (discussed below) after notification screen 1400 has been displayed for a predetermined amount of time.

FIG. 14B shows an exemplary home screen 1410 that may be displayed on the display of device 600. Home screen 1410 may be displayed following completion of an initial configuration sequence. Home screen 1410 may include one or more affordances 1412. When affordance 1412 is selected, device 600 may launch a corresponding application. Home screen 1410 may also include a user interface object 1414 that displays the current time. In one embodiment, user interface object 1414 includes the face selected during the initial configuration sequence.

FIG. 14C shows an exemplary notification screen 1420 that may be displayed on the display of paired external device 850. In one embodiment, screen 1420 may be displayed in response to a notification from device 600 that the initial configuration sequence is complete. In FIG. 14C, text 1422 is displayed to indicate that the initial configuration sequence is complete. Notification screen 1420 may also allow for additional setup of device 600 that was not part of the initial configuration sequence. Notification screen 1420 may include affordances 1424 and 1426 that, when selected, allow a user to change default values of additional configuration parameters that the user was not prompted to set and/or confirm during the initial configuration sequence.

In the descriptions above, device 600 has been referred to as the "device" and external device 850 has been referred to as the "external device." However, it should be recognized that external device 850 can be referred to as a "device" and device 600 can be referred to as an "external device". For example, from the perspective of external device 850, device 600 is an external device.

Figure 15:
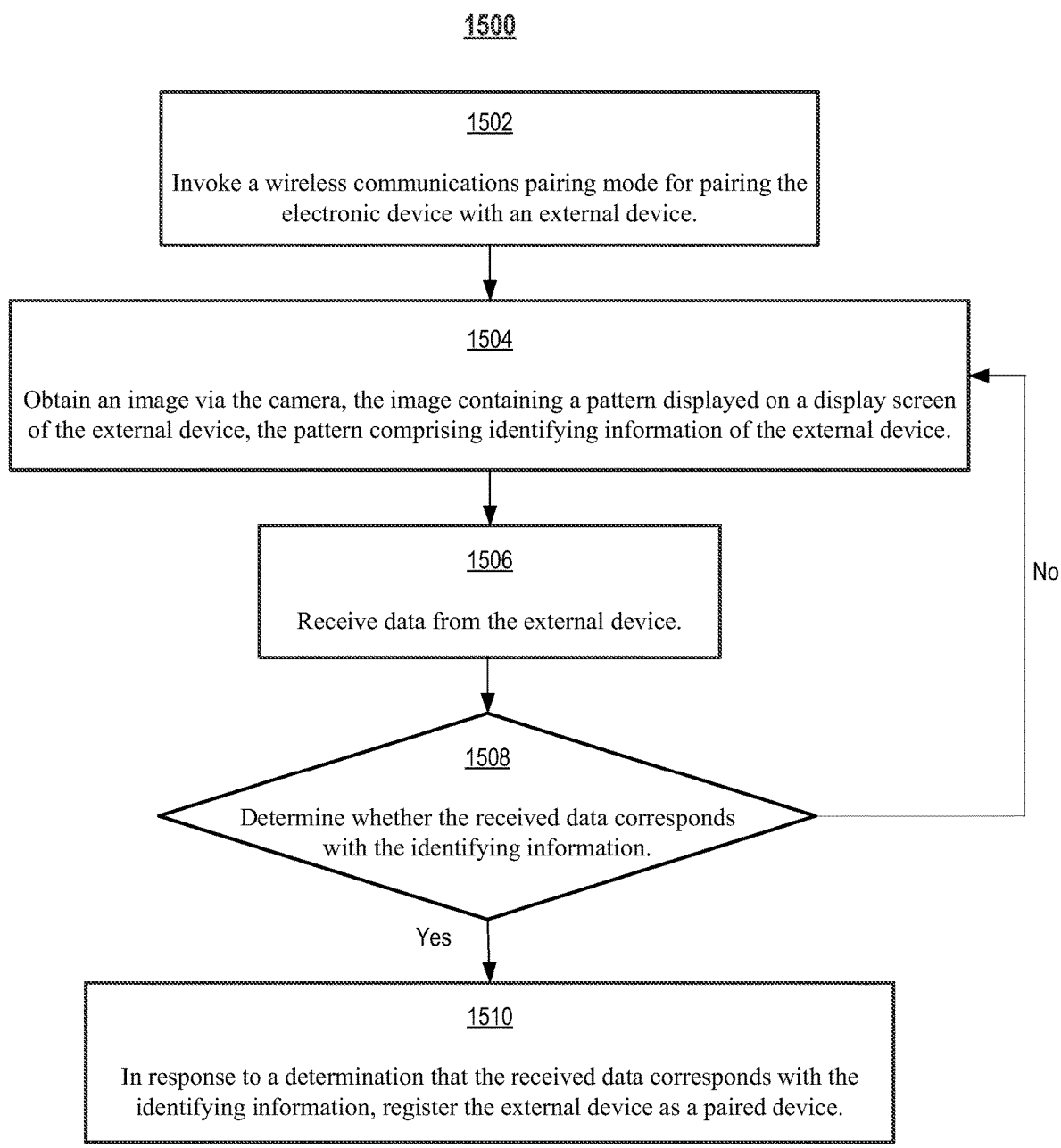
FIG. 15 is a flow diagram illustrating a process for pairing an electronic device with an external device.

FIG. 15 is a flow diagram illustrating process 1500 for pairing an electronic device with an external device. Process 1500 may be performed at an electronic device with a display and a camera, like device 100 (FIG. 1), device 300 (FIG. 3), and device 500 (FIG. 5). In one embodiment, process 1500 is performed by an iPhone® or a smartphone (e.g., 850) to pair the phone to an external device such as a wearable electronic device (e.g., 600).

Process 1500 provides an intuitive way to set up an electronic device. The method reduces the cognitive burden on a user when pairing an electronic device with another electronic device, thereby creating a more efficient human-machine interface. For battery-operated computing devices, enabling a user to set up a device more quickly and more efficiently conserves power and increases the time between battery charges.

At block 1502, a wireless communications pairing mode for pairing the electronic device (e.g., 850) with an external device (e.g., 600) is invoked. At block 1504, an image is obtained via the camera. The image contains a pattern (e.g., 804) displayed on a display screen (e.g., 800) of the external device and the pattern comprises identifying information of the external device. At block 1506, data is received from the external device. At block 1508, a determination is made whether the received data corresponds with the identifying information. At block 1510, in response to a determination that the received data corresponds with the identifying information, the external device is registered as a paired device.

Figure 16:
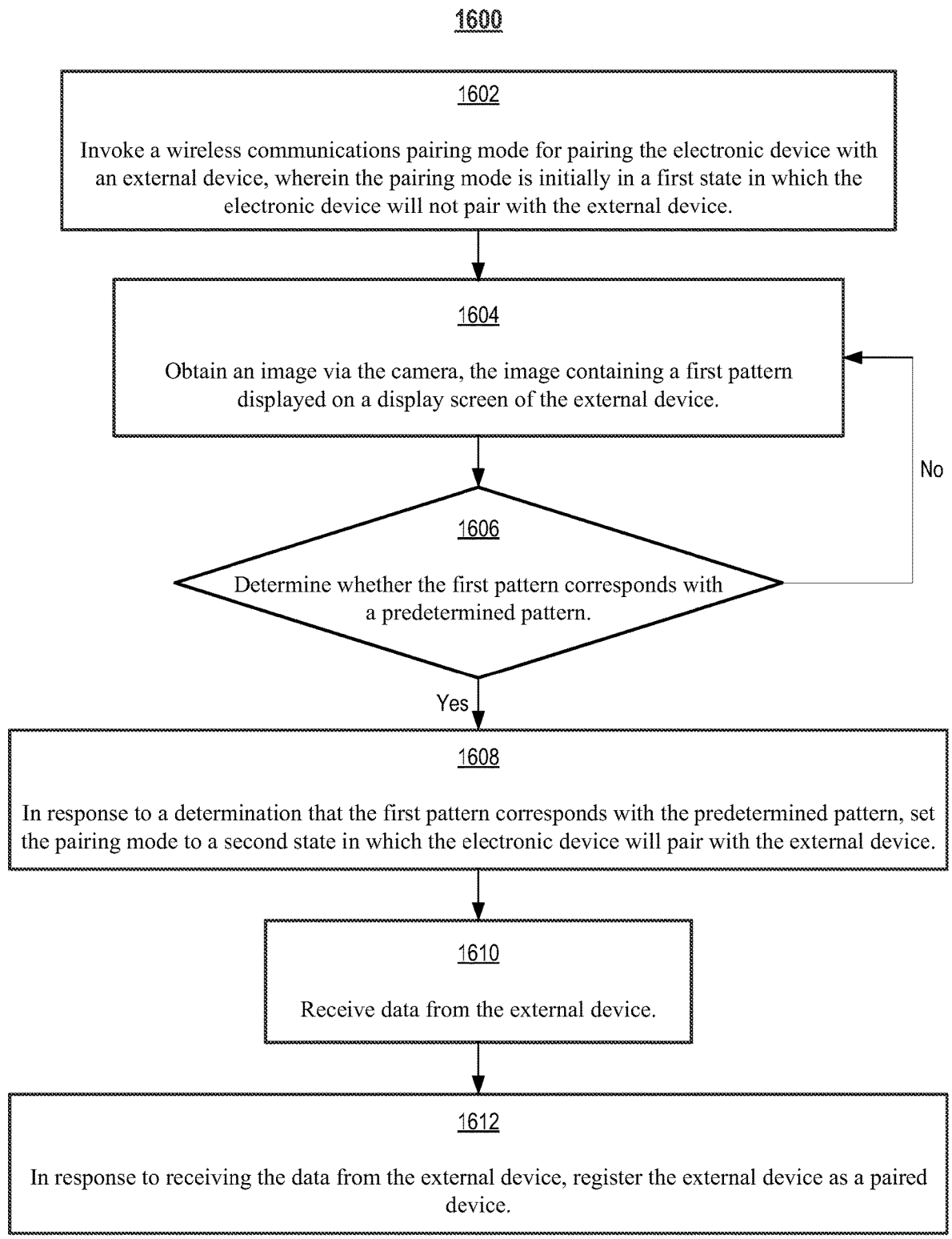
FIG. 16 is a flow diagram illustrating a process for pairing an electronic device with an external device.

FIG. 16 is a flow diagram illustrating process 1600 for pairing an electronic device with an external device. Process 1600 may be performed at an electronic device with a display and a camera, like device 100 (FIG. 1), device 300 (FIG. 3), and device 500 (FIG. 5). In one embodiment, process 1600 is performed by an iPhone® or a smartphone (e.g., 850) to pair the phone to an external device such as a wearable electronic device (e.g., 600).

Process 1600 provides an intuitive way to set up an electronic device. The method reduces the cognitive burden on a user when pairing an electronic device with another electronic device, thereby creating a more efficient human-machine interface. For battery-operated computing devices, enabling a user to set up a device more quickly and more efficiently conserves power and increases the time between battery charges.

At block 1602, a wireless communications pairing mode for pairing the electronic device (e.g., 850) with an external device (e.g., 600) is invoked, where the pairing mode is initially in a first state in which the electronic device will not pair with the external device. At block 1604, an image is obtained via the camera, where the image contains a pattern (e.g., 804) displayed on a display screen (e.g., 800) of the external device. At block 1606, a determination is made whether the first pattern corresponds with a predetermined pattern. At block 1608, in response to a determination that the first pattern corresponds with a predetermined pattern, the pairing mode is set to a second state in which the electronic device will pair with the external device. At block 1610, data is received from the external device. At block 1612, in response to receiving the data from the external device, the external device is registered as a paired device.

FIG. 17 is a flow diagram illustrating process 1700 for pairing an electronic device with an external device. Process 1700 may be performed at an electronic device with a display and a camera, like device 100 (FIG. 1), device 300 (FIG. 3), and device 500 (FIG. 5). In one embodiment, process 1700 is performed by an iPhone® or a smartphone (e.g., 850) to pair the phone to an external device such as a wearable electronic device (e.g., 600).

Process 1700 provides an intuitive way to set up an electronic device. The method reduces the cognitive burden on a user when pairing an electronic device with another electronic device, thereby creating a more efficient human-machine interface. For battery-operated computing devices, enabling a user to set up a device more quickly and more efficiently conserves power and increases the time between battery charges.

At block 1702, a wireless communications pairing mode for pairing the electronic device (e.g., 850) with an external device (e.g., 600) is invoked. At block 1704, data is received from the external device. At block 1706, movement indicative of a physical contact at the electronic device is detected. At block 1708, in response to receiving the data and detecting the movement, the external device is registered as a paired device.

FIG. 18 is a flow diagram illustrating process 1800 for setting a configuration parameter of an external wearable electronic device. Process 1800 may be performed at an electronic device with a display and a touch-sensitive surface on the display, like device 100 (FIG. 1), device 300 (FIG. 3), and device 500 (FIG. 5). In one embodiment, process 1800 is performed by an iPhone® or a smartphone (e.g., 850).

Process 1800 provides an intuitive way to set up an electronic device. The method reduces the cognitive burden on a user when configuring the electronic device, thereby creating a more efficient human-machine interface. For battery-operated computing devices, enabling a user to set up a device more quickly and more efficiently conserves power and increases the time between battery charges.

At block 1802, a configuration interface (e.g., 1110) for configuring an orientation in which a wearable electronic device (e.g., 600) with an asymmetric geometry is to be worn is displayed. At block 1804, a user selection of the orientation is detected. In some embodiments (e.g., touchscreen embodiments), the device that is performing process 1800 has a touch screen display and a touch-sensitive surface is on the display. In some embodiments (e.g., non-touchscreen embodiments), the device has a display separate from the touch-sensitive surface. The exact user input used to select the orientation during block 1802 may also be different. For example, in touchscreen embodiments, a displayed affordance (e.g., 1114, 1115, 1116, 1117) associated with the orientation may be responsive to touch input using a touch object, such as a tap, a long-duration touch, a flick, a swipe, or another applicable touch-based gesture. In non-touchscreen embodiments, the displayed affordance may be responsive to mouse events generated using a mouse or equivalent input device, such as a click, double click, drag, and so forth. Combinations of the embodiments are possible. For example, a touchscreen device can be responsive to an external wireless mouse, thus devices in the touchscreen embodiments can also be responsive to mouse and mouse cursor input techniques. Likewise, a non-touchscreen device can be responsive to a touch-sensitive surface (e.g., touchpad), thus devices of the non-touchscreen embodiments can also be responsive to touch input.

At block 1806, data representing the selected orientation is sent to the wearable electronic device (e.g., 600), where the selected orientation corresponds to a display orientation of the wearable electronic device. Optionally, (1) the configuration interface comprises a first setting (e.g., 1114, 1115, 1116, 1117) representing a first orientation and a second setting (e.g., 1114, 1115, 1116, 1117) representing a second orientation, (2) a selection of the first orientation corresponds to a first display orientation of the wearable electronic device, and (3) a selection of the second orientation corresponds to a second display orientation of the wearable electronic device, where the second display orientation is rotated 180 degrees related to the first display orientation.

FIG. 19 is a flow diagram illustrating process 1900 for displaying a personalized message on the display of an electronic device. Process 1900 may be performed at an electronic device with a display and touch-sensitive screen, like device 100 (FIG. 1), device 300 (FIG. 3), and device 500 (FIG. 5). The electronic device may be configured to initiate a device configuration sequence upon power-on. In one embodiment, process 1900 is performed by an iPhone® or a smartphone (e.g., 850). In another embodiment, process 1900 is performed by a wearable electronic device (e.g., 600).

Process 1900 provides a personalized experience upon set up of an electronic device. The method may limit the display of a personalized message to appear only during an initial configuration of the device, thereby creating a more efficient human-machine interface. For battery-operated computing devices, enabling a user to set up a device more quickly and more efficiently conserves power and increases the time between battery charges.

At block 1902, a personalized electronic message (e.g., 614) is stored, where the electronic message is stored before an initial device configuration of the electronic device. At block 1904, a user instruction to power-on the electronic device is detected. At block 1906, a determination is made whether the device configuration sequence has previously been initiated or completed. At block 1908, in response to a determination that the device configuration sequence has not previously been initiated or completed, the electronic message (e.g., 614) is displayed upon power-on of the electronic device. At block 1910, the device configuration sequence is initiated. At block 1912, a user interface screen for device configuration (e.g., 700, 710, 800, 900, 1100, 1200) is displayed.

FIG. 20 is a flow diagram illustrating process 2000 for setting up an electronic device. Process 2000 may be performed at an electronic device with a touch-sensitive display, like device 100 (FIG. 1), device 300 (FIG. 3), and device 500 (FIG. 5). In one embodiment, process 2000 is performed by a wearable electronic device (e.g., 600). Setup of the wearable electronic device according to process 2000 may include pairing with an external device such as an iPhone® or other smartphone (e.g., 850).

Process 2000 provides an intuitive way to set up an electronic device. The method reduces the cognitive burden on a user when configuring the device and pairing it with another device, thereby creating a more efficient human-machine interface. For battery-operated computing devices, enabling a user to set up a device more quickly and more efficiently conserves power and increases the time between battery charges.

At block 2002, at least one device initialization screen (e.g., 602, 606, 612) is displayed on the touch-sensitive display of the device. At block 2004, an instruction screen (e.g., 800, 900) is displayed instructing a user to pair an external device with the electronic device. At block 2006, first data is sent via wireless communication. At block 2008, a pattern (e.g., 804) comprising identifying information of the electronic device is displayed. At block 2010, second data indicating that the external device and the electronic device have been paired using the first data is received. At block 2012, an aural or haptic indication that the electronic device and the external device have been paired is provided.

It should be understood that the particular order in which the operations in FIGS. 15-20 have been described is exemplary and not intended to indicate that the described order is the only order in which the operations could be performed. One of ordinary skill in the art would recognize various ways to reorder the operations described herein. For brevity, these details are not repeated here. Additionally, it should be noted that aspects of processes 1500-2000 (FIGS. 15-20) may be incorporated with one another.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B, 3, 5A, and 5B) are all included within the scope of protection of the invention.

Figure 21:
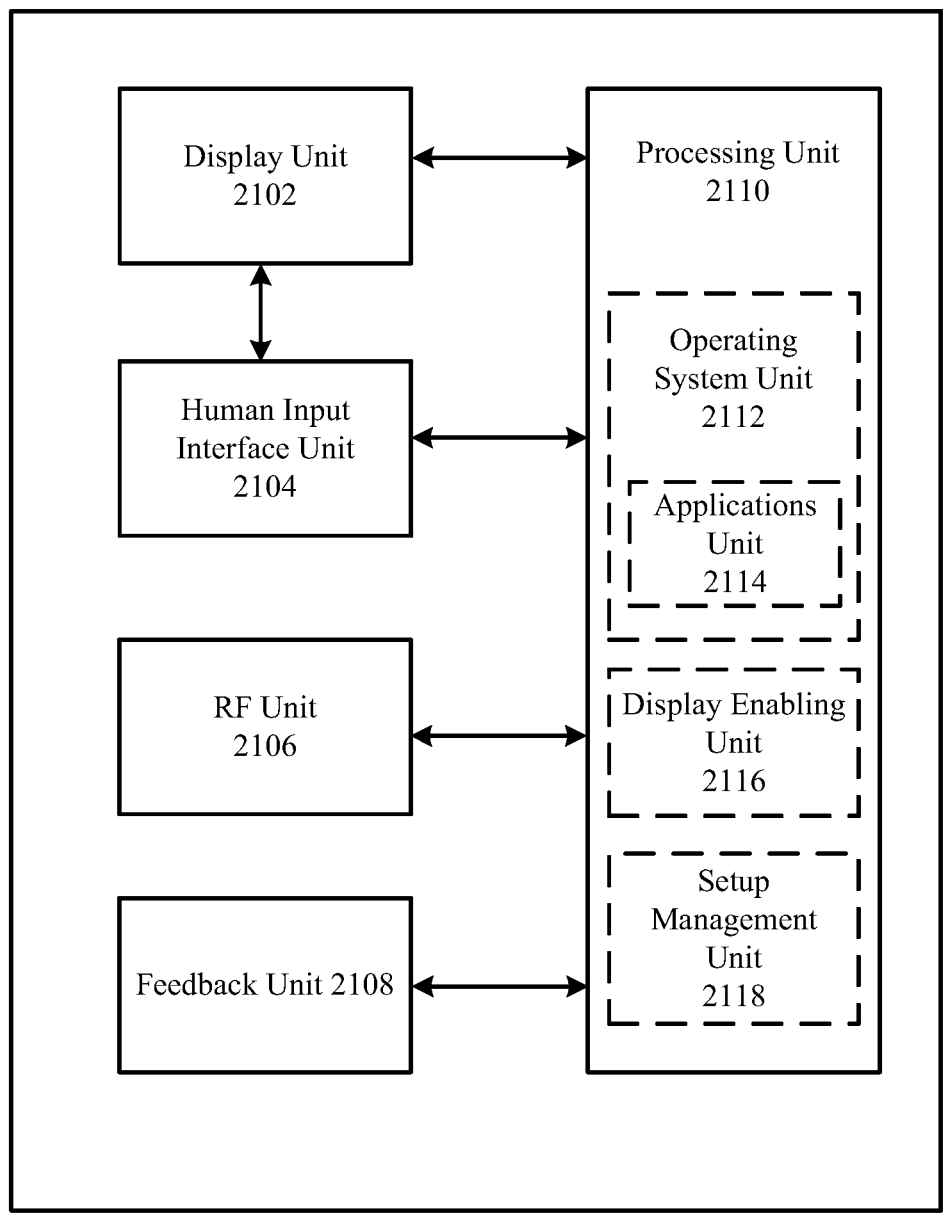
FIG. 21 is a functional block diagram of an electronic device in accordance with some embodiments.

FIG. 21 shows exemplary functional blocks of an electronic device 2100 that, in some embodiments, performs the above-described features. As shown in FIG. 21, an electronic device 2100 may include display unit 2102 configured to display graphical objects; human input interface unit 2104 configured to receive user input; one or more RF units 2106 configured to detect and communicate with external electronic devices; one or more feedback unit configured to provide user with haptic, audio, and/or visual feedback; and processing unit 2110 coupled to display unit 2102, human input interface unit 2104, RF unit(s) 2106, and feedback unit 2108. In some embodiments, processing unit 2110 is configured to support an operating system running on operating system unit 2112. In turn, operating system unit 2112 may support an applications unit 2114 for launching and running one or more applications.

In some embodiments, the processing unit 2110 includes a display enabling unit 2116 and a setup management unit 2118. In some embodiments, the display enabling unit 2116 is configured to cause a display of a user interface (or portions of a user interface) in conjunction with the display unit 2102. For example, the display enabling unit 2116 may be used for displaying screens during setup. In some embodiments, the setup management unit 2118 is configured to receive input, e.g., through the use of human input interface unit 2104 and/or RF unit 2106 and to perform the setup and device configuration features described above.

In some embodiments, RF unit 2106 is configured to detect and receive information from an external device, such as information for facilitating the pairing and configuration of the receiving device, user information, application information, application state information, so forth. In some embodiments, the RF unit is configured to detect and transmit information to an external device, such as information for facilitating the pairing and configuration of the receiving device, user information, application information, application state information, so forth.

The units of FIG. 21 may be used to implement the various techniques and methods described above with respect to FIGS. 6-20. The units of device 2100 are, optionally, implemented by hardware, software, or a combination of hardware and software to carry out the principles of the various described examples. It is understood by persons of skill in the art that the functional blocks described in FIG. 21 are, optionally, combined or separated into sub-blocks to implement the principles of the various described examples. Therefore, the description herein optionally supports any possible combination or separation or further definition of the functional blocks described herein.

Figure 22:
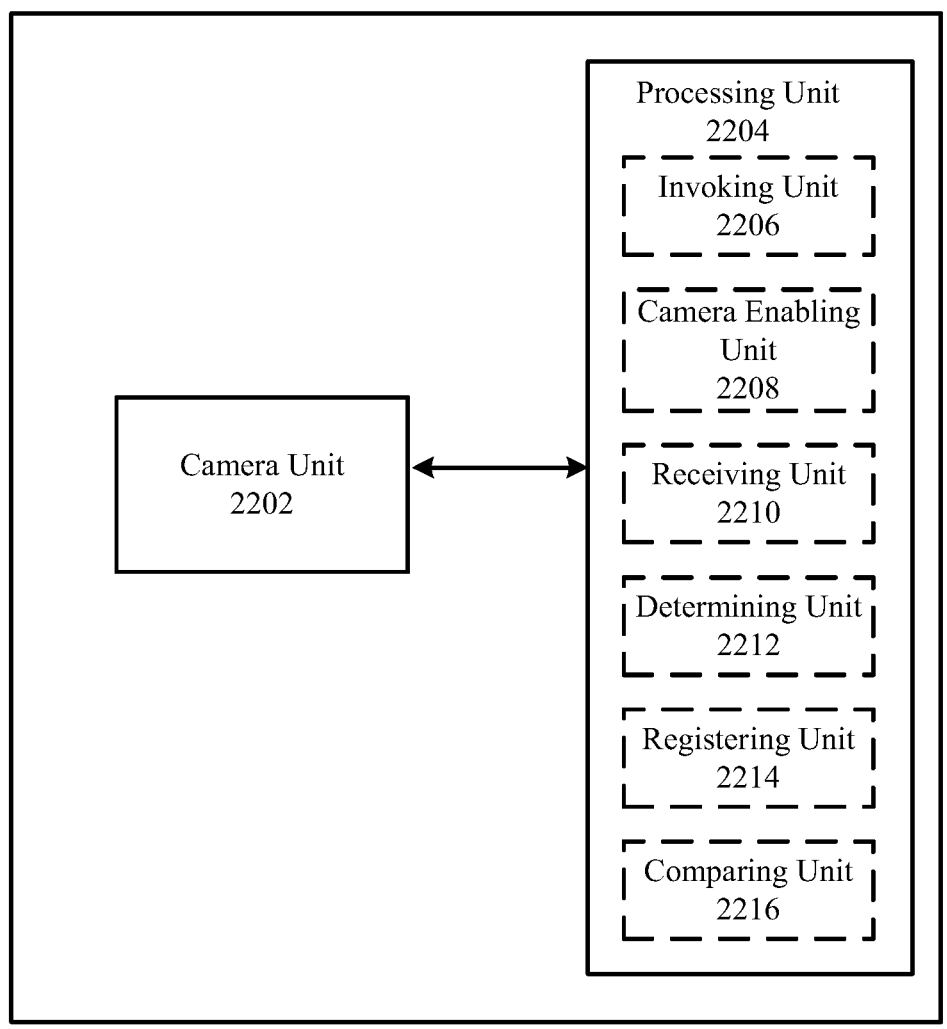
FIG. 22 is a functional block diagram of an electronic device in accordance with some embodiments.

In accordance with some embodiments, FIG. 22 shows a functional block diagram of an electronic device 2200 configured in accordance with the principles of the various described embodiments. The functional blocks of the device are, optionally, implemented by hardware, software, or a combination of hardware and software to carry out the principles of the various described embodiments. It is understood by persons of skill in the art that the function blocks described in FIG. 22 are, optionally, combined or separated into sub-blocks to implement the principles of the various described embodiments. Therefore, the description herein optionally supports any possible combination or separation or further definition of the functional blocks described herein.

As shown in FIG. 22, an electronic device 2200 includes a camera unit 2202 configured to obtain images, and a processing unit 2204 coupled to the camera unit 2202. In some embodiments, the processing unit 2204 optionally includes an invoking unit 2206, a camera enabling unit 2208, a receiving unit 2210, a determining unit 2212, a registering unit 2214, and a comparing unit 2216.

The processing unit 2204 is configured to invoke (e.g., with invoking unit 2206) a wireless communications pairing mode for pairing the electronic device with an external device, and enable (e.g., with camera enabling unit 2208) obtaining of an image via the camera unit 2202, the image containing a pattern displayed on a display screen of the external device, the pattern comprising identifying information of the external device. The processing unit 2204 is further configured to receive (e.g., with receiving unit 2210) data from the external device, determine (e.g., with determining unit 2212) whether the received data corresponds with the identifying information, and, in response to a determination that the received data corresponds with the identifying information, register (e.g., with registering unit 2214) the external device as a paired device.

In some embodiments, the received data includes data indicative of the pattern displayed on the external device. In some embodiments, determining whether the received data corresponds with the identifying information includes comparing (e.g., with comparing unit 2216) the data indicative of the pattern against the pattern in the image.

The operations described above with reference to FIG. 15 are, optionally, implemented by components depicted in FIGS. 1A-1B or FIG. 22. For example, invoking operation 1502, obtaining operation 1504, receiving operation 1506, determining operation 1508, and registering operation 1510 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 23:
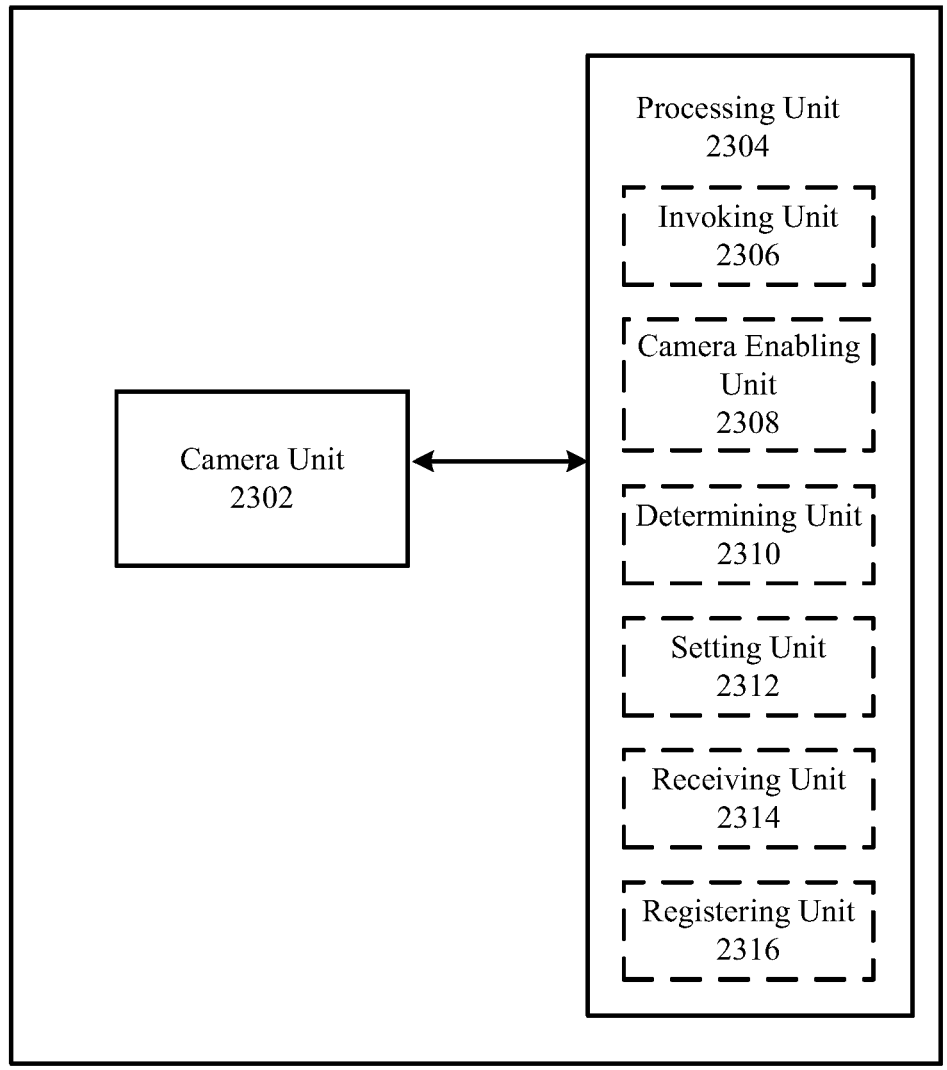
FIG. 23 is a functional block diagram of an electronic device in accordance with some embodiments.

In accordance with some embodiments, FIG. 23 shows a functional block diagram of an electronic device 2300 configured in accordance with the principles of the various described embodiments. The functional blocks of the device are, optionally, implemented by hardware, software, or a combination of hardware and software to carry out the principles of the various described embodiments. It is understood by persons of skill in the art that the function blocks described in FIG. 23 are, optionally, combined or separated into sub-blocks to implement the principles of the various described embodiments. Therefore, the description herein optionally supports any possible combination or separation or further definition of the functional blocks described herein.

As shown in FIG. 23, an electronic device 2300 includes a camera unit 2302 configured to obtain images and a processing unit 2304 coupled to the camera unit 2302. In some embodiments, the processing unit 2304 optionally includes an invoking unit 2306, a camera enabling unit 2308, a determining unit 2310, a setting unit 2312, a receiving unit 2314, and a registering unit 2316.

Processing unit 2304 is configured to invoke (e.g., with invoking unit 2306) a wireless communications pairing mode for pairing the electronic device with an external device, where the pairing mode is initially in a first state in which the electronic device will not pair with the external device. The processing unit 2304 is further configured to enable (e.g., with camera enabling unit 2308) obtaining of an image via the camera unit, the image containing a first pattern displayed on a display screen of the external device, and determine (e.g., with determining unit 2310) whether the first pattern corresponds with a predetermined pattern. The processing unit 2304 is further configured to, in response to a determination that the first pattern corresponds with the predetermined pattern, set (e.g., with setting unit 2312) the pairing mode to a second state in which the electronic device will pair with the external device, receive (e.g., with receiving unit 2314) data from the external device, and, in response to receiving the data from the external device, register (e.g., with registering unit 2316) the external device as a paired device. In some embodiments, the image contains a visual representation of the external device.

The operations described above with reference to FIG. 16 are, optionally, implemented by components depicted in FIGS. 1A-1B or FIG. 23. For example, invoking operation 1602, obtaining operation 1604, determining operation 1606, setting operation 1608, receiving operation 1610, and registering operation 1612 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 24:
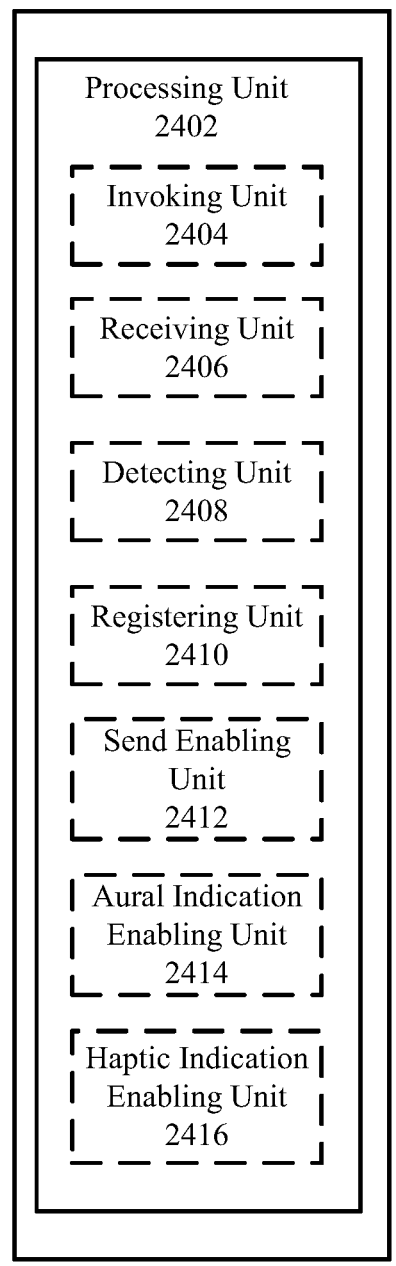
FIG. 24 is a functional block diagram of an electronic device in accordance with some embodiments.

In accordance with some embodiments, FIG. 24 shows a functional block diagram of an electronic device 2400 configured in accordance with the principles of the various described embodiments. The functional blocks of the device are, optionally, implemented by hardware, software, or a combination of hardware and software to carry out the principles of the various described embodiments. It is understood by persons of skill in the art that the function blocks described in FIG. 24 are, optionally, combined or separated into sub-blocks to implement the principles of the various described embodiments. Therefore, the description herein optionally supports any possible combination or separation or further definition of the functional blocks described herein.

As shown in FIG. 24, an electronic device 2400 includes a processing unit 2402. In some embodiments, the processing unit 2402 optionally includes an invoking unit 2404, receiving unit 2406, detecting unit 2408, registering unit 2410, send enabling unit 2412, aural indication enabling unit 2414, and haptic indication enabling unit 2416.

Processing unit 2402 is configured to invoke (e.g., with invoking unit 2404) a wireless communications pairing mode for pairing the electronic device with an external device, receive (e.g., with receiving unit 2406) data from the external device, detect (e.g., with detecting unit 2408) movement indicative of a physical contact at the electronic device, and in response to receiving the data and detecting the movement, register (e.g., with registering unit 2410) the external device as a paired device.

In some embodiments, processing unit 2402 is further configured to, after registering the external device as a paired device, enable (e.g., with send enabling unit 2412) sending of user information from the electronic device to the external device. In some embodiments, the user information comprises WiFi settings, contact information of user contacts, identification of an installed application, or service settings.

In some embodiments, the processing unit 2402 is further configured to, after registering the external device as a paired device, enable (e.g., with aural indication enabling unit 2414 or haptic indication enabling unit 2416), at the electronic device, an aural or haptic indication that the electronic device and the external device are paired.

In some embodiments, the wireless communications pairing mode includes an activation of a pairing application program configured to be invoked by a user selection of a user interface object displayed on a display unit of the electronic device, where the user interface object is associated with the pairing application.

In some embodiments, the user interface object associated with the pairing application is available for user selection only when the external device is within communication range of the electronic device. In some embodiments, the external device is a wearable electronic device that, optionally, includes a rotatable input mechanism.

The operations described above with reference to FIG. 17 are, optionally, implemented by components depicted in FIGS. 1A-1B or FIG. 24. For example, invoking operation 1702, receiving operation 1704, determining operation 1508, detecting operation 1706, and registering operation 1708 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 25:
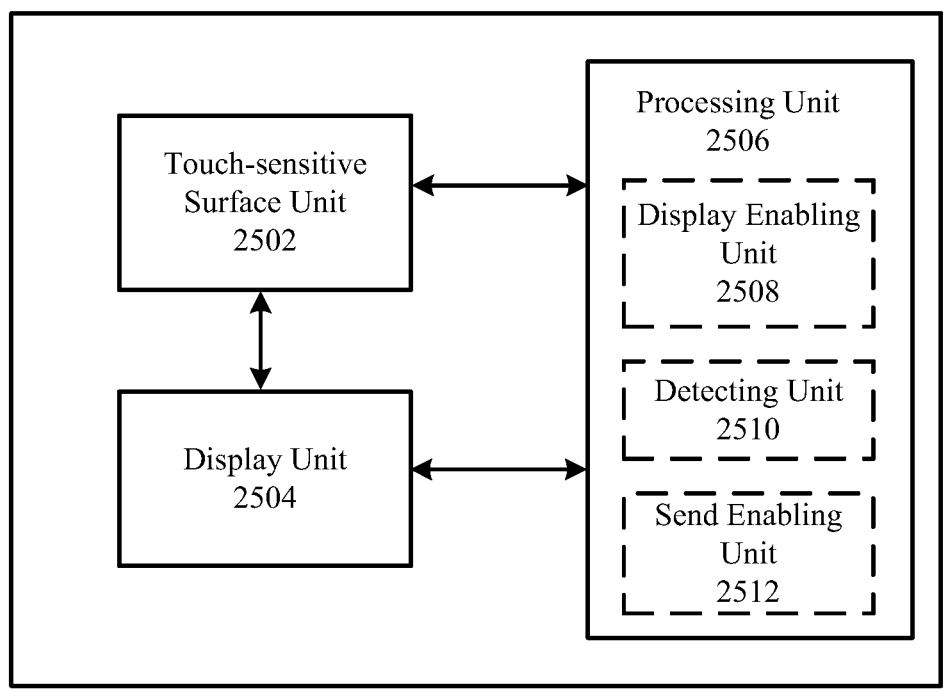
FIG. 25 is a functional block diagram of an electronic device in accordance with some embodiments.

In accordance with some embodiments, FIG. 25 shows a functional block diagram of an electronic device 2500 configured in accordance with the principles of the various described embodiments. The functional blocks of the device are, optionally, implemented by hardware, software, or a combination of hardware and software to carry out the principles of the various described embodiments. It is understood by persons of skill in the art that the function blocks described in FIG. 25 are, optionally, combined or separated into sub-blocks to implement the principles of the various described embodiments. Therefore, the description herein optionally supports any possible combination or separation or further definition of the functional blocks described herein.

As shown in FIG. 25, an electronic device 2500 includes a touch-sensitive surface unit 2502 configured to receive contacts, a display unit 2504 optionally coupled to the touch-sensitive surface unit 2502 and configured to display a graphic user interface, and a processing unit 2506 optionally coupled to the touch-sensitive surface unit 2502 and the display unit 2504. In some embodiments, the processing unit 2506 optionally includes a display enabling unit 2508, detecting unit 2510, and a send enabling unit 2512. In some embodiments, the electronic device is a smartphone.

Processing unit 2506 is configured to enable (e.g., with display enabling unit 2508) display of a configuration interface for configuring an orientation in which a wearable electronic device with an asymmetric geometry is to be worn, detect (e.g., with detecting unit 2510) a user selection of the orientation, and enable (e.g., with send enabling unit 2512) sending data representing the selected orientation to the wearable electronic device, where the selected orientation corresponds to a display orientation of the wearable electronic device.

In some embodiments, the configuration interface includes a first setting representing a first orientation and a second setting representing a second orientation, a selection of the first orientation corresponds to a first display orientation of the wearable electronic device, and a selection of the second orientation corresponds to a second display orientation of the wearable electronic device, where the second display orientation is rotated 180 degrees related to the first display orientation.

In some embodiments, the wearable electronic device includes a rotatable input mechanism. In some embodiments, a selection of the first orientation causes the wearable electronic device to scroll-down displayed information in response to a clockwise rotation of the rotatable input mechanism. In some embodiments, a selection of the second orientation causes the wearable electronic device to scroll-up displayed information in response to a clockwise rotation of the rotatable input mechanism.

In some embodiments, processing unit 2204 is further configured to enable (e.g., with display enabling unit 2508) display of a configuration interface for selecting a clock face among a plurality of clock faces, detect (e.g., with detecting unit 2510) a user selection of the clock face, and enable (e.g., with send enabling unit 2512) sending of data to the wearable electronic device that causes the wearable electronic device to display the current time using the selected clock face.

The operations described above with reference to FIG. 18 are, optionally, implemented by components depicted in FIGS. 1A-1B or FIG. 25. For example, display enabling operation 1802, detecting operation 1804, and sending operation 1806 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 26:
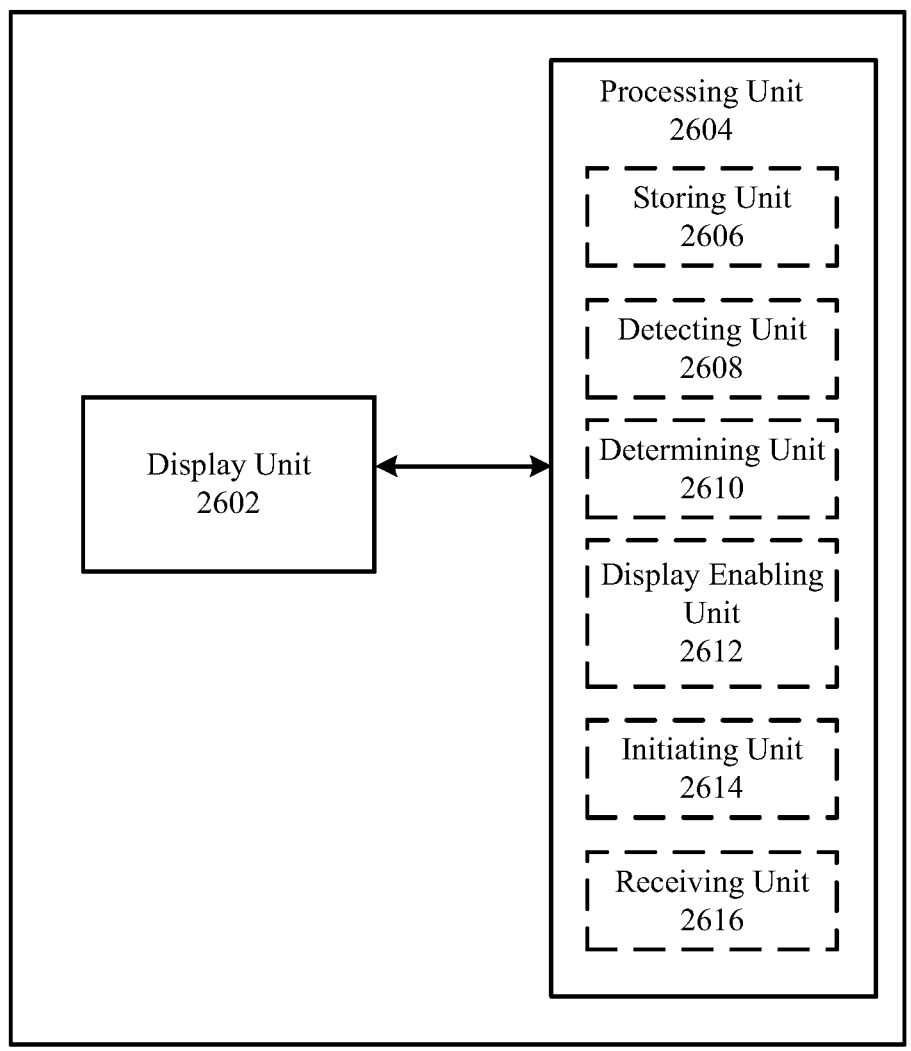
FIG. 26 is a functional block diagram of an electronic device in accordance with some embodiments.

In accordance with some embodiments, FIG. 26 shows a functional block diagram of an electronic device 2600 configured in accordance with the principles of the various described embodiments. The functional blocks of the device are, optionally, implemented by hardware, software, or a combination of hardware and software to carry out the principles of the various described embodiments. It is understood by persons of skill in the art that the function blocks described in FIG. 26 are, optionally, combined or separated into sub-blocks to implement the principles of the various described embodiments. Therefore, the description herein optionally supports any possible combination or separation or further definition of the functional blocks described herein.

As shown in FIG. 26, an electronic device 2600 includes a display unit 2602 configured to graphic user interface, and a processing unit 2604 coupled to the display unit 2602. In some embodiments, the processing unit 2604 optionally includes a storing unit 2606, a detecting unit 2608, a determining unit 2610, a display enabling unit 2612, an initiating unit 2614, and a receiving unit 2616.

Processing unit 2604 is configured to store (e.g., with storing unit 2606) a personalized electronic message, where the electronic message is stored before an initial device configuration of the electronic device. Processing unit 2604 is further configured to detect (e.g., with detecting unit 2608) a user instruction to power-on the electronic device, determine (e.g., with determining unit 2610) whether the device configuration sequence has previously been initiated or completed, and, in response to a determination that the device configuration sequence has not previously been initiated or completed, enable (e.g., with display enabling unit 2612) display of the electronic message upon power-on of the electronic device. Processing unit 2604 is further configured to, after enabling display of the electronic message, initiate (e.g., with initiating unit 2614) the device configuration sequence, and enable (e.g., with display enabling unit 2612) display of a user interface screen for device configuration.

In some embodiments, display of the electronic message is not enabled again upon power-on after completion of the initial device configuration. In some embodiments, the electronic device is capable of being reset as though the device configuration sequence has not previously been initiated or completed.

In some embodiments, the electronic message is personalized to an intended user of the electronic device. In some embodiments, the processing unit is further configured to receive (e.g., with receiving unit 2616) the personalized electronic message from a point-of-sale-device. In some embodiments, the electronic device is a wearable electronic device.

The operations described above with reference to FIG. 19 are, optionally, implemented by components depicted in FIGS. 1A-1B or FIG. 26. For example, storing operation 1902, detecting operation 1904, determining operation 1906, display enabling operations 1908 and 1912, and initiating operation 1910 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 27:
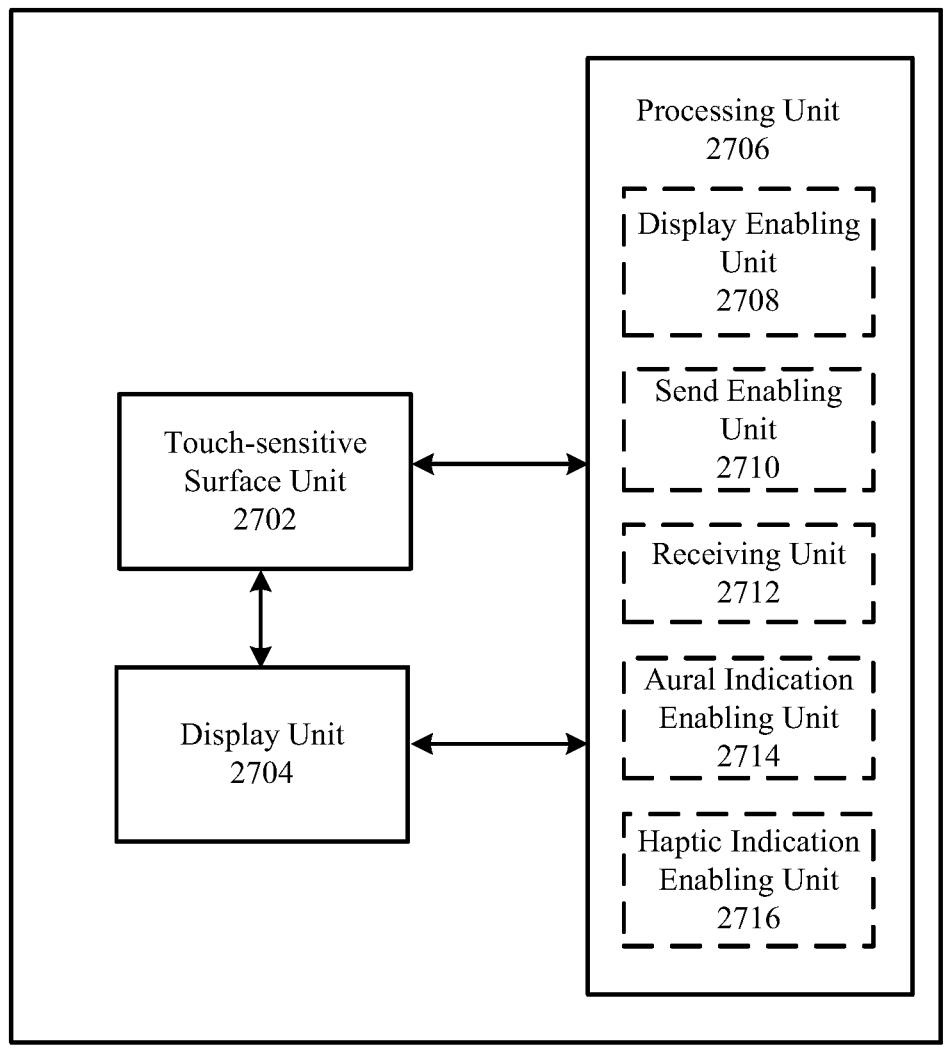
FIG. 27 is a functional block diagram of an electronic device in accordance with some embodiments.

In accordance with some embodiments, FIG. 27 shows a functional block diagram of an electronic device 2700 configured in accordance with the principles of the various described embodiments. The functional blocks of the device are, optionally, implemented by hardware, software, or a combination of hardware and software to carry out the principles of the various described embodiments. It is understood by persons of skill in the art that the function blocks described in FIG. 27 are, optionally, combined or separated into sub-blocks to implement the principles of the various described embodiments. Therefore, the description herein optionally supports any possible combination or separation or further definition of the functional blocks described herein.

As shown in FIG. 27, an electronic device 2700 includes a touch-sensitive surface unit 2702 configured to receive contacts, a display unit 2704 optionally coupled to the touch-sensitive surface unit 2702 and configured to display a graphic user interface, and a processing unit 2204 optionally coupled to the touch-sensitive surface unit 2702 and the display unit 2704. In some embodiments, the processing unit 2706 optionally includes a display enabling unit 2708, a send enabling unit 2710, a receiving unit 2712, an aural indication enabling unit 2714, and a haptic indication enabling unit 2716.

Processing unit 2706 is configured to enable (e.g., with display enabling unit 2708) display of at least one device initialization screen, and, after enabling display of the at least one device initialization screen, enable (e.g., with display enabling unit 2708) display of an instruction screen instructing a user to pair the external device with the electronic device, enable (e.g., with send enabling unit 2710) sending of first data via wireless communication, enable (e.g., with display enabling unit 2708) display of a pattern comprising identifying information of the electronic device, and receive (e.g., with receiving unit 2712) second data indicating that the external device and the electronic device have been paired using the first data. Processing unit 2706 is further configured to, after receiving the second data, enable (e.g., with aural indication enabling unit 2714 or haptic indication enabling unit 2716) an aural or haptic indication that the electronic device and the external device have been paired. In some embodiments, the instruction screen includes an instruction instructing the user to capture an image of the displayed pattern using the external device.

In some embodiments, the processing unit is further configured to enable (e.g., with display enabling unit 2708) display of a home screen after receiving the second data. In some embodiments, the home screen comprises a plurality of affordances, which when selected, launch corresponding applications. Optionally, the home screen comprises a display of the current time.

In some embodiments, processing unit 2706 is further configured to, before displaying the home screen, enable (e.g., with display enabling unit 2708) display of a screen configured to allow a user to select a clock face for the electronic device.

In some embodiments, processing unit 2706 is further configured to, before displaying the home screen, enable (e.g., with display enabling unit 2708) display of a screen configured to allow a user to select an orientation in which the electronic device is to be worn by the user.

In some embodiments, processing unit 2706 is further configured to, before displaying the home screen, enable (e.g., with display enabling unit 2708) display of a screen configured to allow a user to select one or more services to be made accessible to the electronic device.

In some embodiments, processing unit 2706 is further configured to, after receiving confirmation that the external device and the electronic device have been paired, receive (e.g., with receiving unit 2712) user information from the external device. In some embodiments, the user information includes WiFi settings, contact information of user contacts, identification of an installed application, or services. In some embodiments, the at least one device initialization screen includes at least one of a boot-up screen, a welcome screen, and a personalized-message screen.

In some embodiments, the electronic device is a wearable electronic device. In some embodiments, the electronic device includes a rotatable input mechanism. In some embodiments, the external device is a smartphone.

The operations described above with reference to FIG. 20 are, optionally, implemented by components depicted in FIGS. 1A-1B or FIG. 27. For example, display enabling operations 2002, 2004, and 2008, sending operation 2006, receiving operation 2010, and providing operation 2012 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
   a display device;
   one or more processors; and
   memory storing one or more programs configured to be executed by the one or more processors, the one or more programs including instructions for:
      after pairing the electronic device and an external device, displaying, via the display device, a first user interface, wherein the first user interface includes one or more first user interface objects corresponding to one or more first settings of the external device, wherein the external device displays a second user interface, different from the first user interface, while the electronic device displays the first user interface;
      while displaying the first user interface, detecting first user input; and
      after detecting the first user input, displaying, via the display device, a third user interface, wherein the third user interface includes one or more second user interface objects corresponding to one or more second settings of the external device.

2. The electronic device of claim 1, wherein the one or more first settings of the external device include an orientation in which the external device is configured to be worn.

3. The electronic device of claim 1, wherein the one or more first settings of the external device include one or more statuses corresponding to respective services available to the external device.

4. The electronic device of claim 1, wherein the one or more first settings of the external device include a watch face configured to be displayed via the external device.

5. The electronic device of claim 1, wherein the one or more programs further include instructions for:
   while displaying the third user interface, detecting second user input; and
   after detecting the second user input, displaying, via the display device, a notification user interface.

6. The electronic device of claim 1, wherein the one or more programs further include instructions for:
   while displaying the first user interface, detecting third user input corresponding to a respective user interface object of the one or more first user interface objects; and
   in response to detecting the third user input, adjusting a respective setting of the one or more first settings from a first state to a second state.

7. The electronic device of claim 1, wherein the one or more programs further include instructions for:
   while displaying the third user interface, detecting fourth user input corresponding to a respective user interface object of the one or more second user interface objects; and
   in response to detecting the fourth user input, adjusting a respective setting of the one or more second settings from a third state to a fourth state.

8. The electronic device of claim 1, wherein the one or more programs further include instructions for:
   prior to displaying the first user interface, pairing the electronic device and the external device via a Bluetooth connection between the electronic device and the external device.

9. The electronic device of claim 1, wherein the first user interface corresponds to a pairing application of the electronic device, and wherein the pairing application is part of an operating system of the electronic device.

10. The electronic device of claim 1, wherein the first user interface corresponds to a pairing application of the electronic device, wherein the pairing application is an application program installed on the electronic device, and wherein the application program is separate from an operating system of the electronic device.

11. The electronic device of claim 1, wherein the electronic device displays the first user interface during a configuration sequence of the external device, and wherein the electronic device displays the second user interface during the configuration sequence of the external device.

12. A non-transitory computer-readable storage medium storing one or more programs configured to be executed by one or more processors of an electronic device with a display device, the one or more programs including instructions for:
   after pairing the electronic device and an external device, displaying, via the display device, a first user interface, wherein the first user interface includes one or more first user interface objects corresponding to one or more first settings of the external device, wherein the external device displays a second user interface, different from the first user interface, while the electronic device displays the first user interface;
   while displaying the first user interface, detecting first user input; and
   after detecting the first user input, displaying, via the display device, a third user interface, wherein the third user interface includes one or more second user interface objects corresponding to one or more second settings of the external device.

13. The non-transitory computer-readable storage medium of claim 12, wherein the one or more first settings of the external device include an orientation in which the external device is configured to be worn.

14. The non-transitory computer-readable storage medium of claim 12, wherein the one or more first settings of the external device include one or more statuses corresponding to respective services available to the external device.

15. The non-transitory computer-readable storage medium of claim 12, wherein the one or more first settings of the external device include a watch face configured to be displayed via the external device.

16. The non-transitory computer-readable storage medium of claim 12, wherein the one or more programs further include instructions for:
while displaying the third user interface, detecting second user input; and
after detecting the second user input, displaying, via the display device, a notification user interface.

17. The non-transitory computer-readable storage medium of claim 12, wherein the one or more programs further include instructions for:
while displaying the first user interface, detecting third user input corresponding to a respective user interface object of the one or more first user interface objects; and
in response to detecting the third user input, adjusting a respective setting of the one or more first settings from a first state to a second state.

18. The non-transitory computer-readable storage medium of claim 12, wherein the one or more programs further include instructions for:
while displaying the third user interface, detecting fourth user input corresponding to a respective user interface object of the one or more second user interface objects; and
in response to detecting the fourth user input, adjusting a respective setting of the one or more second settings from a third state to a fourth state.

19. The non-transitory computer-readable storage medium of claim 12, wherein the one or more programs further include instructions for:
prior to displaying the first user interface, pairing the electronic device and the external device via a Bluetooth connection between the electronic device and the external device.

20. The non-transitory computer-readable storage medium of claim 12, wherein the first user interface corresponds to a pairing application of the electronic device, and wherein the pairing application is part of an operating system of the electronic device.

21. The non-transitory computer-readable storage medium of claim 12, wherein the first user interface corresponds to a pairing application of the electronic device, wherein the pairing application is an application program installed on the electronic device, and wherein the application program is separate from an operating system of the electronic device.

22. The non-transitory computer-readable storage medium of claim 12, wherein the electronic device displays the first user interface during a configuration sequence of the external device, and wherein the electronic device displays the second user interface during the configuration sequence of the external device.

23. A method, comprising:
at an electronic device with a display device:
after pairing the electronic device and an external device, displaying, via the display device, a first user interface, wherein the first user interface includes one or more first user interface objects corresponding to one or more first settings of the external device, wherein the external device displays a second user interface, different from the first user interface, while the electronic device displays the first user interface;
while displaying the first user interface, detecting first user input; and
after detecting the first user input, displaying, via the display device, a third user interface, wherein the third user interface includes one or more second user interface objects corresponding to one or more second settings of the external device.

24. The method of claim 23, wherein the one or more first settings of the external device include an orientation in which the external device is configured to be worn.

25. The method of claim 23, wherein the one or more first settings of the external device include one or more statuses corresponding to respective services available to the external device.

26. The method of claim 23, wherein the one or more first settings of the external device include a watch face configured to be displayed via the external device.

27. The method of claim 23, further comprising:
while displaying the third user interface, detecting second user input; and
after detecting the second user input, displaying, via the display device, a notification user interface.

28. The method of claim 23, further comprising:
while displaying the first user interface, detecting third user input corresponding to a respective user interface object of the one or more first user interface objects; and
in response to detecting the third user input, adjusting a respective setting of the one or more first settings from a first state to a second state.

29. The method of claim 23, further comprising:
while displaying the third user interface, detecting fourth user input corresponding to a respective user interface object of the one or more second user interface objects; and
in response to detecting the fourth user input, adjusting a respective setting of the one or more second settings from a third state to a fourth state.

30. The method of claim 23, further comprising:
prior to displaying the first user interface, pairing the electronic device and the external device via a Bluetooth connection between the electronic device and the external device.

31. The method of claim 23, wherein the first user interface corresponds to a pairing application of the electronic device, and wherein the pairing application is part of an operating system of the electronic device.

32. The method of claim 23, wherein the first user interface corresponds to a pairing application of the electronic device, wherein the pairing application is an application program installed on the electronic device, and wherein the application program is separate from an operating system of the electronic device.

33. The method of claim 23, wherein the electronic device displays the first user interface during a configuration sequence of the external device, and wherein the electronic device displays the second user interface during the configuration sequence of the external device.

\* \* \* \* \*